INVENTOR
R. D. REESE
ATTORNEY

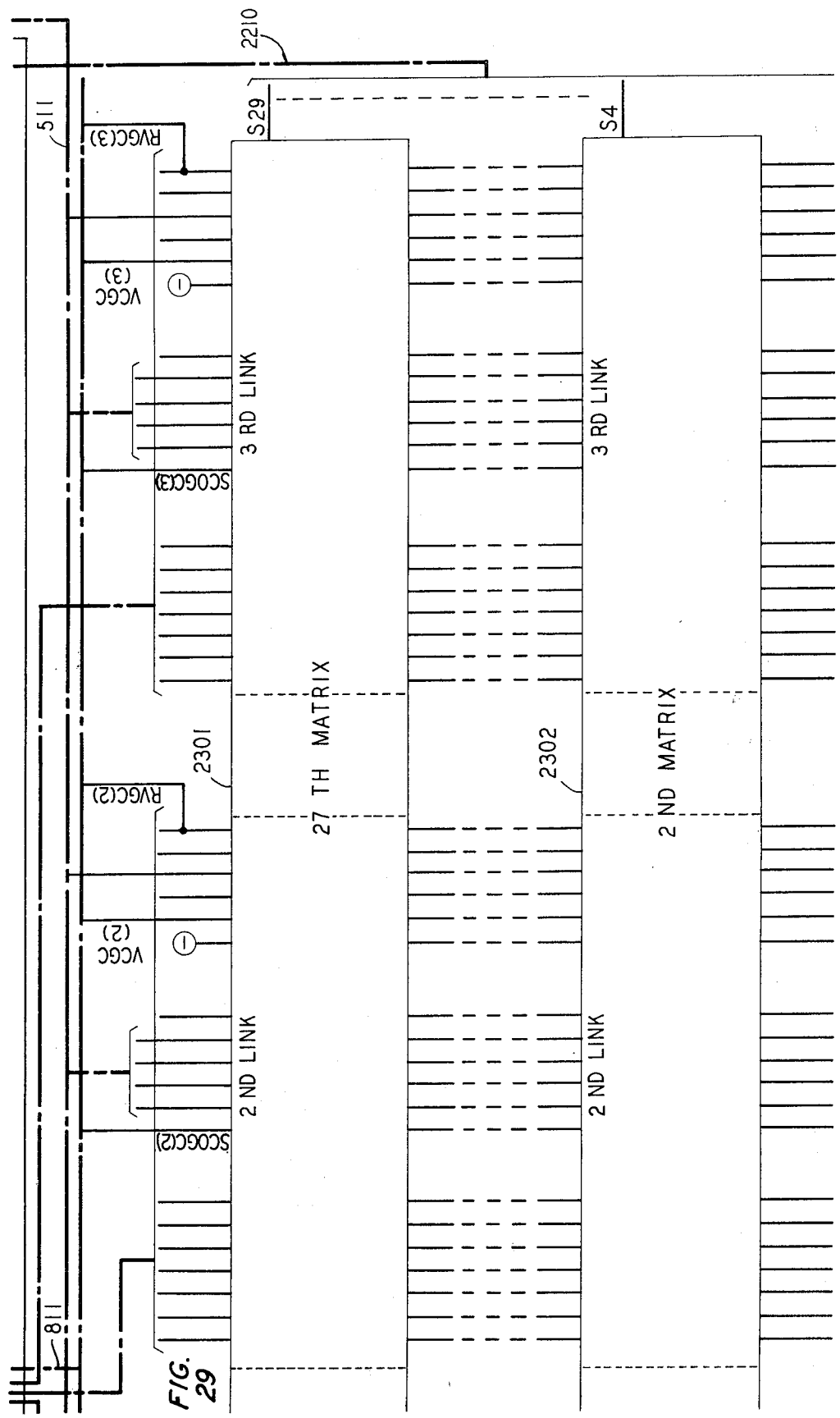

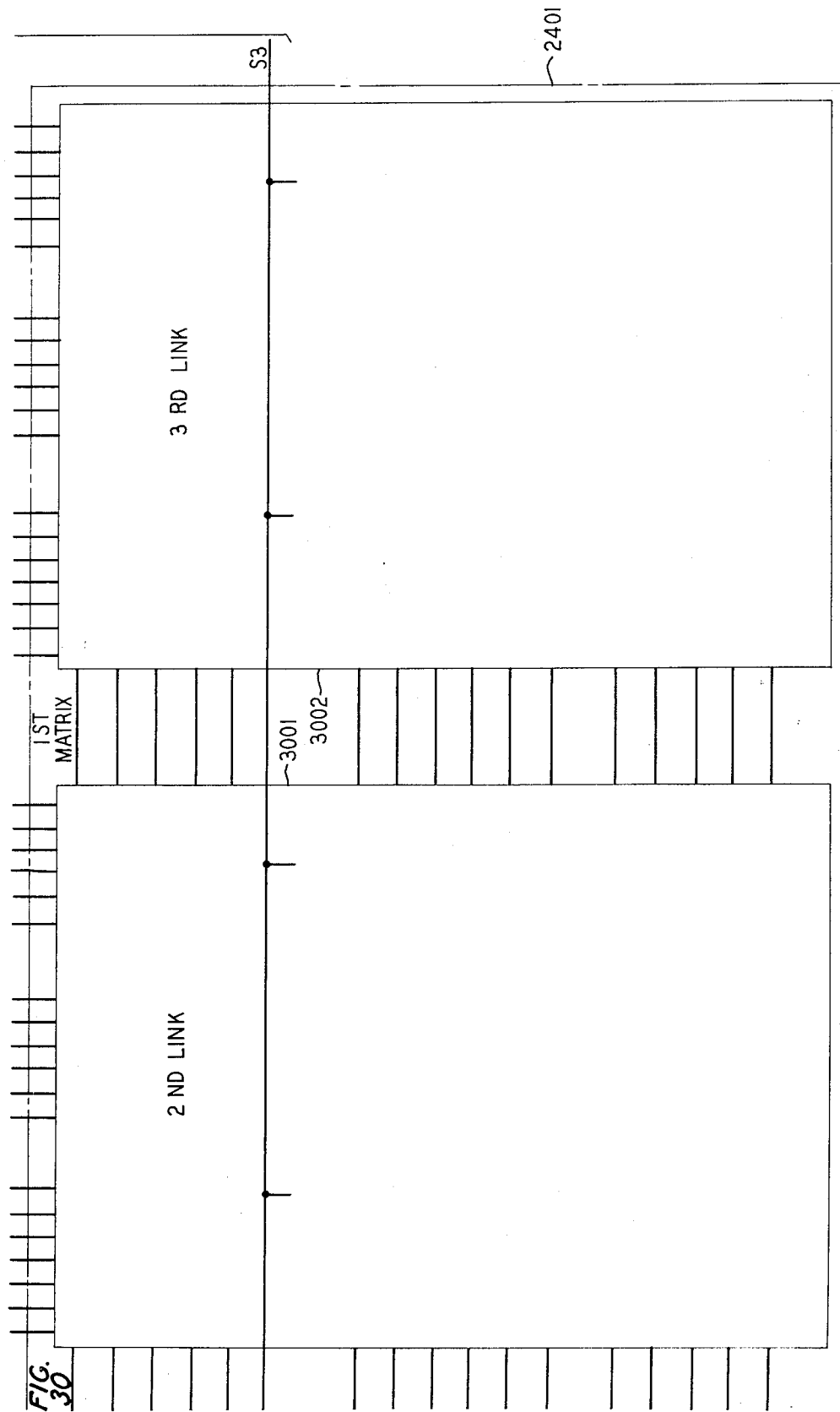

FIG. 31

| | FIG. 25 | FIG. 26 1ST LINK CCT | FIG. 27 | FIG. 28 2ND & 3RD LINK CCTS | FIG. 29 MATRIX | FIG. 30 |
|---|---|---|---|---|---|---|
| | FIG. 19 | FIG. 20 REGISTER CCT | FIG. 21 | FIG. 22 TRANSFER CCT | FIG. 23 | FIG. 24 |
| FIG. 14 2ND-27TH STATION CCTS | FIG. 15 | FIG. 16 1ST STATION CCT | FIG. 17 | FIG. 18 1ST, 2ND, 27TH HOLD CCTS | | |
| FIG. 11 2ND-27TH PICKS VOICE OP SW | FIG. 12 1ST PICKS VOICE OP SW | FIG. 13 | | | | |
| FIG. 8 1ST VIDEO CONF CONT | FIG. 9 2ND, 3RD VIDEO CONF CONT | FIG. 10 COMMON VIDEO CONF CONT | | | | |
| FIG. 5 1ST ADD-ON TRANS CONN | FIG. 6 2ND, 3RD ADD-ON TRANS CONN | FIG. 7 1ST, 2ND, 3RD ADD-ON TRANS CONT | | | | |
| FIG. 2 27TH STA & VIDEO SET | FIG. 3 1ST STA & VIDEO SET | FIG. 4 | | | | |

United States Patent Office 3,718,770
Patented Feb. 27, 1973

3,718,770
KEY TELEPHONE SYSTEM WIDEBAND CONFERENCING ARRANGEMENT
Randall Douglas Reese, Stanford, Calif., assignor to Bell Telephone Laboratories, Incorporated, Murray Hill, N.J.
Filed Aug. 5, 1971, Ser. No. 169,329
Int. Cl. H04m 11/00, 3/56
U.S. Cl. 179—18 BC    18 Claims

ABSTRACT OF THE DISCLOSURE

Wideband conferencing service between stations served by a key telephone system intercom link is provided by a conference control circuit arranged to monitor the audio transmission from each station on a conference and to transmit wideband signals from a currently audioactive station to all other stations included in the conference. Wideband transmission from all other conference stations except from the last audioactive station is inhibited while the wideband transmission from the last audioactive station is transmitted to the currently audioactive station. In situations were two stations alternatively become audioactive, provision is made to ensure continuous uninterrupted bidirectional wideband transmission between those stations.

BACKGROUND OF THE INVENTION

This invention relates generally to wideband conference arrangements and more particularly to an arrangement for conferencing a number of wideband key telephone stations in such a manner that a currently audioactive transmitting station continues to receive uninterrupted wideband communication from a last audioactive transmitting station.

DESCRIPTION OF THE PRIOR ART

Extensive development of key telephone systems in recent years has made possible the provision of numerous special features which render such key telephone systems more convenient and flexible. For example, circuit arrangements have been provided which enable communication paths to be established from any station to any one of a number of lines by operating a key associated with the desired line. In such systems, it is customary to arrange one of the lines as an intercom line thereby allowing a subscriber at any key station to communicate with a subscriber at any other key station merely upon the operation of the intercom key at each of the stations.

In such arrangements, the intercom line is usually arranged such that the enabling of the intercom key at any station enables separate transmission paths to be established from the transmitter and receiver of the associated station to respective transmit and receive buses of a common intercom link. An amplifier, commonly called a talk-back amplifier, is connected between the buses such that transmission from any station to any other station is possible via the single link intercom. Under such an arrangement, transmission originating from any station will be received at all the connected stations including the originating station. When more than two stations access the link during the same time interval, transmission is established between all the stations on the link on a conference basis.

Recent developments in wideband service, an example of which is Picturephone® video service, have made it possible to further enhance the versatility of key telephone systems. Unique problems are presented in such systems when the wideband service is extended to the intercom line. For example, in a key telephone system arranged for Picturephone video service, it is possible for two or more video stations to access the common link at the same time, each station transmitting separate images. Since reconstruction of the received data at the terminating station is dependent upon the proper reception of synchronizing (SYNC) signals from the transmitting station, and since these signals will be out of phase with each other when transmitted from different stations, a picture resulting from simultaneous transmission from two or more stations will be visually unintelligible.

The Dorros-Robinson U.S. Pat. 3,519,744 issued July 7, 1970 is an example of an arrangement for providing wideband transmission from an audioactive station to certain other stations while providing wideband transmission to the audioactive station from a last audioactive station. Thus, in the Dorros patent each station receives wideband transmission from only the currently communicating station while that station receives wideband transmission from the last communicating station. In Dorros, wideband transmission distributing devices, such as amplifiers, are used to distribute wideband transmission between stations under control of switch contacts associated with each amplifier. In addition to the initial expense of such devices they must be calibrated and maintained periodically. Also care must be taken that the transmission output of any such device not currently connected to another station does not interfere with the wideband communication between stations. Thus, unless a particular station is in the process of transmitting wideband signals to another station, i.e., an audioactive or past audioactive station, the power output of the wideband transmission from the noncommunicating station should be minimized.

Although the above-cited Dorros patent is a significant advancement in the art of wideband conferencing, the teachings thereof are directed to wideband transmission between a fixed number of stations. In order to utilize the Dorros system in a key telephone environment where many stations may be connected together in conference fashion on a selective basis the wideband cabling between stations (including switches and switch controllers) would have to be expanded to accommodate all possible connections. In addiiton an arrangement would have to be added to selectively control the association of stations with the respective switches. Also, wideband transmission distributing devices would have to be added, one per station, thereby increasing the cost and the complexity of the system substantially.

A further problem exists when it is desired to communicate concurrently with a number of wideband stations. One particular aspect of the problem involves the situation where two of the stations dominate the conference connection (as determined from the audio activity of the stations) and the other stations merely observe the debate between the two dominating stations. In this situation each of the observing stations, in addition to the currently audioinactive dominating station, receives wideband transmission from the currently audioactive station while the audioactive station receives wideband transmission from the audioinactive dominating station, which station, by definition, is the last audioactive station.

When, in the above described situation, the currently audioactive station becomes the inactive station and the inactive station becomes the active station, wideband transmission to the observing stations is switched so that these stations may view the new speaker. However, wideband transmission received by each of the dominant stations remains the same since each is already viewing the other. Thus, if each of the dominant stations is switched in the same manner as any other station to the conference a distinct and very annoying flutter (change of SYNC) occurs on the wideband screen of each of the dominant parties as the network becomes rearranged. Since the dominant parties continue to observe the same image after the network rearrangement as before, and since the switching occurs as a result of the change in audio activity at the stations, the received image flutter lags the audio change and appears to each dominating party to be a break in the transmission. This momentary break can be distracting to a speaker and cause the speaker to pause and wait for the image to reappear on his screen. In addition to being a nuisance to the parties, such a pause could cause the switching system to again reorient the wideband transmission between the stations thereby causing further confusion.

This problem is compounded in that any two of the parties to the conference may become the dominating parties and also by the fact that the dominating parties are constantly changing and may remain dominating parties only for a brief period of time.

Accordingly, a need exists in the art for a wideband conference switching arrangement where parties to the conference view the current speaker, where the current speaker views the last speaker, and where there is continuous uninterrupted wideband transmission visible on the viewing screen of any party when that party takes command of the system and the image received on that party's screen remains the same as the image received just prior to taking command.

SUMMARY OF THE INVENTION

These and other objectives are obtained in accordance with one exemplary embodiment of the invention wherein a key telephone system is arranged to provide each key station with access to a wideband multilink intercom while at the same time assuring that wideband connections are enabled between only two stations at any one time and is equipped with circuitry for establishing wideband conferencing between a number of stations and to control the wideband conference in response to the audio activity at the respective conference stations.

In the embodiment the wideband conferencing control circuitry is arranged in association with a key telephone system such as the key telephone switching system of Audesirk-Morse-Weed disclosed in copending application Ser. No. 119,761, filed Mar. 1, 1971.

The conference control circuitry is arranged to detect conference enabling signals transmitted from any of the stations connected to any of the links and also arranged to determine which of the stations is the first signaling station. All other stations currently connected to the same link as the signaling stations are automatically connected to that link in wideband conference fashion. Any additional stations which are desired to be added to the conference connection are permitted entry into the conference under control of the conference control circuitry.

Each station to the conference has associated therewith a voice-operated switch which switch serves to control the direction of wideband transmission to the associated station. Each switch has four active modes, namely, originator mode, present talker mode, past talker mode and listener mode. Each time that a conference station becomes audioactive the direction of wideband transmission among the stations is controlled for each station by the respective station's voice-operated switch. Audio activity is detected at each station by a voice-detector circuit arranged to control the respective voice-operated switches, which switches are in turn controlled by a conference control circuit common to all of the stations.

When a conference station becomes audioactive the output of the associated wideband transmit circuit (camera in the case of video telephone service) is connected to the input of an amplifier which amplifier or distributor is arranged with a number of outputs. The respective outputs of that amplifier are then connected to all of the wideband receive circuits of the other conference stations. At the same time the output of the wideband transmit circuit of a last-detected audioactive (past talker) station remains connected to the input of another amplifier, one of the outputs of which amplifier remains connected to the wideband receive circuit of the audioactive (present talker) station.

In accordance with one feature of the invention a key telephone system is arranged to provide conferencing among a number of key telephone stations connected to the system with the direction of the wideband transmission between the respective stations under control of detected audioactive stations and where the wideband transmission is distributed by wideband amplifier circuits common to all of the stations.

In accordance with another feature of the invention a wideband conferencing system is provided with circuitry responsive to the audioactivity of conferenced stations for controlling the direction of the wideband transmission among the stations and for ensuring that wideband transmission is interrupted at a station only when the image received at that station is changed.

DESCRIPTION OF THE DRAWING

The foregoing objects, features and advantages, as well as others of the invention, will be more apparent from the following description of the drawing, in which:

FIGS. 2 through 30 are schematic drawings showing in greater detail the interrelation of the components of the exemplary embodiment; and FIG. 31 shows the manner in which the other figures should be arranged.

It will be noted that FIGS. 2 through 30 employ a type of notation referred to as "detached contact" in which an "X" shown intersecting a conductor represents a normally open contact of a relay and a bar shown intersecting a conductor at right angles represents a normally closed contact of a relay; "normally" referring to the unoperated condition of the relay. The principles of this type of notation are described in an article entitled "An Improved Detached Contact Type Schematic Circuit Drawing" by F. T. Meyer in the September 1955 publication of the American Institute of the Electrical Engineers Transactions Communications and Electronics, vol. 74, pp. 505–513.

Figure 4:
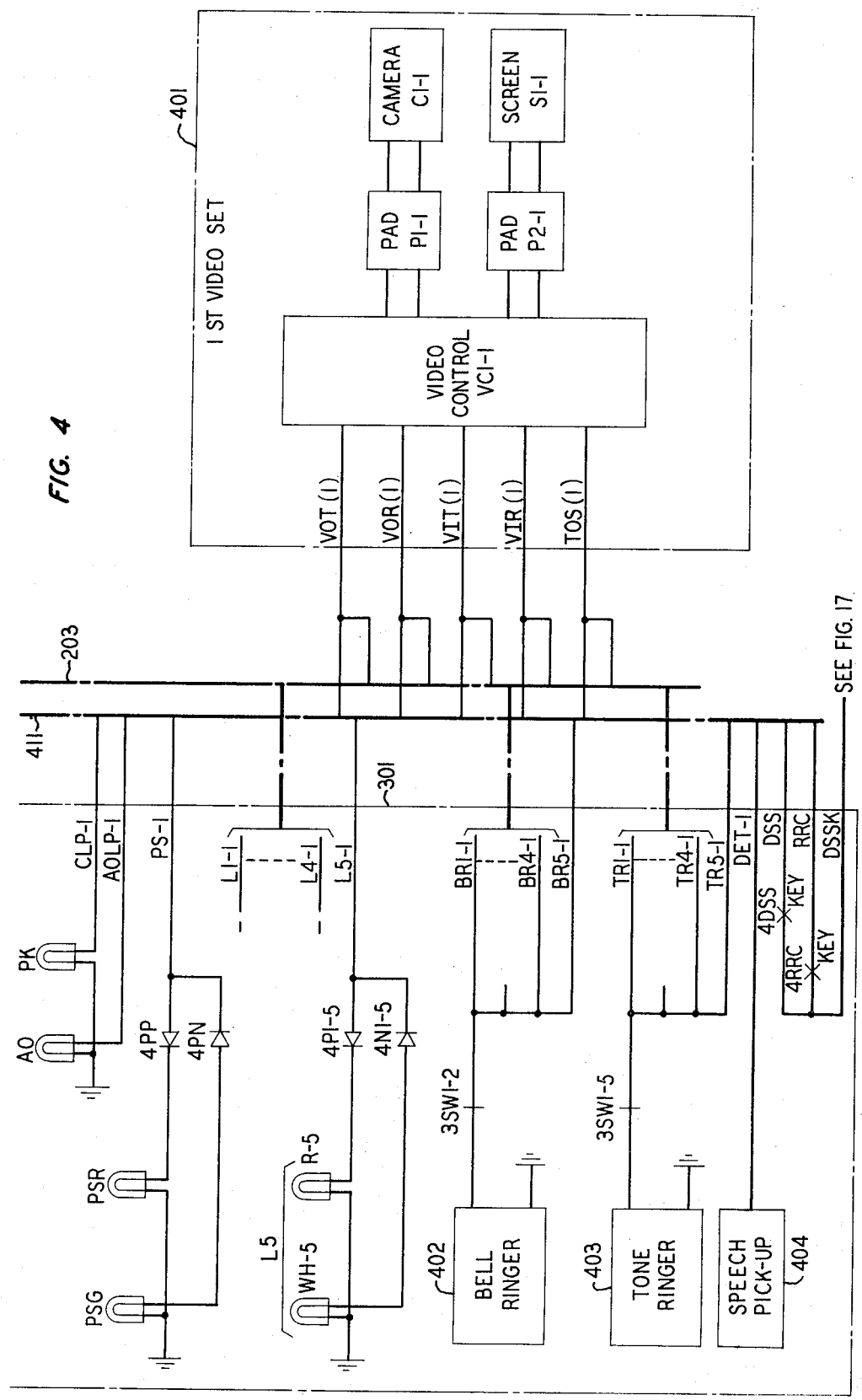
Figure 5:
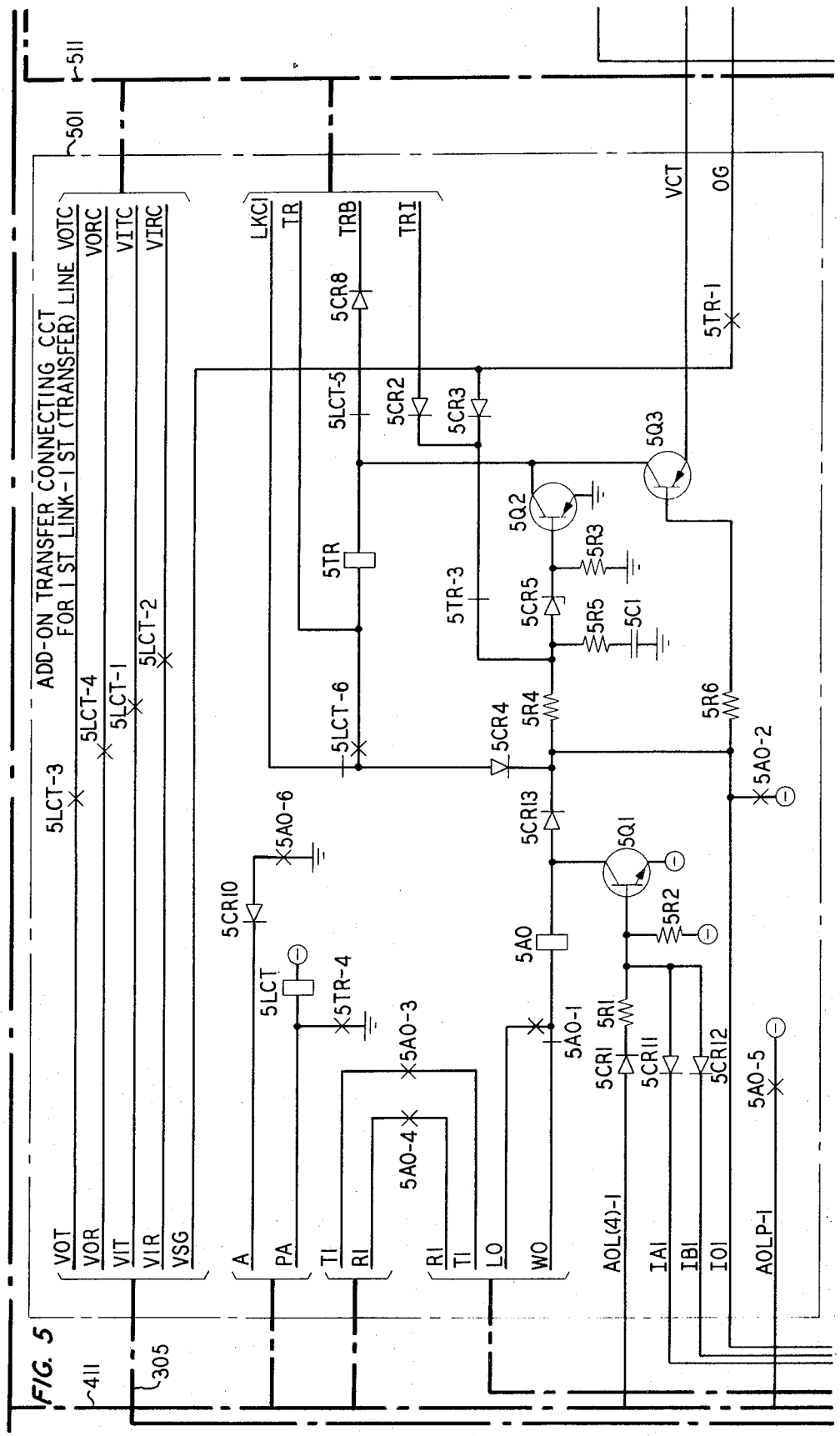
Figure 6:
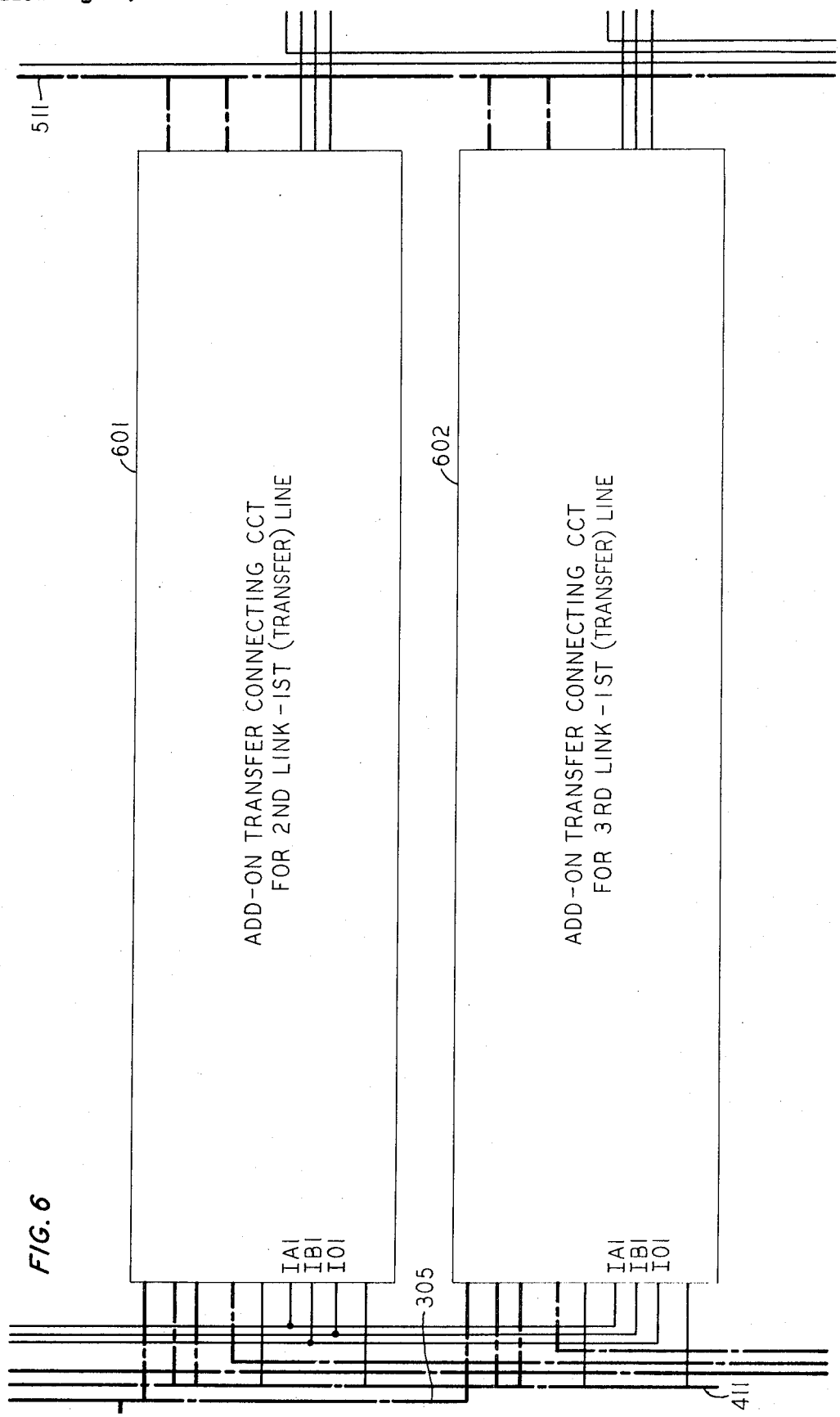

It will be noted also that in order to simplify the disclosure and thus facilitate a more complete understanding of the embodiment, the relays, relay contacts and other electromechanical devices shown in FIGS. 2 through 30 have been given systematic designations. Thus, the number preceding the letters of each device corresponds to the figure in which the control circuit of the device is shown. Thus, the coil of relay 5AO is shown in FIG. 5. Each relay contact, either make, break, or transfer, is shown with its specific contact number preceded by the designation of the relay to which it belongs. For example, the notation 5AO-1 indicates contact number 1 of relay 5AO the coil of which is shown in FIG. 5.

INTRODUCTION

The present invention is illustrated in a key telephone system wherein any key station may be selectively connected to any one of a number of switching network lines in response to the enabling of a key associated with that line. For purposes of illustration, it is intended that audio-only connections and the audio portion of wideband connections are completed to the key stations from Private Branch Exchange (PBX) or Central Office (CO) lines in a manner well known in the art. One such arrangement is disclosed in the H. T. Carter, U.S. Pat. 2,850,579, issued Sept. 2, 1958. It will be assumed that the high frequency or data portion of a wideband connection is completed over a wideband quad which consists of a transmit pair of wires and a receive pair of wires. An example of a key telephone system arranged to provide wideband service between any line and any key station is disclosed in copending application of S. E. Bush, P. E. Crouse, and G. E. Saltus, Ser. No. 875,261, filed Nov. 10, 1969. It will be assumed further that the selector circuit of the present embodiment is of a type commonly used in intercom systems with selective ringing controlled by the calling station. One such selective intercommunication arrangement is disclosed in the C. E. Morse U.S. Pat. 3,450,845, issued June 17, 1969.

In order to further facilitate an understanding of the invention, the description of the operation of the exemplary embodiment has been subdivided into a general description portion designated 1.0 and detailed description portions designated 2.0 and 3.0. Section 1.0 and its subsections describe the invention in general terms with respect to FIGS. 1 and 1A. Section 2.0 and its subsections describe the invention in detail with respect to FIGS. 2 through 7 and FIGS. 14 through 30. Section 3.0 and its subsections describe the invention in detail with respect to FIGS. 8 through 13.

1.0 General description

Figure 1:
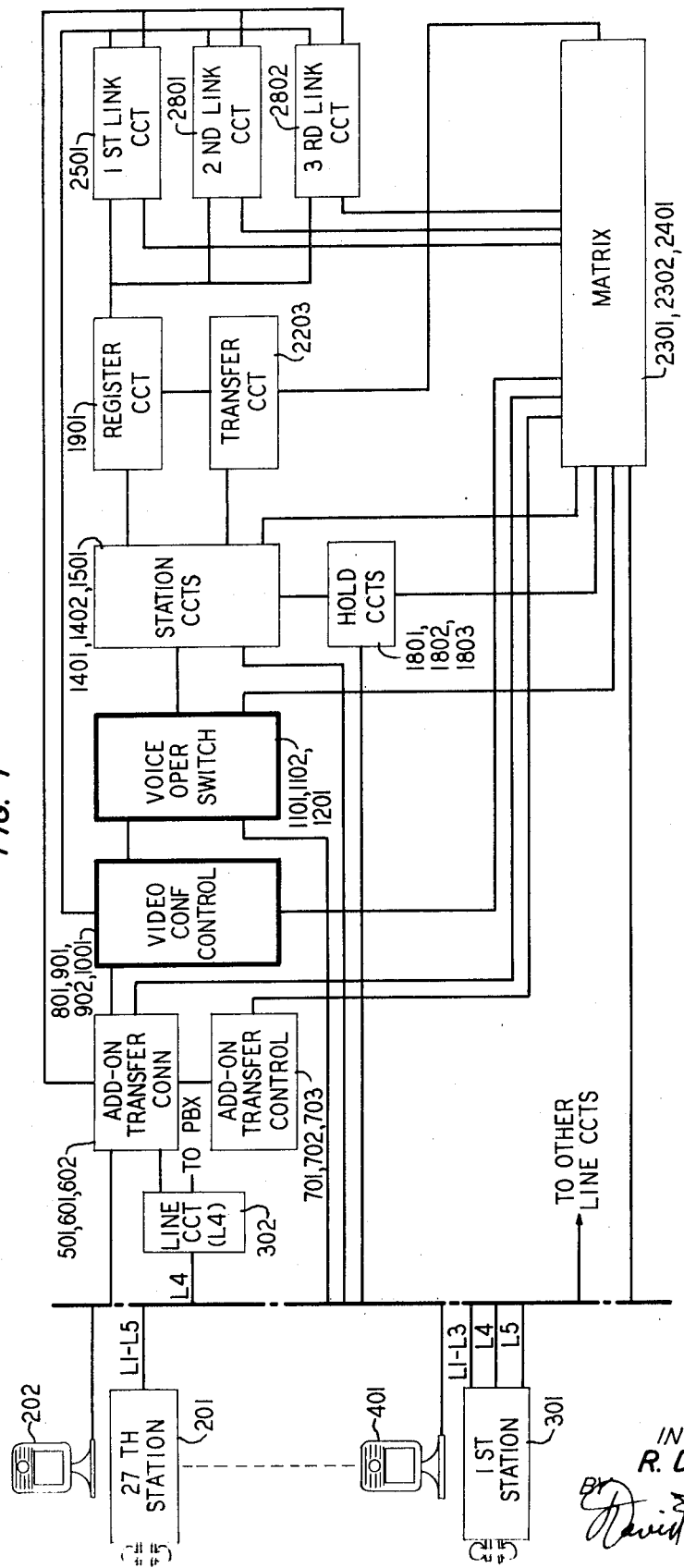
FIG. 1 is essentially a block diagram showing the interrelation of the elements of the exemplary embodiment of the invention.

Referring now to FIG. 1, the present invention is illustrated in an audio-video key telephone system having any number of key stations, such as stations (1st) 301 and (27th) 201. The wideband units 401 and 202, which in the embodiment are Picturephone® video display sets, are each individually associated with certain ones of the stations.

In the embodiment, each station is arranged with five communication lines (L1–L5); with four of the lines (L1–L4) extended to a conventional key telephone system through line circuits associated with each line, and the remaining line (L5), the intercom line, extending to a matrix network 2301, 2302, 2401 via station circuits 1401, 1402, 1501 under control of register circuit 1901 and link circuits 2501, 2801, and 2802.

SYSTEM BLOCK FUNCTIONS

1.1 Station circuit

The station circuits, such as station circuits 1401, 1402, and 1501, serve to interface the respective station sets with the switching portions of the system. When a station goes off-hook, the associated station circuit signals the register 1901 and transfers thereto, via special coding leads, the identity of the calling station. The station circuit, in conjunction with the register circuit, provides potential to illuminate either the white lamp at the station set on audio calls or the red lamp on wideband calls. When a station circuit is connected to a link circuit, it serves to hold the switch matrix crosspoint relay associated with the assigned link so as to eliminate the necessity for the register circuit to remain attached to a calling or called station. The station circuit is arranged to differentiate between being associated with a calling and a called station.

1.2 Matrix network

The matrix network 2301, 2302, and 2401 contains an array of contacts for connecting each station circuit to each link. The station circuits are connected to the horizontal multiples of the network while the respective vertical multiples form the interconnecting buses. Each link consists of a matrix array of contacts, which array is controlled by three separate relay coils. The respective contacts of the relays generally are associated with the switching functions necessary for the audio, video, and features portion of a given call. The busy or idle status of any station is determined by testing the audio relay coil of all three links associated with that station for a holding potential thereon.

1.3 Link circuits

Each link through the matrix network is controlled by a separate link circuit 2501, 2801 or 2802. Stations are connected through the matrix to the link circuit for the purpose of dialing and for the control of functions associated with many of the optional features. Each link circuit provides talking battery in a single-ended feed to the tip and ring leads of the station connected thereto. Audible tones, such as dial tone, ringback tone, station-busy tone, and permanent signal tone are supplied by each link circuit via the battery feed connection. Control of the audible tones is initiated by the register and is then maintained individually by each link circuit until retired by a connecting station or for a nominal period of thirty seconds. The link circuits are each held in the busy state as long as at least one station maintains its tip and ring connection thereto.

1.4 Register

The functions performed by the register circuit 1901 may be best described at this point by enumerating those functions in the order that they occur during the processing of a normal call. This order is as follows:

(1) Recognizing a request for service by a ground level on one or more of the coding leads from a signaling station circuit,
(2) causing the activation of a selector therein so that the selector may respond to the station code transmitted on the coding leads,
(3) selecting an idle link and enabling the seizure of that link,
(4) performing a test to determine the busy or idle status of the calling party,
(5) operating the calling party's cross-point matrix,
(6) releasing the selector and subsequently causing the selector to be reconnected to the selected link circuit, permitting the called party's dialed number to be recognized by the selector,
(7) causing dial tone to be transmitted to the calling party from the assigned link,
(8) causing dial tone to be removed by the assigned link when the first dial pulse or Touch-Tone® digit is received by the selector,
(9) performing a busy-idle test on the called party's matrix in all three links,
(10) signaling the assigned link to connect the proper audible tone to the calling party's line, and
(11) releasing from the assigned link by allowing the link to go into the busy state from the enabled state.

1.5 Establishment of a connection from a calling station through a matrix network When it is desired to establish an intercom connection from a station, the pickup key associated with the intercom line at that station is enabled. In addition, on Picturephone service calls the pound (#) key on a Touch-Tone 12-key dialer is enabled prior to the dialing of the digits associated with the called station as an indication that wideband service is required. The register circuit 1901 at this time has already determined if any one of the three intercom link circuits 2501, 2801, and 2802 is idle. The register circuit in response to the enabled intercom key thereupon seizes the detected idle link for subsequent use of the calling station. Subsequently, a path through the matrix network 2301, 2302, and 2401 is established, via the seized link, from the register to the calling station. Interposed in this path is the station circuit associated with the calling station which circuit also served to identify the calling station to the register.

The calling party, upon connection to the register, thereupon dials or key pulses the digits associated with the desired called station. The register then interrogates the matrix network associated with the called station to determine its busy-idle status. Upon a determined idle condition, the register connects the called station to the matrix network on the same link as the calling station. The register then becomes disconnected from that link and is free to handle other intercom connections from other stations on remaining idle links.

1.6 Direct station selection (DSS)

After a two-party call has been established either party may add an additional station. However, if the original parties are in the wideband mode the additional parties are added in an audio-only fashion. A special (DSS) key is required at each station for each specific station that a user wishes to signal directly. The operation of the DSS key takes the place of dialing and connects the calling station directly to the called station through the previously-established link connection. Operation of the DSS key forces the link circuit to which that station is connected to become reenabled thereby connecting that station to the register. Lockout is provided to disallow direct station selection if the register is serving another link at that time. When the register has been successfully reconnected to the now signaling link circuit, the depressed direct station signaling (DSS) key provides a signal to the called party's station circuit. That signal causes the coding leads of the called station to become active thereby causing the register circuit to respond as if the call had been initiated from the called station as oppsed to its initiation from the station at which the DSS key has been operated. The register responds to the incoming code in the same manner as previously discussed for the establishment of a connection and accordingly connects the called station to the link associated with the calling station. Provision is made so that several parties may be called by successive operation of individual DSS keys at a calling station, and for permitting audible signals to be transmitted so that the calling party may determine the status of each of the direct station signaled parties.

1.7 Register recall

After a call has been established on a given link either party may depress a register recall key thereby causing the involved link circuit to be reenabled and reconnected to the register. In this situation the enabled register recall key causes a new request for service to appear at the register without an accompanying station code on the coding leads. In this situation dial tone is returned from the link circuit to the stations connected thereto. The previously attached stations may now key pulse the code associated with the second called station and the connection will be established in the manner more fully detailed hereinafter.

1.8 Add-on transfer connection

In situations where it is desired to add a PBX or central office line to the intercom connection, each such added line must be capable of being connected to any one of the three system links. Add-on transfer control and connecting circuits, such as circuits 701, 702, and 703, and 501, 601, and 602 are used to control such three-party conferences. Under this arrangement bidirectional wideband transmission is either between a first station and a PBX line or between a first station and one of the intercom links dependent only upon which of the respective pickup keys is enabled at the first station. The audio connection between the conference parties is arranged such that full three-way transmission is possible among all of the connected parties to the conference without regard to which of the pickup keys is enabled at the first station.

When one of the intercom parties goes on-hook the three-party conference previously established is automatically switched to a two-party intercom conference regardless of which of the parties to the intercom link established the original connection.

1.9 Distinctive signaling

In order for a subscriber at a key station to distinguish between audio-only connection and video connections, two distinct signaling systems are utilized. On audio-only calls the visual signals are provided by a white line lamp and the audible signals are generated by a bell ringer. On video calls the visual signals are provided by a red line lamp and the audible signals are generated by a tone ringer.

1.10 Voice switched wideband conferencing

The video conference control circuit 801, 901, 902, and 1001 and the voice-operated switch 1101, 1102 and 1201 are shown in conjunction with the multilink intercom just described. These elements function in conjunction with the multilink intercom and form the foundation of the voice-switched wideband conferencing arrangement of the present invention. These circuits are arranged in such a manner that when speech is detected from any station on a wideband conference, the video camera associated with that station is turned on and the image transmitted therefrom is received on the screen of all of the other stations to the wideband conference. The image received on the screen of a currently audio-active station is the image transmitted from the camera of the last audio-active station. Transmission from the various cameras of the system to the various receivers is controlled by distribution circuits common to all of the stations in such a manner that when the image to be received by any receiver is the same image previously received there is no interruption of transmission.

Figure 1A:
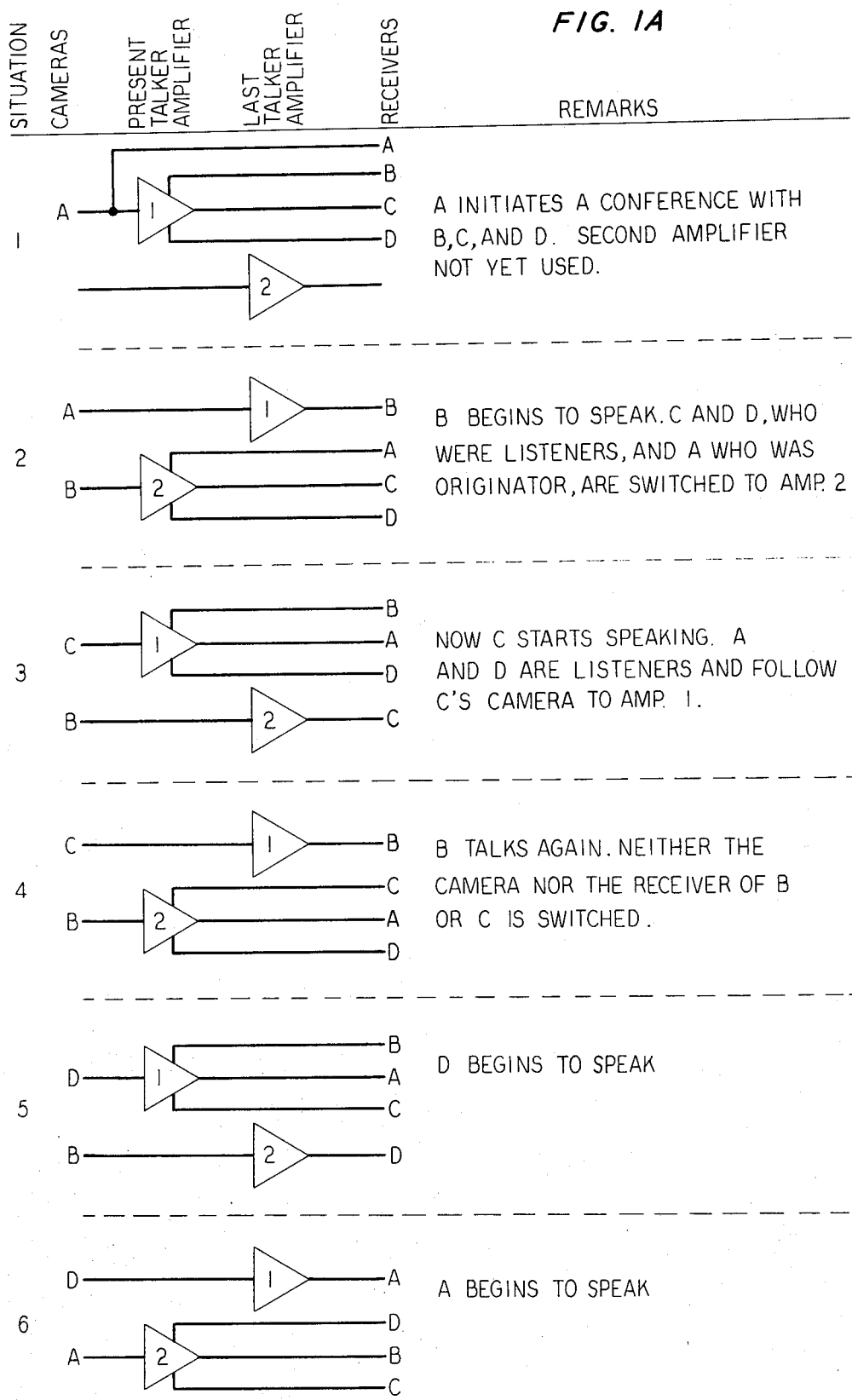
FIG. 1A is a chart showing various stages of a typical conference connection.

Referring now to FIG. 1A, in situation 1, station A has initiated a conference among stations B, C and D. In this situation, amplifier 1 is utilized to provide transmission from the camera of A to the receivers of stations B, C and D. In addition, the camera of A is connected directly to the receiver of A so that A views himself directly and not through an amplifier. In situation 2, station B becomes audio-active. Since the image to be received by station B is the same image previously transmitted thereto, namely, the image from the camera of A, the receiver of station B remains connected to amplifier 1. However, since the image received by all the other stations to the conference, namely, station A, C and D, is the image transmitted from camera B, the presently audio-active station, those stations are connected to the output of amplifier 2.

As shown in situation 3, station C has become audio-active. Thus, the image to be received by station C is the image transmitted from the last talker B. The receiver of station C remains connected to amplifier 2, thereby receiving the image transmitted from camera B. At the same time, the receivers of stations A, B and D are transferred to amplifier A so as to receive the image transmitted from station C. In situation 4, station B is the currently audio-active station and station C is the last talker station. Thus, the receiver of station C remains associated with amplifier 2 while the receiver of station B remains associated with amplifier 1 since both of these receivers continue to receive the same image as had been received just prior to audio activity passing from station C to station B. Stations A and D being listener stations are switched from amplifier 1 to amplifier 2. In situation 5, when station D begins to speak the receiver of station D will continue to receive the image transmitted from station B via amplifier 2 without being switched while the image transmitted from station D will be received at stations A, B and C. In situation 6, when station A begins to speak, since the image to be received at station A is the same image previously transmitted from station D, station A remains connected to amplifier 1. The image transmitted from now audio-active station A is transmitted via amplifier 2 to stations B, C and D.

DETAILED DESCRIPTION

2.0 Multilink intercom

The following text will describe the multilink intercom embodiment of the invention in detail with reference to FIGS. 2 through 7 and FIGS. 14 through 30. Cursory examination of these figures will reveal that certain relay contacts and other circuit components have been enclosed in parentheses.

The parenthetical symbol has been employed to facilitate a clear understanding of the invention by indicating that the apparatus which is enclosed therein is shown more fully in prior art telephone systems. Relay designations and contact designations which are unique to the instant embodiment are not enclosed in parentheses and are shown in complete detail.

We shall assume as hereinbefore set forth that the stations are all arranged for Picturephone wideband service. We shall further assume that each of these stations is arranged with five pickup keys with the first four such keys at each station associated with four line circuits, such as line circuit 302, FIG. 3, and the fifth key at each station associated with the multilink intercom. However, as will be more apparent from that which is contained hereinafter, any number of stations, each connectable to any number of wideband or audio-only lines, may be connected into the intercom system. Also, it should be noted that a station which is not equipped for wideband service may also access the multilink intercom for audio-only communication with any other station regardless of whether the connected station is equipped for wideband service or for audio-only service.

Since the multilink wideband intercom is arranged to function with existing key telephone systems and key telephone station equipment, existing control and signaling arrangements have been utilized throughout. For example, connections over any line, including the intercom line, are enabled by the operation of the pickup key associated with that line at each station. The enabling of the pickup key provides a signal on the associated A lead which signal is utilized in the manner to be more fully detailed hereinafter to establish and control the connection.

2.1 Calling station bidding for an idle link

Figure 2:
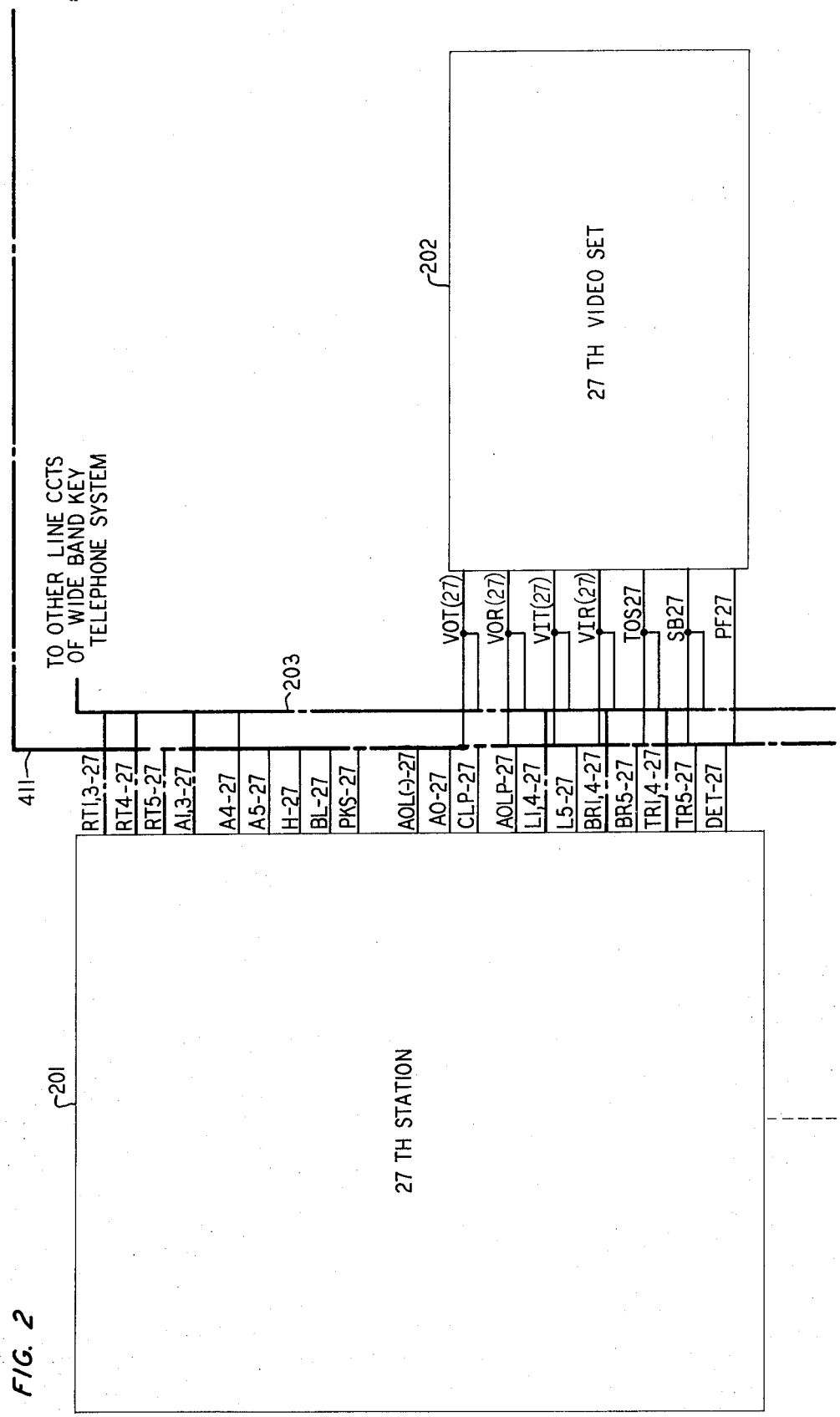
Figure 3:
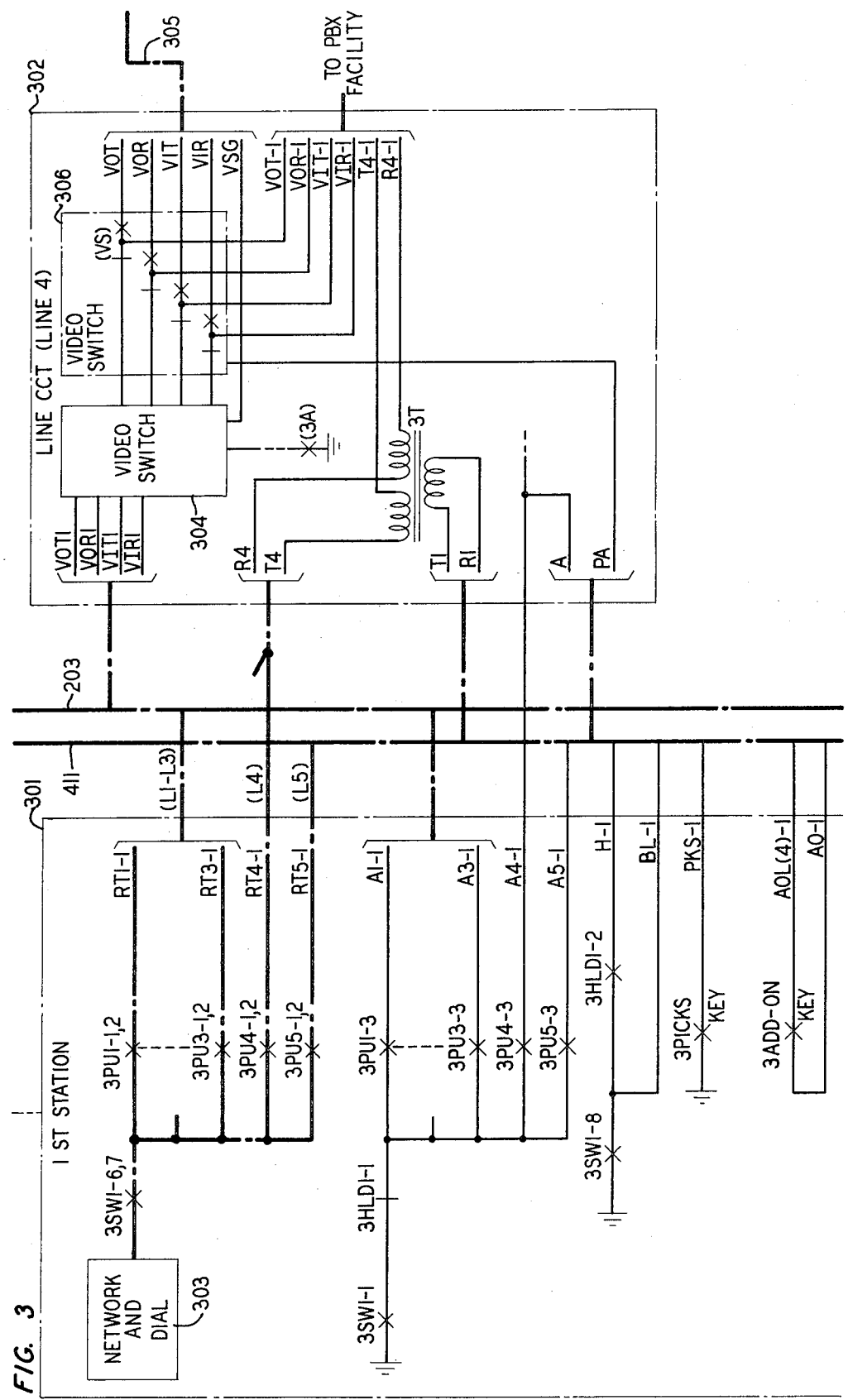

Turning now to FIG. 3, assume that 1st station 301 desires to establish an intercom connection to 27th station 201 (FIG. 2), not detail, but identical to detailed station 301. Accordingly, the pickup key at the calling station 301 associated with the intercom line, which in the embodiment is pickup key 3PU5, is enabled. Upon removing the handset from the switchhook, ground is extended through enabled switchhook contact 3SW11, released hold break contact 3HLD1–1 and enabled make pickup key contact 3PU5–3 and over lead A5–1 and cable 411 to 1st station circuit 501, FIG. 15.

Figure 16:
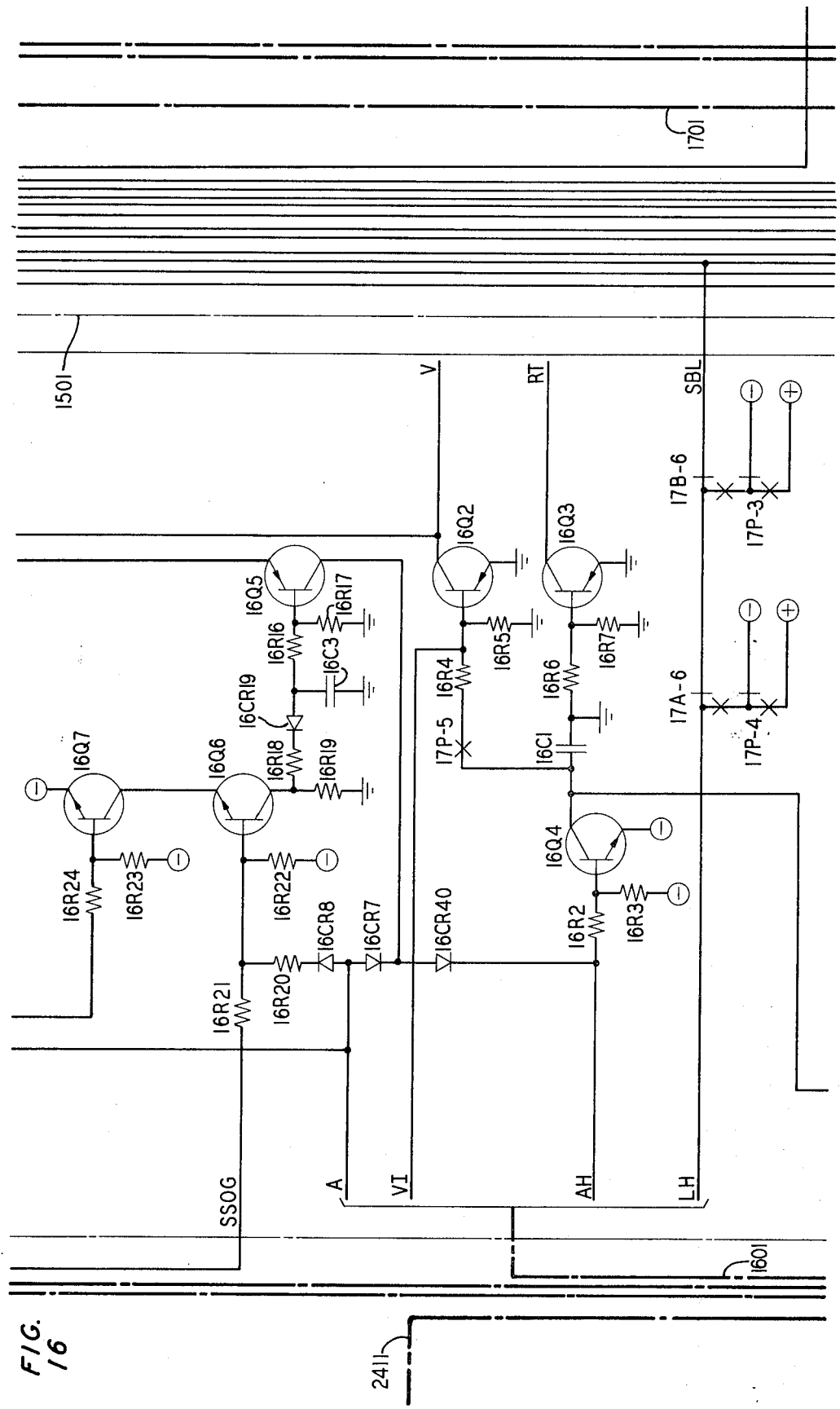

Ground is extended via lead A5–1 to FIG. 16 and through forward-biased diodes 16CR7 and 16CR40 and resistor 16R2 to turn on transistor 16Q4. When transistor 16Q4 turns on, transistor 16Q3 turns on momentarily by the transient voltage via capacitor 16C1. The resulting momentary ground on lead RT is unimportant at this time. Transistor 16Q4 turning on causes battery to be extended over an obvious path to FIG. 17 and through released break contact 17A–5 to one side of the 17A relay winding. The other side of the 17A relay winding is connected through diode 17CR3 and lead OP and cable 1701 to register circuit 1901, FIG. 19.

Figure 19:
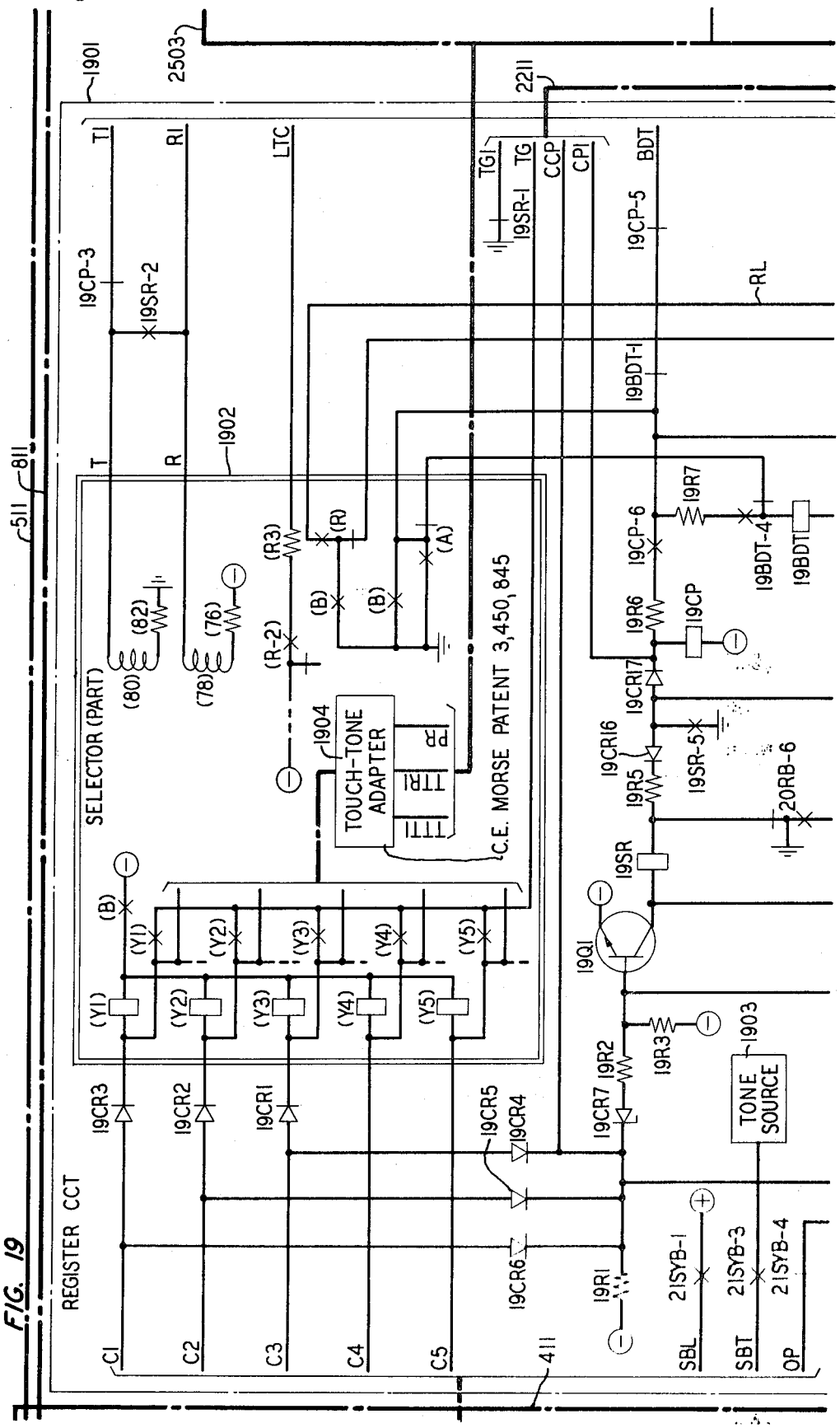
Figure 20:
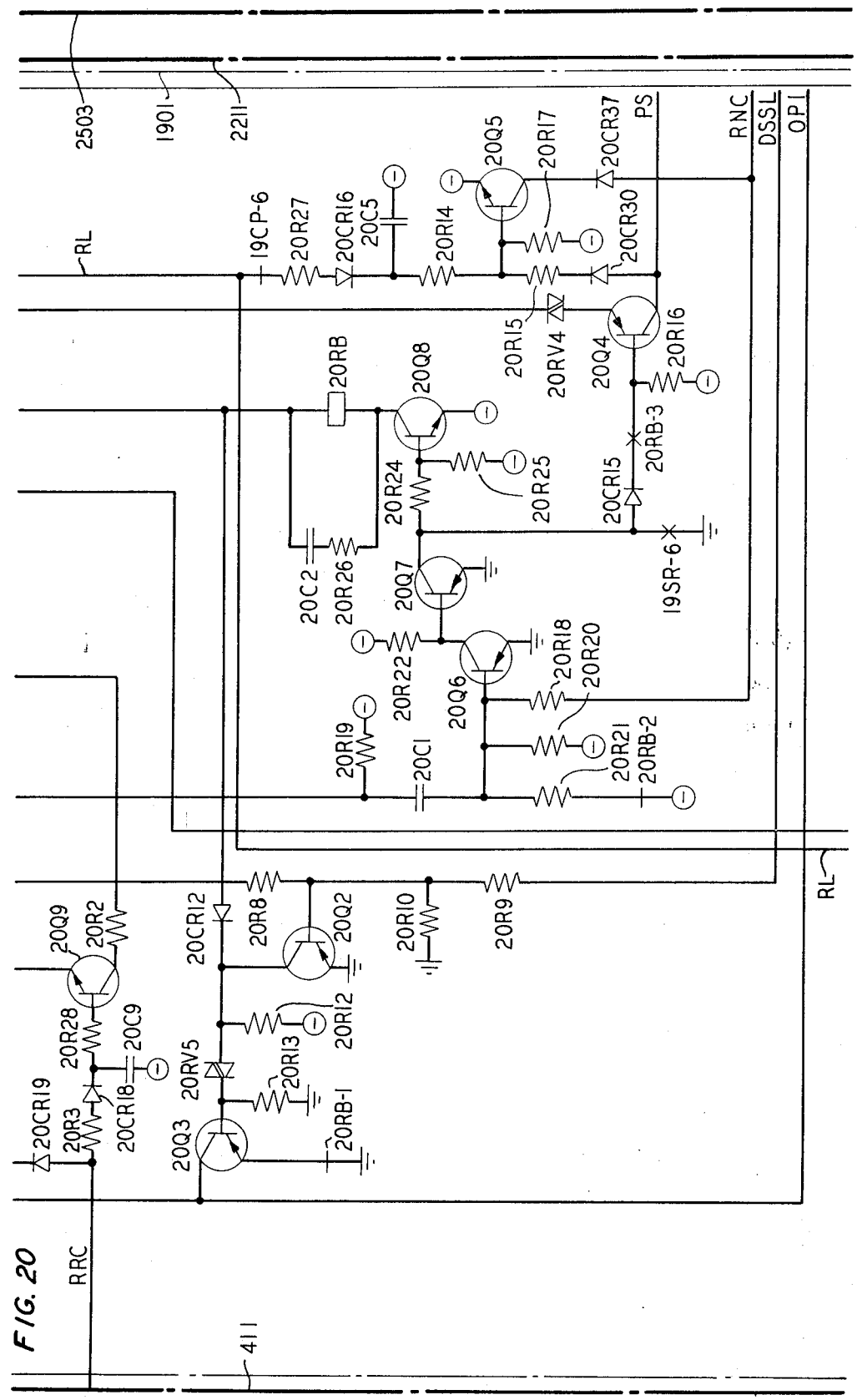

Continuing in FIGS. 19 and 20, and assuming that register circuit 1901 is idle and that at least one of the links is available for establishing a connection thereon, transistor 20Q3, FIG. 20, is on thereby providing a ground from the emitter thereof through released break contact 21SYB–4, FIG. 19, to lead OP, cable 1701. The ground on lead OP is extended to FIG. 17 thereby enabling relay 17A in the calling station circuit 1501. Relay 17A remains operated due to current flowing through forward-biased diode 17CR2.

The enabling of relay 17A causes ground from lead CHI to be extended through enabled make contact 17A–3 and released break contact 17B–3 to maintain relay 17A operated without regard to the potential on lead OP from the seized register circuit. Leads CHI and CHO in conjunction with the transfer contacts 17B–3 and 17A–3 in each of the station circuits form a chain from ground on lead CHI in the 1st station circuit such that only 17A relay in only one of the station circuits remains held in this manner. Accordingly, simultaneous seizures of the register circuit from more than one station circuit are prevented and preferential seizure treatment is given to the lowest numbered station circuit.

Continuing in FIG. 16, when the calling station seizes an available register in the manner just described and the 17A relay in the associated station circuit has operated the line lamp at the station turns on. This is accomplished from negative potential and released break contact 17P–4, enabled make contact 17A–6 and lead LH, cable 1601, to FIG. 18 and the associated hold circuit which in this case is 1st hold circuit 1803. The negative potential on lead LH is extended through the hold circuit via released break contact 18H–2, and over lead L5–1 and cable 411 to the calling station 301, FIG. 4. As shown in FIG. 4, the negative potential is extended from lead L5–1 through forward-biased diode 4N1–5 to illuminate the intercom line (line L5) white lamp WH–5.

When all of the links are busy, the red intercom line lamps R–5 at all of the stations having access to the intercom link turn on. This is accomplished by supplying positive potential over lead L5–1 which potential biases diode 4P1–5 in the forward direction while biasing diode 4N1–5 in the reverse direction, thereby illuminating red lamp R–5. On such busy conditions of the links the positive potential is present on lead L5–1 over the path just described from the associated station circuit, lead LH, FIG. 16. Positive potential is on lead LH via released break contacts 17A–6 and 17B–6 and lead SBL from FIG. 19 and enabled make contact 21SYB–1.

Figure 21:
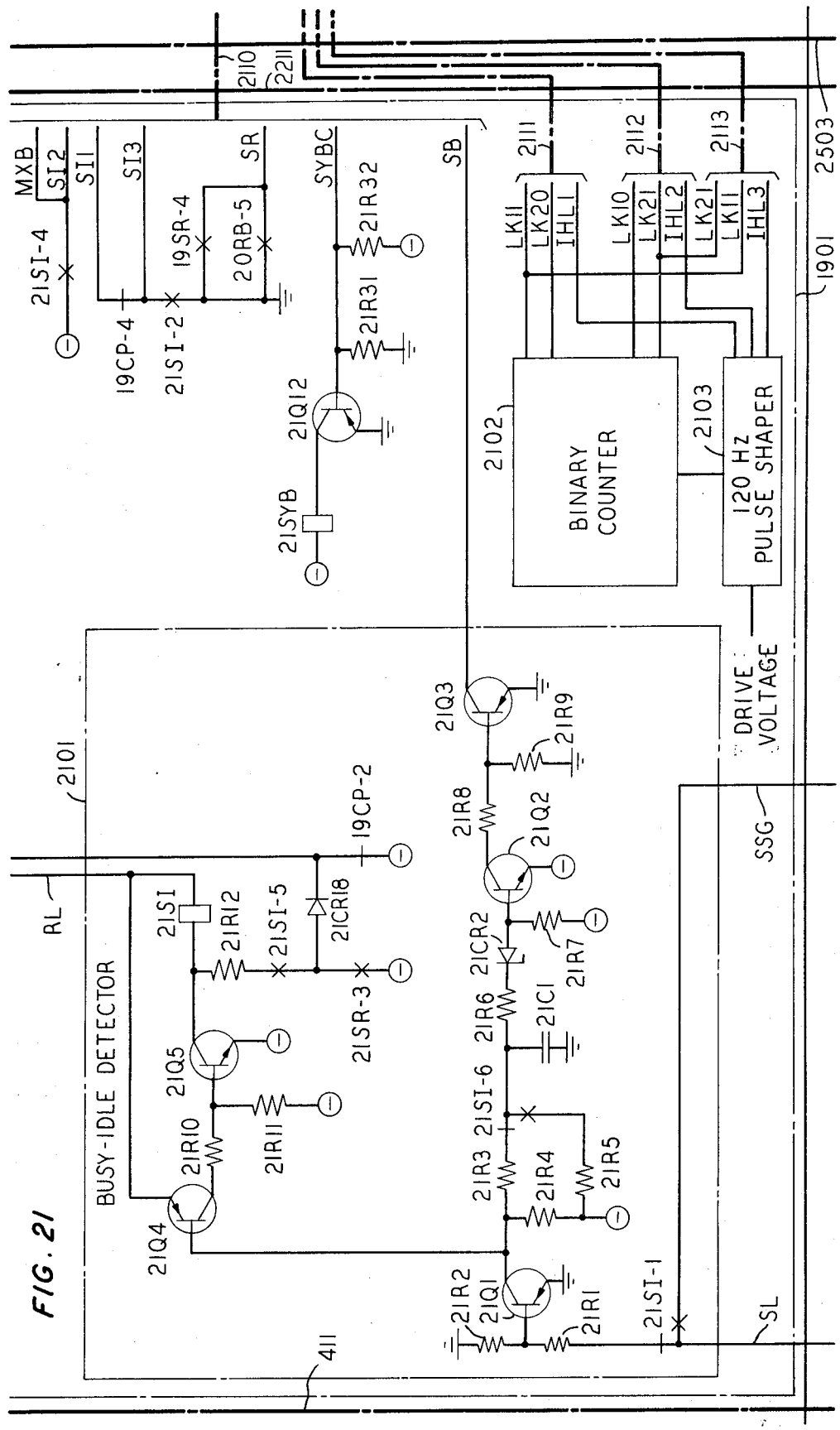

In the event that a station attempts to seize an intercom register while the red intercom lamp is on audible busy tone will be returned to that station. The circuitry which accomplishes this function is in the register circuit, FIGS. 19, 20, 21, and 22. As shown in FIG. 21, when the register circuit is unavailable because all of the links are busy the 21SYB relay therein is operated via transistor 21Q12 which transistor turns on whenever ground is absent on lead SYBC. Thus, as shown on FIG. 19, the ground on lead OP is removed via enabled break contact 21SYB–4 and the 17A relay, which operated from this ground, remains normal in the calling station circuit. Also, since the 21SYB relay is operated when all of the links are busy, tone source 1903, which tone source is arranged in any one of the well-known circuit configurations operable to provide an audible tone on a line, provides tone via enabled make contact 21SYB–3 and lead SBT of cable 1701 to the station circuit 1501, FIG. 15.

Figure 15:
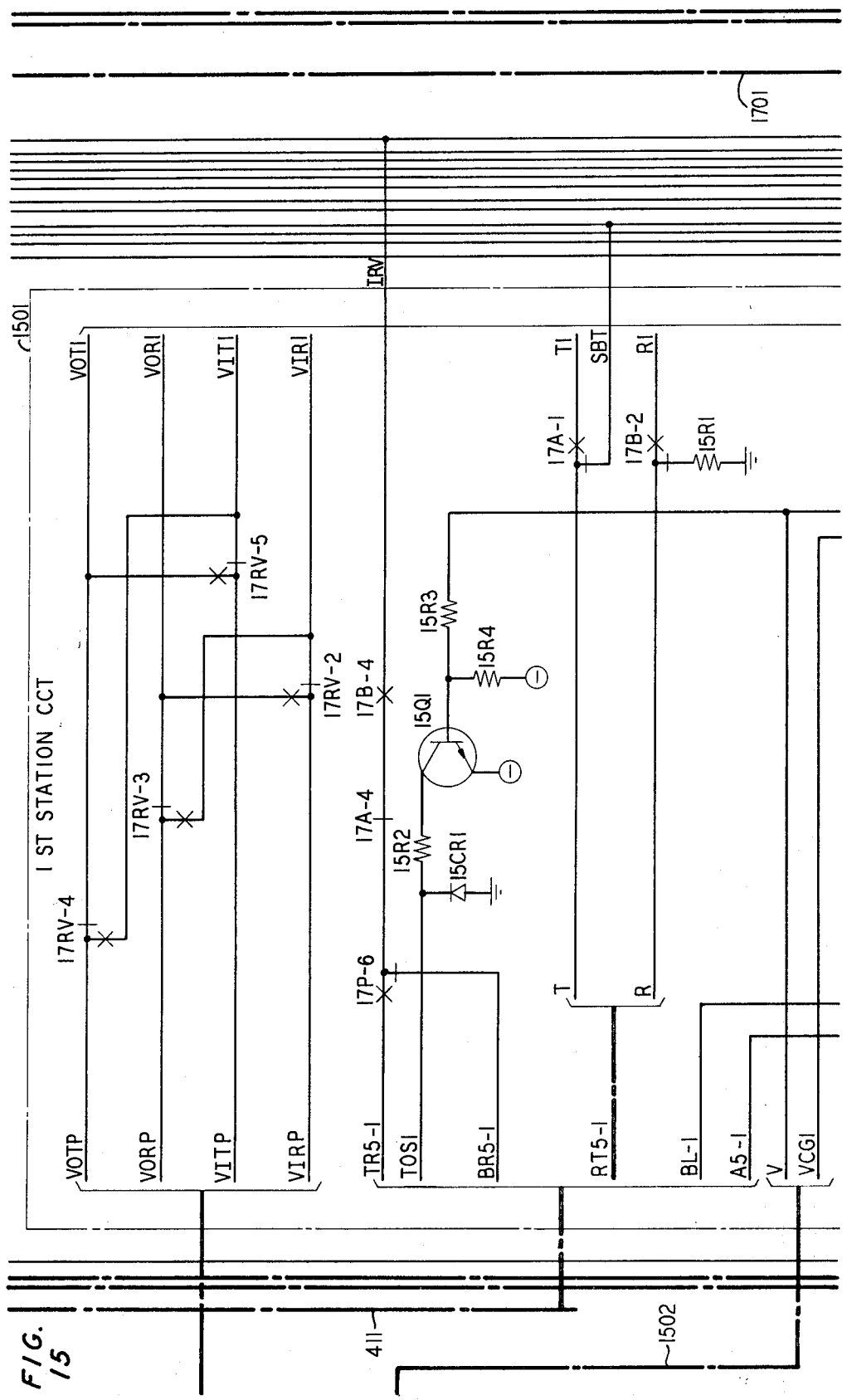

Continuing now in FIG. 15, this tone is extended through the station circuit via lead SBT and released break contact 17A–1 and over lead T (of cable pair RT5–1) and cable 411 to the calling station 301, FIG. 3 and through the enabled pickup key to the receiver (shown as part of network and dial 303) thereof. Accordingly, the subscriber is given audible as well as visual indication that a connection to the intercom link cannot be accomplished at this time because of the busy condition of all of the links.

2.2 Link selection

In the preceding section, it was assumed that the register circuit was idle and that a link circuit was available. The following description details the exact circuitry arranged to control the register in busy as well as idle situations.

Turning now to the register circuit 1901, FIG. 21, the outputs of a binary counter, such as binary counter 2101, are logic levels appearing on leads LK10, LK11, LK20, and LK21. The counter is driven by a 120 Hz. pulse shaper, such as pulse shaper 2103, which pulse shaper may be arranged in any one of the well-known circuit configurations operable to supply pulses so long as an input lead remains open. The input leads to pulse shaper 2103 are the leads respectively designated IHL1, IHL2, and IHL3. Thus, so long as these leads remain free of negative potential, binary counter 2102 continues to sequence and the output leads thereof reflect, in binary form, the status of the counters at any point in time. Thus, during one pulse leads LK11 and LK20 will have ground thereon while at the next pulse leads LK10 and LK21 may have grounds thereon while at a third pulse leads LK21 and LK11 may have grounds thereon, this sequence being repeated at the next pulse so that again leads LK11 and LK20 will have grounds thereon. Thus, at each pulse only one pair of LK– leads of the three cables 2111, 2112, and 2113 will have grounds thereon. Each of the cable pairs just mentioned is extended to one of the three link circuits to control that circuit.

Figure 27:
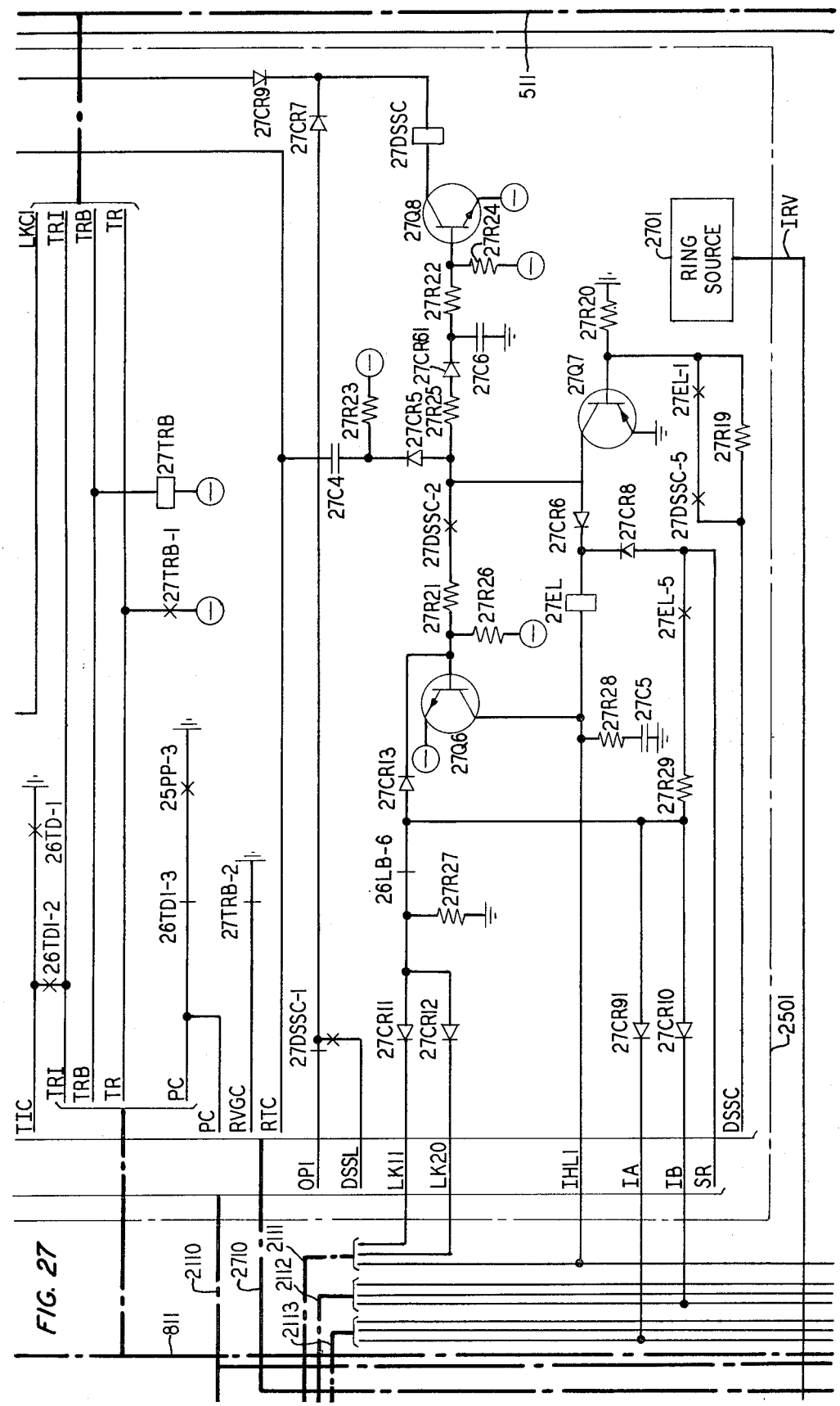
Figure 28:
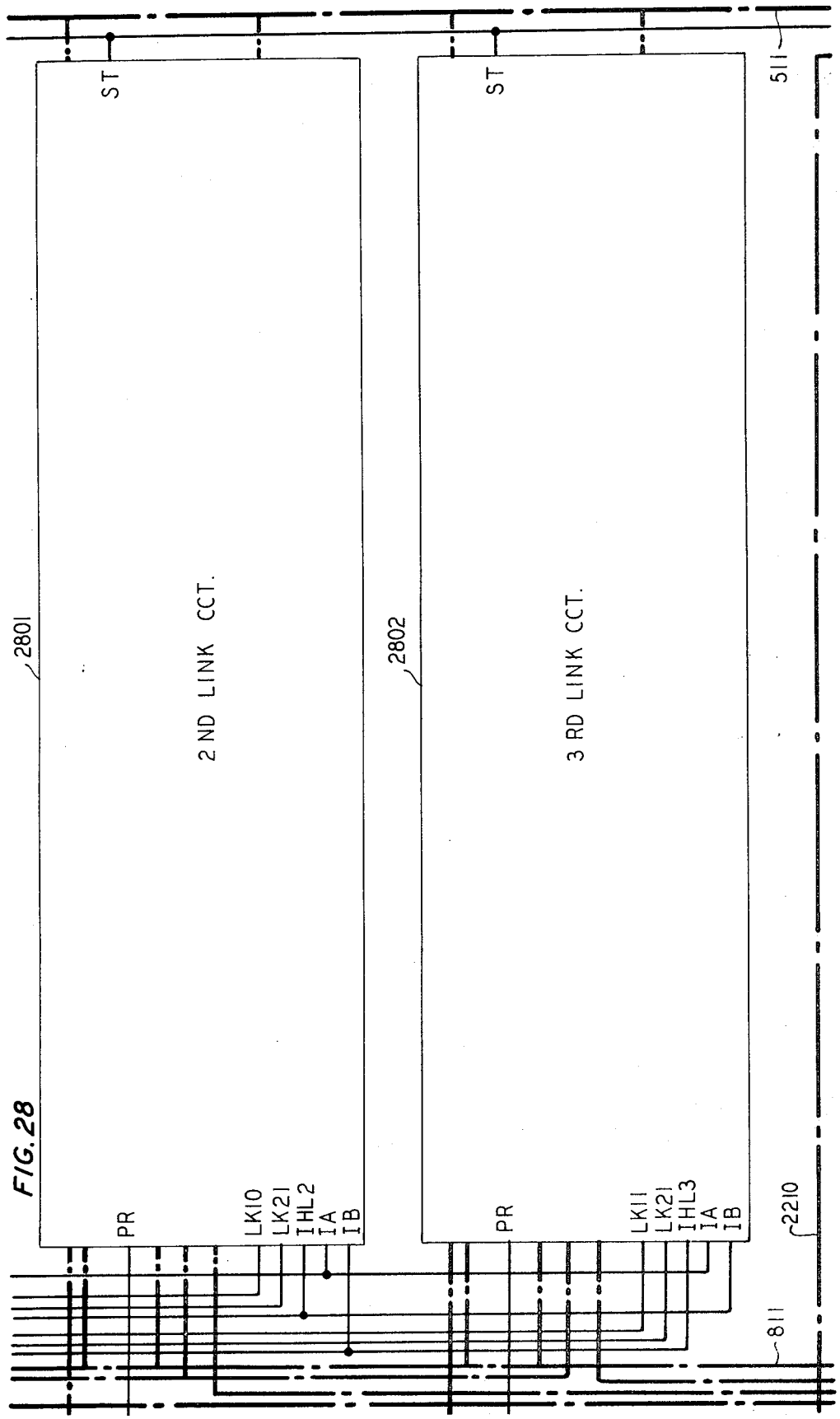

Turning now to the 1st link circuit 2501, FIG. 27, the leads LK11 and LK20 from cable 2111 are extended to transistor 27Q6 via the respective diodes 27CR11, and 27CR12, released break contact 26LB–6 and forward-biased diode 27CR13. When and only when both of the leads LK11 and LK20 are grounded, transistor 27Q6 turns on. Since both of these input leads have ground thereon from the binary counter in FIG. 21, the corresponding leads in the 2d and 3d link circuits 2801 and 2802 have at least one negative potential on their respective LK– leads thereby maintaining the 27Q6 transistors (not shown) in each of the other link circuits off. Accordingly, when transistor 27Q6 in the 1st link circuit 2501, FIG. 27, turns on negative potential is coupled to output lead IHL1 of cable 2111 which negative potential is extended to the register circuit 1901. FIG. 21, thereby stopping pulse shaper 2103 so as to maintain the binary counter 2102 in the counting state associated with the 1st link. Thus at this point the 1st link circuit is waiting to serve the next calling station. Only when a link circuit is in this waiting or available mode will a connection be made involving that link.

Continuing in FIG. 27, when transistor 27Q6 in the 1st link circuit 2501 turns on, battery is supplied to one side of the 27EL relay winding. The other side of the 27EL relay winding is connected via diode 27CR6 to transistor 27Q7 which transistor is off at this time. The winding is also connected via diode 27CR8 to lead SR which lead extends back via cable 2110 to the register 1901, FIG. 21, to ground through the parallel combination of make contacts 19SR–4 and 20RB–5. Thus, the 27EL relay in the selected link circuit is inoperative until either the 19SR relay or the 20RB relay in the register circuit 1901 becomes enabled, or when transistor 27Q7 in the link circuit turns on.

Turning now to FIG. 21, in the manner to be more fully detailed hereinafter, when the register circuit is seized by a calling station circuit the 19SR relay operates thereby providing a ground on lead SR which ground is extended to all of the link circuits. Since the 27Q6 transistor is on in the 1st link circuit the associated 27EL relay operates. The operation of relay 27EL causes the operation of relay 26EL1 which relay operates as shown in FIG. 26 from ground via enabled make contact 27EL–6.

The operation of relays 26EL1 and 27EL1 places the link circuit in the enabled condition and the link circuit will remain in this mode as long as the register is attached thereto. This link circuit is in the enabled condition only during the period during which a call is being processed and while in this mode certain input leads are cut through to the register.

Figure 25:
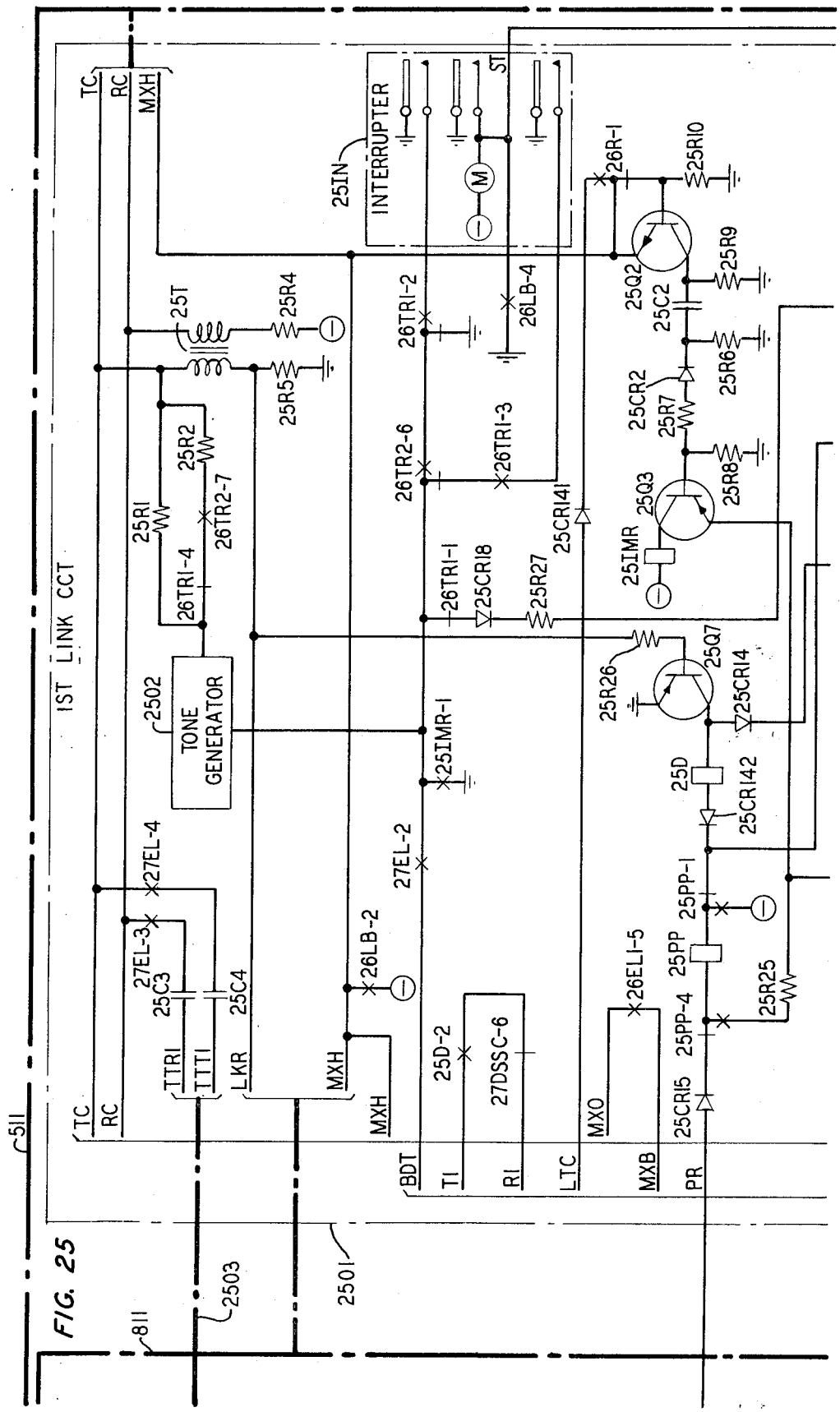
Figure 26:
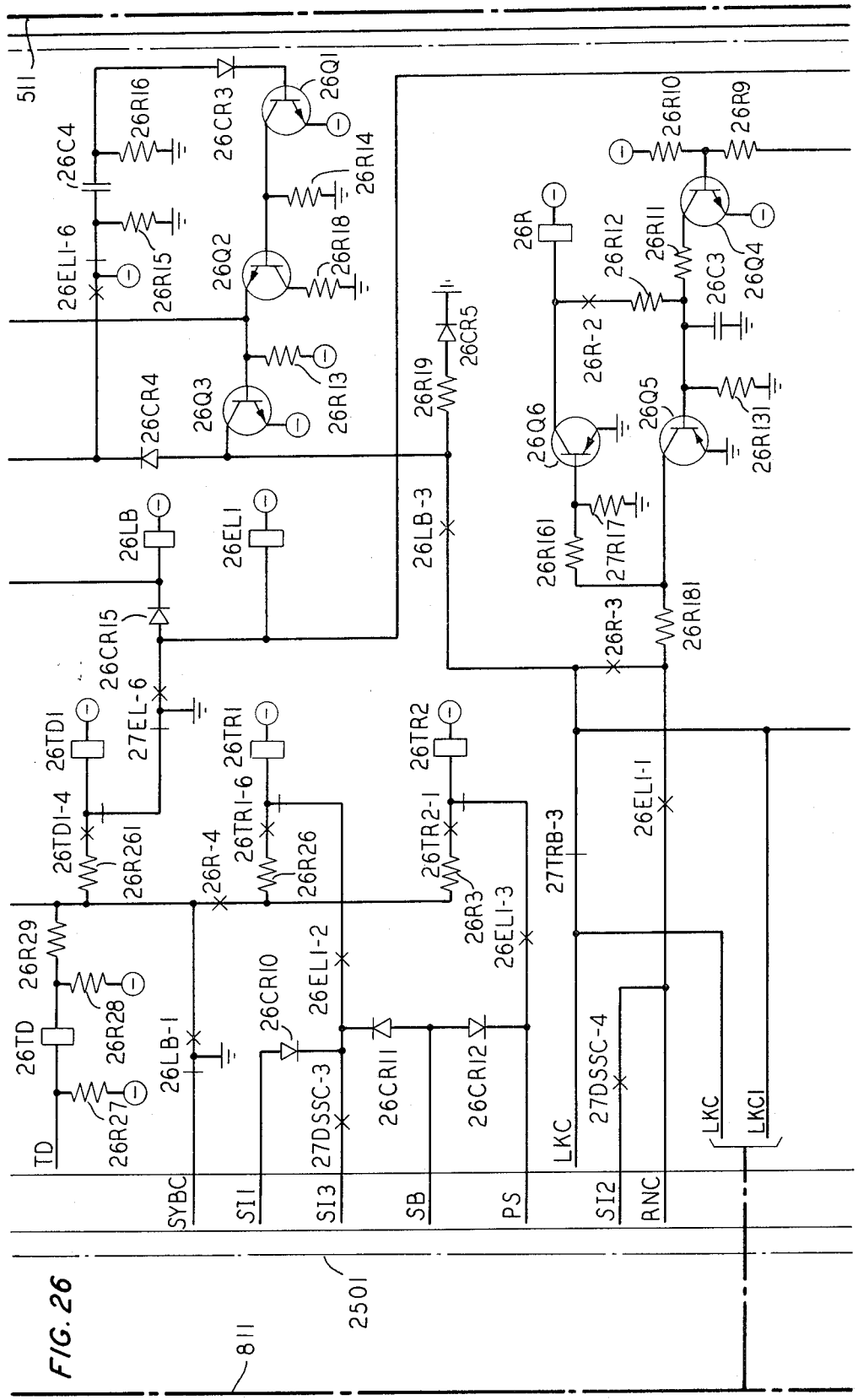

In the manner to be more fully detailed hereinafter, when the call processes beyond the establishment stage the 27EL and 26EL1 relays become released thereby transferring the link circuit from the enabled condition to the busy condition which condition is controlled by the status of the 26LB relay.

oCntinuing in FIG. 26, it will be noted that relay 26LB operates from ground via enabled make contact 27EL–6 and forward-biased diode 26CR15. The 26B relay has an auxiliary operate path from FIG. 25 via diode 25CR14 and the enabled condition of transistor 25Q7 which transistor as will be seen from that which is contained hereinafter is maintained in its on condition from loop current flowing through resistor 25R5. Resistor 25R5 is a battery-feed resistor to a connected station and thus as long as any station is connected to the link circuit current will flow through resistor 25R5 and maintain transistor 25Q7 on thereby maintaining relay 26LB operated. Note that diode 26CR15 separates the hold condition of the 26LB relay from the operate condition of the 26EL1 relay so that the 26EL1 relay is free to follow the operational status of the 27EL relay via make contact 27EL–6. Accordingly, relay 26LB is the relay in each link circuit which monitors its busy-idle status.

As shown in FIG. 26, ground present on lead SYBC via released break contact 26LB–1 signifies the idle condition of the associated link. Since lead SYBC is multipled to all link circuits, the absence of ground on the SYBC lead is an indication that all links are busy. The SYBC lead is extended via cable 2110 to the register circuit, FIG. 21, and to the base of transistor 21Q12. When ground is absent from lead SYBC the 21Q1 transistor turns on thereby operating relay 21SYB. Accordingly, the operated condition of the 21SYB relay signifies as discussed hereinbefore that the link circuits are all busy.

Turning now to FIG. 27, the operation of relay 26LB opens the link-selecting leads LK– via enabled break contact 26LB–6. However, transistor 27Q6 will remain on from ground on the SR lead through enabled make contact 27EL–5, resistor 27R29 and diode 27CR13. Thus, the 1st link circuit, once seized by the register, will remain under control of the register until released.

It should be noted that each link circuit is connected to the other link circuits via the respective IA and IB leads such that if battery appears on the IHL– lead of any of the other registers (signifyng a turned on 27Q6 transistor in the other link) the 27Q6 transistor of the selected link would remain off even if both LK– leads are grounded. This provision ensures that one and only one link is enabled at a time thereby preventing simultaneous connections through two or more links of the matrix network.

2.3 Establishment of a connection through the matrix network from the calling station to the register After the calling station seizes the register the 17A relay in the associated station circuit is operated as discussed above. At this point the register is prevented from being seized by any other station circuit because of the priority chain circuit also described above. However, since the register is common to all of the station circuits there remains the problem of establishing a linkage connection through the matrix switching network from the register to the calling station via the calling station circuit. The circuitry to accomplish this function will now be described, starting with the calling station circuit 1501, FIG. 17.

When relay 17A operates upon seizure of the idle register, ground via released break contact 17B–1, enabled make contact 17A–2 and forward-biased diode 17CR9 is extended via forward-biased diodes 17CR10 and 17CR11 over leads C3 and C4 and cable 1701 to the register 1901, FIG. 19, thereby providing operate grounds for relays (Y3) and (Y4) in selector 1902. It should be noted that the combination of grounds on the C1–C5 leads, FIG. 19, from the station circuit is uniquely associated with each station circuit in such a manner that the ground combinations are unique for each station circuit. Thus a translation of the respective grounded C– leads results in determining which of the station circuits has seized the register circuit. This translation is accomplished, as will be seen from that which is to follow by the contacts of the (Y–) relays (shown in FIG. 22).

Continuing in FIG. 19, ground extended from the calling station circuit over the C3 lead is extended via forward-biased diode 19CR4 to the resistor and Zener diode combination 19R1, 19R2, 19R3, and 19CR7, such that proper voltage potential is available to turn on transistor 19Q1 thereby operating relay 19SR to ground via released break contact 20RB–6. When relay 19SR operates it locks operated via its own make contact 19SR–5, forward-biased diode 19CR16 and resistor 19R5. Relay 19SR operating provides a ground via enabled make contact 19SR–5 and forward-biased diode 19CR17 to operate relay 19CP.

At this time selector 1902 input leads T and R are shorted together via enabled make contact 19SR–2 while the input is effectively disassociated from the link circuits via enabled break contact 19CP–3. Accordingly, the selector 1902 is enabled in the manner set forth in the above-mentioned Morse patent such that the (B) relay therein becomes operated. Upon the enabling of the (B) relay the (Y–) relays associated with the grounded C– leads operate. Since the 1st station circuit has seized the register 1901 and since the C3 and C4 leads are grounded, relays (Y3) and (Y4) operate. It will be noted that the (Y–) relay operation is forced, or jam set, from the coded leads associated with the station circuit and do not represent translated dialed pulses as described in the above-mentioned Morse patent. The jam setting of the (Y–) relays is necessary at this point to specifically identify the calling station so that the register circuit, in a manner to be detailed hereinafter, may establish a connection through an idle link of the matrix network to the calling station.

Figure 17:
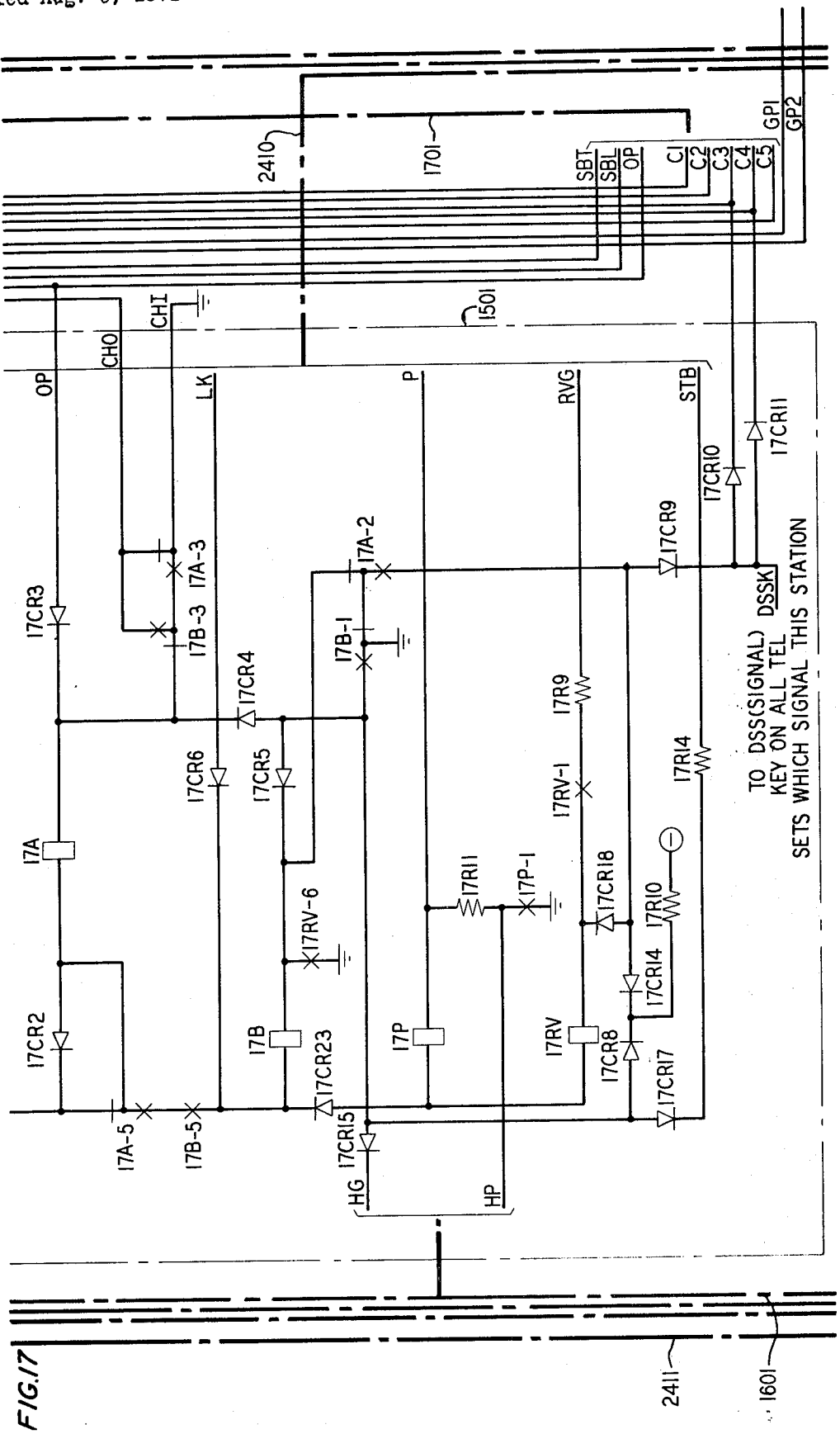
Figure 22:
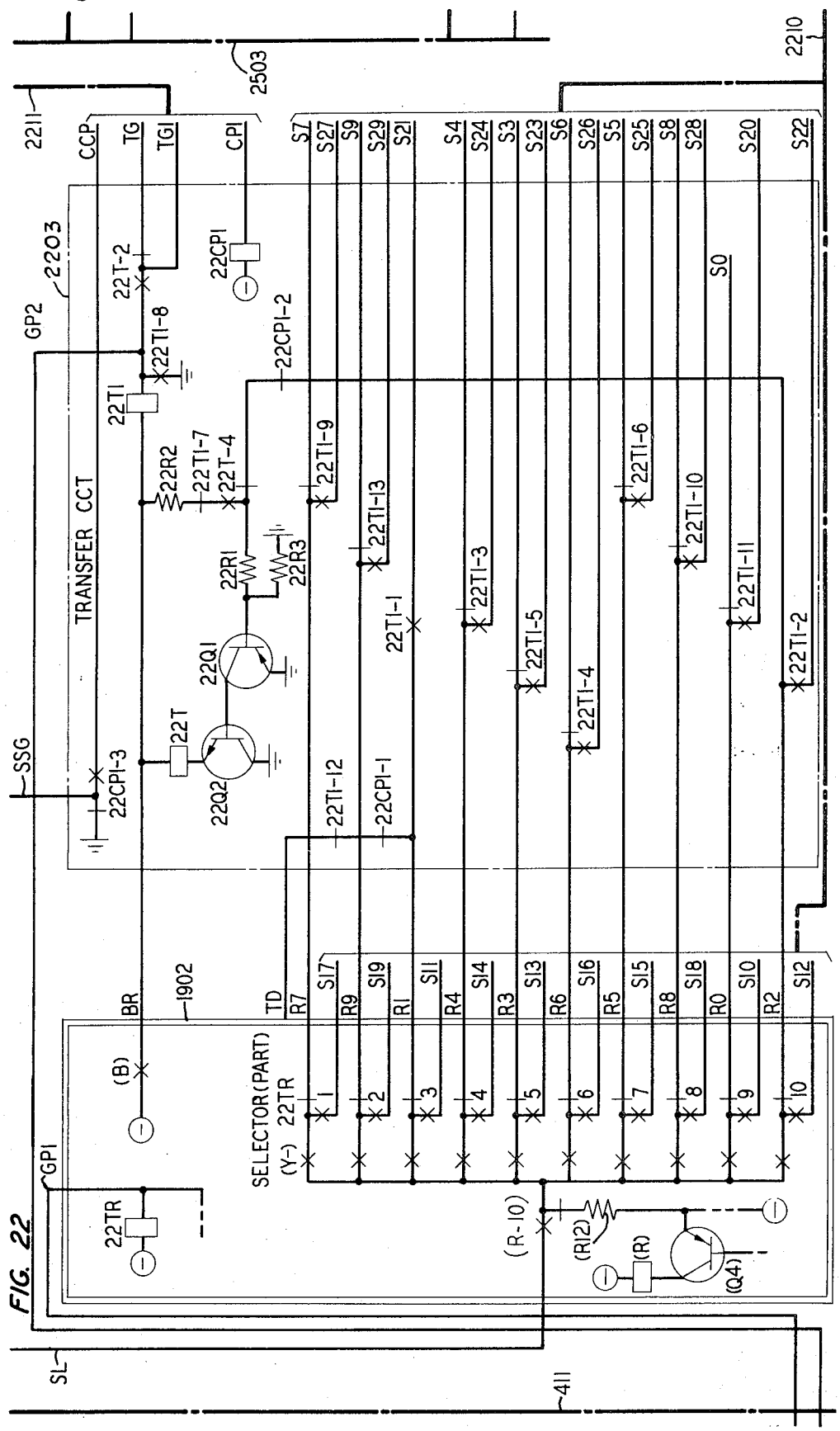

Turning now to FIG. 22, the contacts of the (Y–) relays of the selector 1902 form a relay tree in a well-known manner to translate the output of the operated (Y–) relays such that selector input lead SL becomes connected to one-out-of-ten leads R0 through R9, dependent upon which digit is represented by the (Y–) relays. Selector translation circuit of the Morse patent has been expanded by the addition of transfer relays 22TR and 22T1 controlled by transfer circuit 2203 in such a manner that the ten outputs (R0–R9) which would normally be available are expanded to an output possibility of twenty-seven. The exact selected output is dependent upon the operational status of the transfer circuit and the transfer relays. These elements in turn operate under control of group leads, such as leads GP1 and GP2 from the station circuit (FIG. 17). The station circuits in the group of circuits coded between 3 and 9 have no group lead and thus no transfer relays operate when one of these stations signals a connection. The station circuits coded between 10 and 19 have the GP1 lead grounded thereby controlling the 22TR relay, while the station circuits from the group of circuits coded between 20 and 29 have the GP2 lead grounded thereby controlling the 22T1 relay.

Continuing now in FIG. 22, since the calling station is in the lowest group, the transfer elements are normal and the (Y3) and (Y4) relay contacts are operated (corresponding to the digit 3) in such a manner that lead SL is extended through the selector 1902 to lead R3 and through the transfer circuit 2203 to lead S3. The purpose of using the digit 3 for the 1st station will become clear from that which is contained hereinafter. Lead S3 is associated with the 1st station circuit and thus with the 1st switching matrix. This lead is extended via cable 2210 to FIG. 30 and through the 1st matrix and all three links thereof to FIG. 24.

Figure 24:
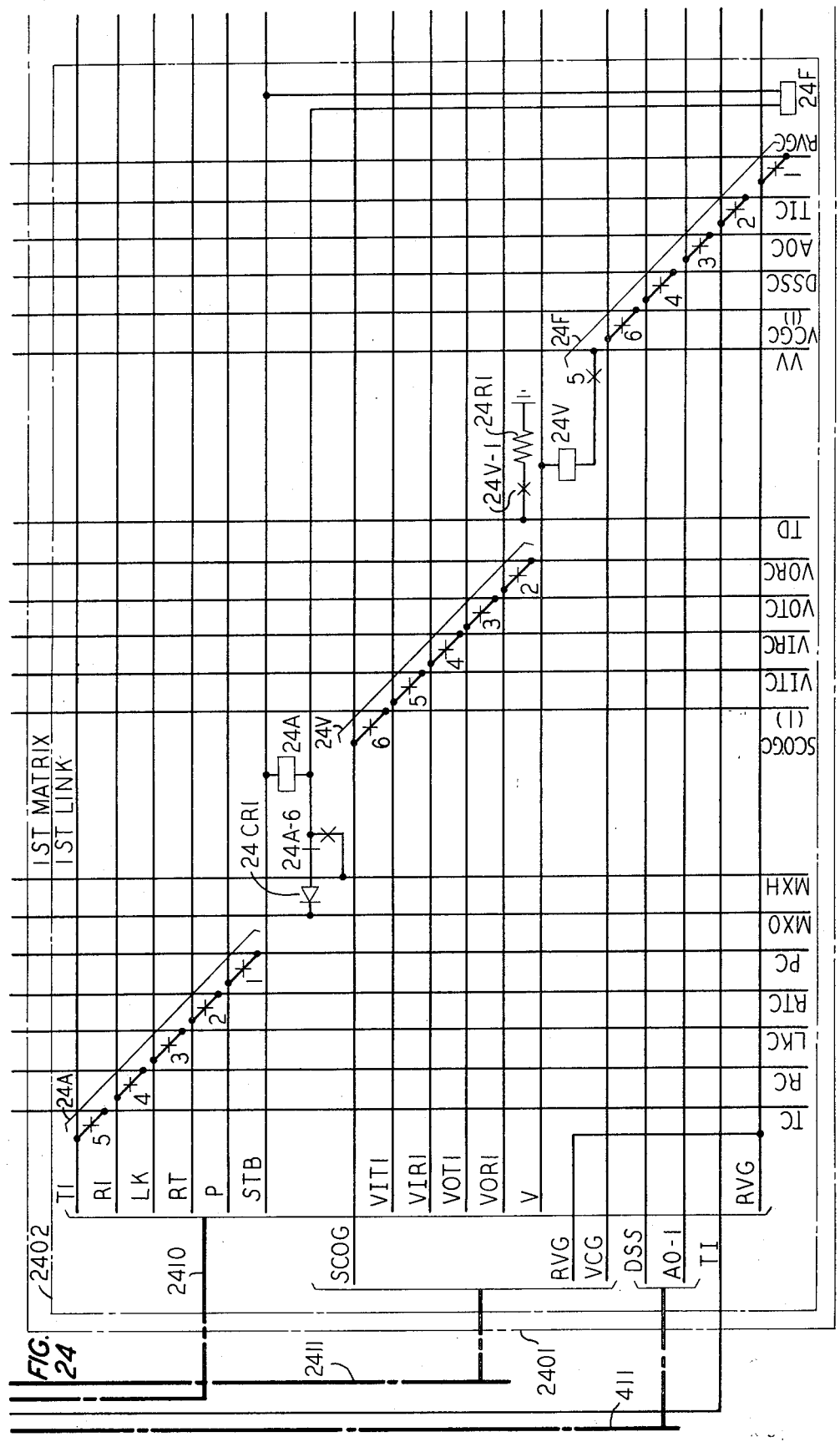

As shown in FIG. 24, lead S3 is connected to one side of the winding of the 1st link, 1st matrix relay 24A. Lead STB from cable 2410 and FIG. 17 is also connected to the same side of the 24A relay winding and thus any potential on the STB lead is also extended over lead S3. Accordingly, the S3 lead which has been extended from the selector 1902 in response to the jam setting of the (Y–) relays therein corresponding to the calling station now monitors the operational status of the calling station as determined from the voltage potential on the windings of all of the link relays associated with the 1st matrix.

Lead STB is not grounded at this time since the calling station is not currently engaged in a connection. This condition may be seen in FIG. 17 where lead STB is extended back through resistor 17R14 and diode 17CR17 to released make contact 17B–1 of relay 17B which relay is normal. The aforementioned path is essentially open from ground at this time. This open condition is projected back over the just-described path to the switching matrix, FIGS. 24 and 30, and over lead S3 to the selector circuit 1902, FIG. 22. This condition is then extended over lead SL to FIG. 21 and via a released break contact 21SI–1 and resistor 21R1 to the base of transistor 21Q1. Accordingly, transistor 21Q1 does not operate at this time, thereby signifying that the tested matrix is idle.

Returning now to FIG. 19, after the (Y–) relays operate in the selector circuit 1902 the (R) relay operates thereby providing a ground via an enabled make contact of the (R) relay to FIG. 20 over lead RL and through FIG. 20 to FIG. 21 to provide a ground to one side of the winding of relay 21SI. Since transistor 21Q1 is off (as a result of the detected idle condition of the 1st matrix) battery via resistor 21R4 is extended to the base of transistor 21Q4. Ground on the emitter of transistor 21Q4 from lead RL causes that transistor to turn on thereby turning on transistor 21Q5 so as to operate relay 21SI to ground on the RL lead. Relay 21SI locks operated at this time to battery via enabled make contacts 21SR–3 and 21SI–5 and resistor 21R12. Relay 21SI operating provides ground via enabled make contact 21SI–2 and lead SI3 and battery via enabled make contact 21SI–4 over leads SI2, and MXB of cable 2110 to FIGS. 25, 26, and 27 to the link circuits.

Since it has been assumed that the 1st link circuit 2501 is the next available link, these potentials on leads SI3, SI2, and MXB are extended thereto via the enabled 27EL and 26EL1 relays therein.

Figure 23:
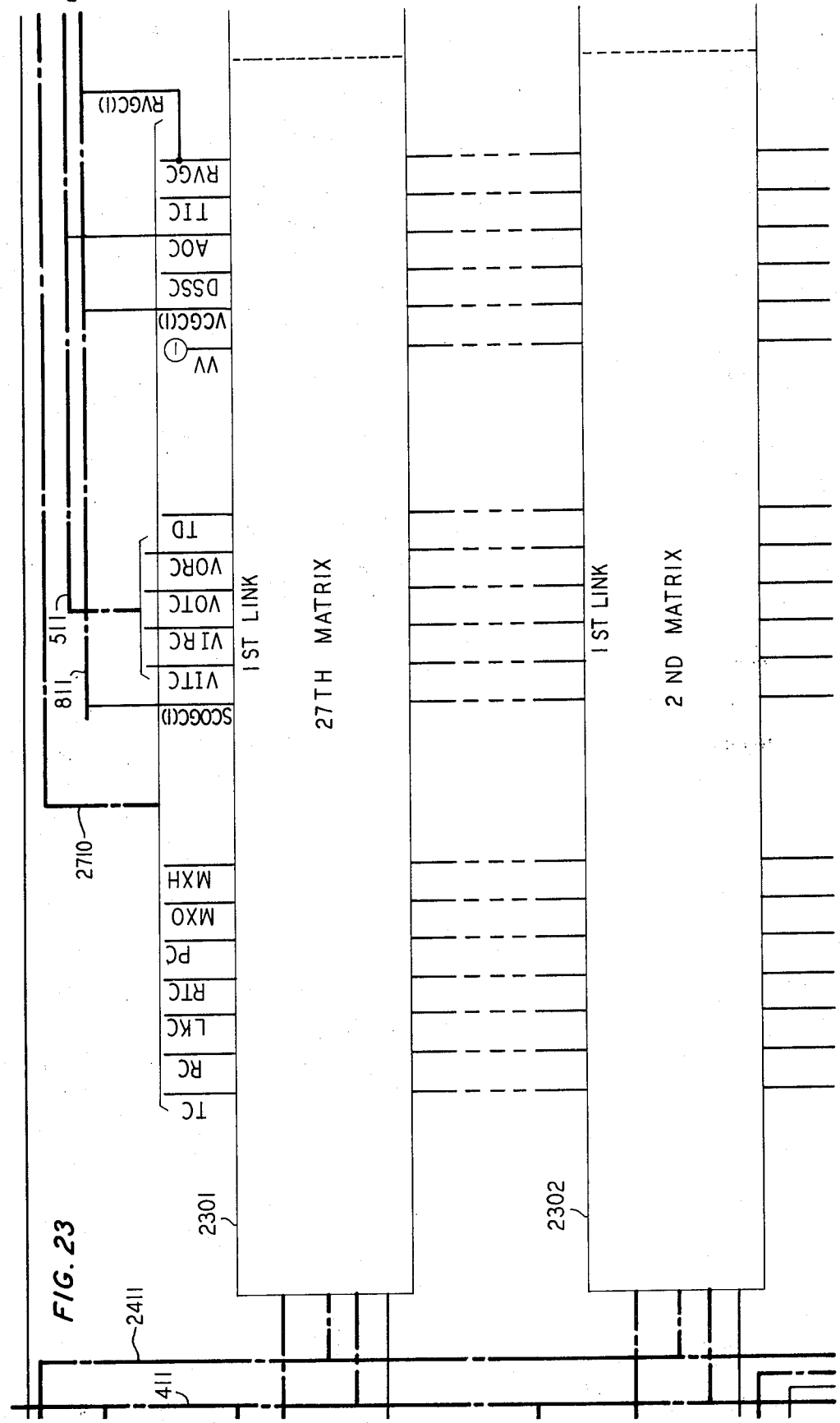

Turning to FIG. 25, battery received on the MXB lead is extended via enabled make contact 26EL1–5 and over lead MXO and cable 2710 (shown in FIG. 27) to FIG. 23 and the vertical multiple MXO through all of the matrix networks associated with the 1st link. Thus, as shown in FIG. 24, the battery on vertical multiple MXO is extended via forward-biased diode 24CR1 and released break contact 24A–6 to one side of the winding of relay 24A. The 24A relay now operates to ground on the other side of the winding which ground has been extended via the horizontal multiple lead S3 (STB). Relay 24F in the matrix also operates at this time. The S3 lead extends, as discussed above, through the 1st matrix and all three links thereof (FIG. 30) and via cable 2210 to FIG. 22 through selector 1902 and the enabled (Y–) and (R–) relays therein and over lead SL to FIG. 21 and via enabled make contact 21SI–1 to FIG. 22 and through enabled make contact 22CP1–3 and lead CCP of cable 2211 to FIG. 19 to the summing point of the C1–C3 leads. Since the C3 lead is grounded, ground is extended over the just-described path to operate the matrix relay 24A.

Turning now to FIG. 26 an examination of the 1st link circuit 2501 reveals that battery is extended to lead LKC, cable 2710 from released break contact 27TRB–3, enabled make contact 26LB–3, forward-biased diode 26CR4 and enabled make contact 26EL1–6. This battery is extended to the matrix network, FIGS. 23 and 24, to vertical multiple LKC, and via enabled 1st matrix contact 24A–3, FIG. 24, over horizontal multiple LK back via cable 2410 to the enabling 1st station circuit, FIG. 17.

Continuing in FIG. 17, this battery is extended via lead LK and forward-biased diode 17CR6 to one side of the winding of relay 17B. However, relay 17B remains normal at this time since the other side of the winding is essentially open.

Battery on the winding of relay 17B is also extended via forward-biased diode 17CR23 to one side of windings of each of the relays 17P and 17RV. Relay 17RV operates at this time to ground on the other side of its winding via forward-biased diode 17CR18, enabled make contact 17A–2 and released break contact 17B–1. When the 17RV relay operates ground is extended via enabled make contact 17RV–6 to operate relay 17B. The operation of relay 17B causes the removal of ground from the coding leads C3 and C4 via now enabled break contact 17B–1. Ground is extended via enabled make contact 17B–1, diode 17CR17, and resistor 17R14 over lead STB to hold matrix relays 24A and 24F operated.

Relay 17RV remains operated at this point via enabled make contact 17RV–1 and resistor 17R9 to ground on lead RVG which ground is extended via cable 2410 from the 1st matrix, FIG. 24, and horizontal multiple RVG. As shown in FIG. 24, horizontal multiple RVG is now connected to vertical multiple RVGC via enabled 1st matrix, 1st link contact 24F–1 (the 24F relay operated in parallel with relay 24A). Vertical multiple RVGC is extended via cable 2710 to the 1st link circuit 2501, FIG. 27, to ground via released break contact 27TRB–2. Relay 17B, FIG. 17, also has a holding ground via enabled make contact 17B–1 and diode 17CR5 and thus remains operated. At this time the chaining ground from lead CHI, which had been removed upon operation of relay 17A from lead CHO, is reestablished on lead CHO via now enabled make contact 17B–3 since relay 17A remains operated from ground via enabled make contact 17B–1 and forward-biased diode 17CR4. Thus any other station circuit is now free to bid for the register circuit when the register becomes available.

Turning now to the register circuit 1901, FIG. 19, the removal of ground from the coding leads C3 and C4 from the calling station circuit allows transistor 19Q1 to turn off thereby releasing relay 19SR. Selector 1902 is thereby also released via released make contact 19SR–2 and the now open condition of the T and R leads extending to the selector.

It will be recalled that when relay 19SR operated initially, relay 19CP operated from ground via enabled make contact 19SR–5 and forward-biased diode 19CR17. Relay 19CP remains operated at this time via resistor 19R6 and enabled make contact 19CP–6 to ground via the (B) relay in the selector 1902. Thus, relay 19CP will remain operated until the selector 1902 has released completely, as determined by the release of the (A) and (B) relays therein. Since the 19CP relay does not release until after the complete release of the selector, as just discussed, the T1 lead from the selector which lead extends through break contact 19CP–3, is not cut through to the link circuit until the selector is released.

When relay 19CP releases leads T1 and R1 are cut through to the enabled link circuit via cable 2110 to FIGS 25, 26, and 27. As shown in FIG. 26, battery is extended through enabled make contact 26EL1–6 to FIG. 25 and forward-biased diode 25CR142 to one side of the winding of relay 25D. The other side of the winding is connected to turned on transistor 25Q7. Transistor 25Q7 is on at this time from loop current flowing through resistor 25R5, through the winding of transformer 25T over lead TC and cable 2710 and through the matrix circuit, FIGS. 23 and 24, and enabled make matrix contact 24A–5 and lead T1 and cable 2410 through the 1st station circuit lead T1, FIG. 15, enabled make contact 17A–1 and lead T via leads RT5–1 and cable 411 back to the calling 1st station, FIG. 3, and through the enabled network and dial 303 therein. This loop is completed from network and dial 303 back through the same path to FIG. 15 via the R lead and via enabled make contact 17B–2 and leads R1 through the matrix network, FIGS. 23 and 24, and cable 2710 back to FIG. 25, lead RC and through transformer 25T to battery through resistor 25R4.

Thus a voltage is present across resistor 25R5 which causes transistor 25Q7 to turn on thereby operating relay 25D. Accordingly, when leads T1 and R1 are extended from the selector circuit via cable 2110 from FIG. 19 a short exists, as shown on FIG. 25, from lead T1 to lead R1 via enabled make contact 25D–2 and released break contact 27DSSC–6. The short across these leads reseizes the selector 1902 in the register 1901, FIG. 19 in preparation for receipt from the calling station, of the code associated with the desired called station.

Continuing now in FIG. 25, tone generator 2502 is arranged in any one of the well-known circuit configurations operable to supply specific tones on a transmission lead in response to voltage potentials, such as ground, applied to an input, the level of the tone being controlled by a selected output resistor, such as resistor 25R1 or resistor 25R2. When the selector 1902, FIG. 19, is reseized ground is provided on lead BDT from the enabled (A) contact, released break contacts 19BDT–1 and 19CP–5. This ground is extended to the link circuit, FIG. 25, and via enabled make contact 27EL–2 to turn on the tone generator 2502. Thus, tone is supplied via resistor 25R1 and over lead TC and back through the previously described linkage connection to the calling station 301 in FIG. 3. Upon receipt of the dial tone the calling subscriber thereupon begins to dial or key pulse the digits associated with the called station.

Upon receipt of the first digit, ground is removed from lead BDT, FIG. 19, thereby inhibiting dial tone, which tone is permanently removed by the operation of relay 19BDT on the first "break" of relay (A) in the selector. The attached register circuit is capable of receiving either dial pulses from the standard rotary dial or Touch-Tone type frequency dialing from a key dialer. As has become standard practice in wideband communication whenever a wideband connection is desired the # digit, which digit is generated upon operation of one of the two extra keys of a 12-key Touch-Tone type dialer, is operated prior to the operation of the digits of the called station.

Returning now to FIG. 3, the digits corresponding to the called station are transmitted via leads RT5–1 over cable 411 to FIG. 15 and via leads T and R and the now operated make contacts 17A–1, 17B–2, and over leads T1 and R1 and cable 2410 to FIG. 24 and via the enabled 24A relay of the 1st matrix, 1st link circuit to leads TC and RC, FIG. 23, and via cable 2710 to FIG. 25, the associated link circuit, and via enabled make contacts 27EL–3 and 27EL–4 and capacitors 25C3 and 25C4 over leads TTR1 and TTT1 and cable 2503 to FIG. 19 to the input of Touch-Tone adapter 1904. Touch-Tone adapter 2201 is arranged in any one of the well-known circuit configurations operable to translate frequencies received on a pair of input leads to voltage potentials or grounds on a particular set of leads corresponding to the particular frequencies received. Thus, since the first digit transmitted in the case of a wideband connection is the # digit, a ground is provided on lead PR of Touch-Tone adapter 1904. This ground is extended to FIG. 25 and through forward-biased diode 25CR15 and released break contact 25PP–4 to one side of the 25PP relay winding. The other side of the 25PP relay winding is connected to battery via released break contact 25PP–1 and the lead extending from FIG. 26 and enabled make contact 26EL1–6. The 25PP relay thereupon operates and locks operated to battery via enabled make contact 25PP–1 to one side of the 25PP relay winding while the other side of the winding is connected to ground via enabled make contact 25PP–4 and resistor 25R25 and the lead to FIG. 26 from enabled make contact 26LB–1. The operation of relay 25PP in response to the key pulsing of the # digit from the calling subscriber prepares the selected link circuit in the manner to be more fully detailed hereinafter to accept the dialed digits and to handle the call in the wideband mode such that only two stations may be connected to the same link at the same time thereby ensuring continuous uninterrupted communications between the calling and called party.

Returning now to FIG. 22, the (Y–) relays of selector 1902 are now jam set under control of the Touch-Tone adapter 1904 corresponding to the next two dialed digits from the calling subscriber. Digressing momentarily and turning to FIG. 25, in the event the calling subscriber has a rotary dial the pulsed digits corresponding to the called station's number will be received by relay 25D which relay is arranged to follow dial pulses. These pulses are communicated to the selector via leads T1 and R1 and make contact 25D-2. Thus as shown on FIG. 19, the inputs T and R of selector 1902 pulses in response to the dialing of the calling subscriber which pulses are operative in a manner set forth in the aforementioned C. E. Morse patent to operate the (Y–) relays in accordance with the dialed digit. Accordingly, the (Y–) relays become set either in response to received dial pulses or in response to received and translated frequencies.

Continuing now in FIG. 22, the contacts of the (Y–) relays form a relay tree as discussed previously such that lead SL is extended through the enabled (R) relay contact and through the enabled (Y–) relay contacts to the proper lead corresponding to the called station which we assume to be the 27th station 201. Since the first dialed or key pulsed digit of the 27th station would be the digit 2 the R2 lead of selector 1902 is extended to transfer circuit 2203 and via released break contacts 22T1-2, 22CP1-2, and 22T-4 and resistor 22R1 to the base of transistor 22Q1. The R2 lead is extended through the operated contacts of the selector to the break contact of the (R) relay to a source of negative potential. The (R) relay is normal when the (Y–) relays operate because of a slow operate condition. This negative potential turns on transistor 22Q1 turning on transistor 22Q2 thereby operating relay 22T. Relay 22T operating connects the coil of relay 22T1 to lead TG1 which lead is extended via cable 2211 to FIG. 19 to ground via released break contact 19SR-1. Thus, relay 22T1 operates at this time.

Digressing momentarily, it should be noted that since the stations coded from 20 to 29 all begin with the digit 2 and since when the digit 2 is the first digit dialed the transfer relay 22T1 operates as just described, it is imperative that no station other than those coded between 20 and 29 have 2 as a first digit. Also, with respect to those stations coded between 10 and 19 which have the digit 1 as a first number the same transfer function occurs (operation of relay 22TR) with respect to potentials extended on lead R1 and accordingly no station other than those coded between 10 and 19 may begin with the digit 1. Therefore, the 1st station is designated with code 3 and the 2nd station is designated with code 4.

Returning now to FIG. 22, when the first digit 2 is dialed the 22T and 22T1 relays operate as discussed above. Accordingly, ground which had been extended from the register circuit, FIG. 19, released break contact 19SR-1 over lead TG1 and cable 2211 and through released break contact 22T-2 over lead TG is now broken via enabled break contact 22T-2. Following lead TG in cable 2211 back to FIG. 19 it will be seen that the (Y–) relays, which operated as a result of the dialed digits, are held operated from ground on the TG lead. Accordingly, after receipt of the first digit the ground is removed by the transfer circuit 2203 thereby releasing the (Y–) relays and preparing the selector circuit for receipt of the second digit which in this case would be the digit 9 since all stations have codes two numbers higher than their equipment designations.

Upon receipt of the digit 9, lead SL is cut through the selector 1902, enabled contacts (R) and (Y–), and released break contact 22TR-2 and over lead R9 to transfer circuit 2203 and via enabled make contact 22T1-13 and lead S29 of cable 2210 to the 27th matrix, FIG. 29, horizontal multiple S29. Thus the S29 horizontal multiple is extended, as shown in FIG. 24, to the coil of the matrix relays associated with the 27th matrix.

Turning again to FIG. 22, the SL lead which was cut through in the manner just described is extended to FIG. 21 to the busy-idle detector 2101 and to the base of the 21Q1 transistor therein. Busy-idle detector 2101 again performs a busy-idle test of the called matrix 27. Since the called matrix is assumed idle ground is not present on the matrix relays. This condition is extended back through lead S29 and FIG. 22 to busy-idle detector 2101 in FIG. 21 which busy-idle detector functions in the exact manner as detailed hereinbefore.

Continuing now in FIG. 21, since the matrix relay corresponding to the called station is idle, transistor 21Q1 remains off and relay 21SI operates. Ground is thereby extended via released break contact 22CP1-3 of transfer circuit 2203 and enabled make contact 21SI-1 of busy-idle detector 2101 back through the selector 1902 and transfer circuit 2203, FIG. 22, to operate the matrix relay associated with the 27th station (code 29) and with link 1. It is the link 1 relay as opposed to the relays associated with links 2 and 3 which operates at this time because of the negative potential on lead MXO via cable 2710 from the enabled first link circuit, FIG. 25, in the manner discussed previously.

Figure 14:
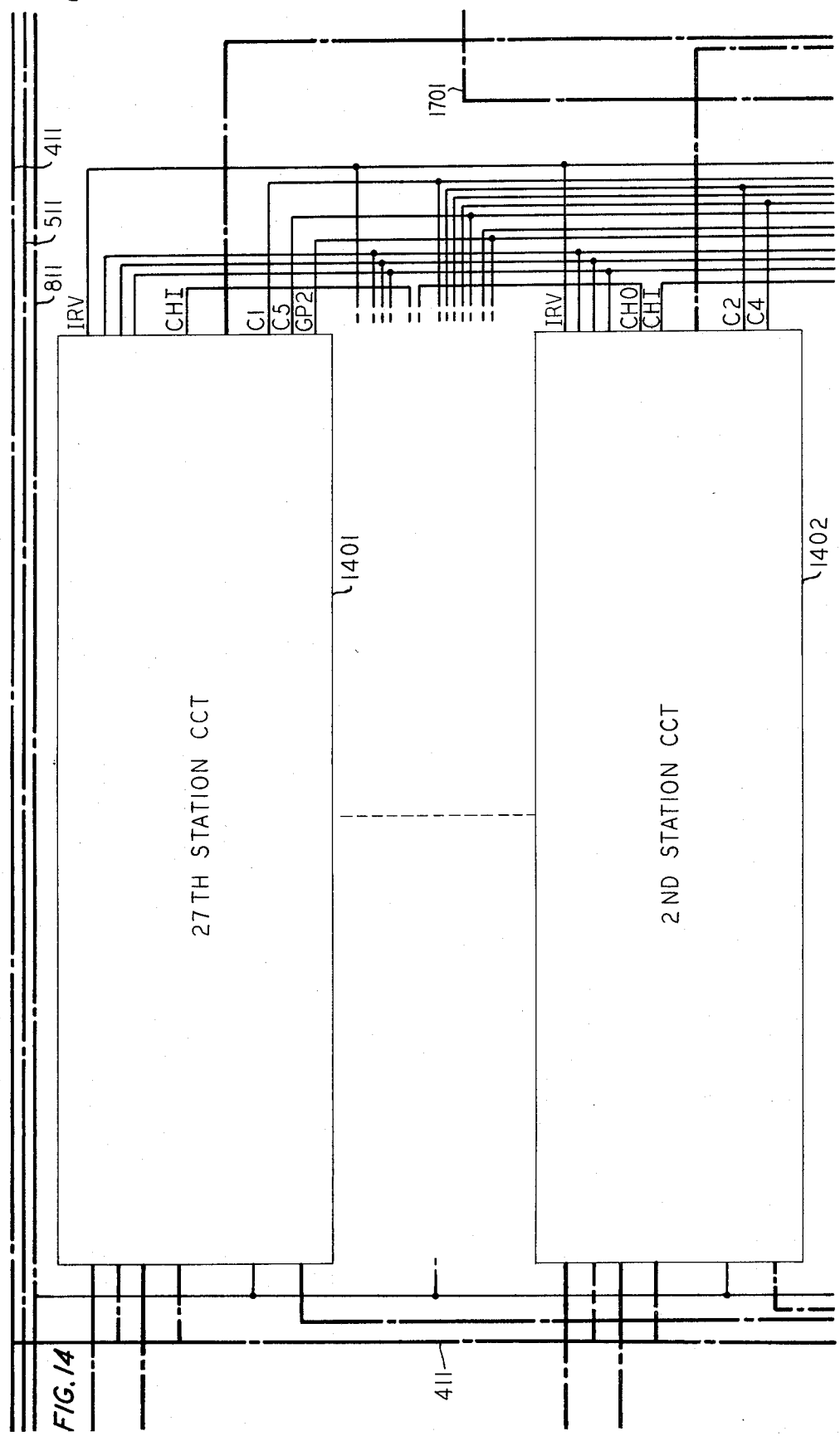

Continuing now in FIG. 23, negative potential which is on the horizontal multiple LKC in the manner discussed previously is extended through the now enabled matrix relay contact (corresponding to enabled make contact 24A-3, FIG. 24) and over the associated LK lead to FIG. 14 to operate the 17B relay in the called 27th station circuit which circuit is arranged in the exact manner as is the 1st station circuit, FIGS. 15, 16, and 17. For convenience, further reference to the 27th station circuit 1401 will be made with respect to the 1st station circuit 1501 with the understanding that the following described circuit operations occur in the 27th station circuit. Thus, negative potential is extended via lead LK shown in FIG. 17 through forward-biased diode 17CR6 to one side of the 17B relay winding. The other side of the winding is extended through released break contacts 17A-2 and 17B-1 to ground. The 17B relay now operates and locks operated from ground via enabled make contact 17B-1 and forward-biased diode 17CR5. Since in the called station the 17A relay is normal, ground is also extended at this time via enabled make contact 17B-1, forward-biased diode 17CR17, and resistor 17R14 over lead STB to the 27th switch matrix thereby holding the operated 24A and 24F relays in link 1 associated with the called 27th station. Since this call is a wideband call as discussed previously, ground is on lead P of both the calling and called station circuits, FIG. 17, from the 1st and 27th matrix networks and enabled make contact 24A-1 and vertical multiple PC and cable 2710 from the 1st link circuit, FIG. 27, and released break contact 26TD1-3 and enabled make contact 25PP-3.

Continuing now in FIG. 17, ground on lead P operates relay 17P to battery which has been extended via forward-biased diodes 17CR23 and 17CR6 and the LK– lead as previously discussed. At this point the only relays operated in the called station circuit are relays 17B and 17P. Thus, as shown on FIG. 16 positive potential is extended via enabled make contacts 17P-3 and 17B-6 and released break contact 17A-6 and lead LH and cable 1601 to the associated hold circuit which in the case of the 27th station circuit is hold circuit 1801 and through the hold circuit and released break contact 18H-2 and th eassociated L5– lead which in this case would be L5-27 and cable 411 back to the called 27th station 201 and via the forward-biased diode 4P1– lead which in this case would be 4P1-27 to illuminate the red line L5 lamp therein at the 27th station.

Turning now to FIG. 27, ringing voltage is applied to the called line from ring source 2701 which ring source is arranged in any one of the well-known circuit configurations operable to provide periodic ringing voltage on a line via lead IRV to FIG. 14 and the 27th station circuit 1401. The path through the 27th station circuit may be seen in FIG. 15 with respect to the 1st station circuit 1501 where the ring source voltage on lead IRV is extended via enabled make contact 17B-4, released break contact 17A-4, and enabled make contact 17P-6, and the associated TR5– lead which in this case in TR5-27 and cable 411 back to FIG. 2 to enable the tone ringer in the called 27th station 201. It will be noted that the tone ringer is enabled at this point as opposed to the enabling of the bell ringer as an indication that a Picturephone call has been directed to that station.

2.4 Extension of system tones to the calling station

After dialing has been completed, either one of two tones may be returned to the calling party. Audible ringing tone when the called station is idle and audible busy tone when the called station is busy. In addition, when dialing has not been completed within a certain interval permanent signal is returned to the calling subscriber. The extension of these tones through the switching matrix will now be discussed.

Turning to FIG. 21, it will be recalled that relay 21SI operated upon detecting the idle condition of the 27th matrix. Also at this time relay 19CP is unoperated since that relay operates only when the calling station first seizes the register circuit and releases, as discussed above, prior to receipt of the digits associated with the called station. Thus, at this point, ground is extended via enabled make contact 21SI-2, and released break contact 19CP-4 over lead SI1 and cable 2110 to FIG. 26 and via forward-biased diode 26CR10 and enabled make contact 26EL1-2 and released break contact 26TR-6 to operate relay 26TR1. The 26TR1 relay locks operated through enabled make contact 26TR1-6, resistor 26R26, enabled make contact 26R-4 to ground via enabled make contact 26LB-1. Relay 26R is operated at this time from turned on transistor 26Q6 which transistor has been turned on by battery extended to its base via resistors 26R161, 26R181, enabled make contact 26EL1-1, and lead RNC from FIG. 20. Battery is provided on lead RNC as shown in FIG. 20 at the completion of the calling interval or at the expiration of twelve seconds as determined from the seizure of the register. The circuitry for providing this battery will now be discussed.

When relay 19SR, FIG. 19, operates at the beginning of a call a control path to relay 20RB is established. The path used to initiate the operation of relay 20RB is from ground through enabled make contact 19SR-6, resistor 20R24, and turned on transistor 20Q8 which transistor completes an operate path for relay 20RB. Relay 20RB operates via a lead from relays (A) and (B) of selector 1902 when that selector is seized as herein previously described. When relay 20RB operates as described, a positive transient is coupled through capacitor 20C1 via enabled make contact 20RB-6 causing transistor 20Q6 to turn off for approximately twelve seconds as determined by capacitor 20C1 and resistor 20R20. After the timing interval as determined by capacitor 20C1 and resistor 20R20, transistor 20Q8 turns on thereby holding relay 20RB in the operated state when relay 19SR releases. During the release reseizure sequence of the selector relay 20RB remains operated because of the slow release network composed of capacitor 20C2 and resistor 20R26. If dialing has not been completed within the nominal twelve second timing period transistor 20Q6 turns on causing transistor 20Q7 to turn off thereby causing transistor 20Q4 to turn on. Transistor 20Q4 turns on from battery via resistor 20R16 while ground is on its emitter via varistor 20RV4 from selector 1902, FIG. 19. Ground is thereby supplied to lead PS which ground causes permanent signal tone, as will be described hereinafter, to be returned to the calling subscriber. Transistor 20Q4 turned on also turns on transistor 20Q5 from ground via forward-biased diode 20CR30 and resistor 20R15 to the base of transistor 20Q5. Transistor 20Q5 turning on extends battery via forward-biased diode 20CR37 and lead RNC to the enabled link circuit, FIG. 26, to operate the 26R relay therein in the manner previously discussed.

Returning to FIG. 20, when transistor 20Q7 turned off transistor 20Q8 also turned off thereby allowing relay 20RB to release in approximately ninety milliseconds. When relay 20RB releases, ground is removed from lead SR, FIG. 21, causing the enabled link circuit to release. Also selector 1902 in FIG. 19 is released at this time via released make contact 19SR-2.

In a situation where dialing is completed prior to the timeout just described, ground is extended from selector 1902, FIG. 19, over the enabled (B) and (R) contacts therein and lead RL to FIG. 20 and via released break contact 19CP-6, resistor 20R27, diode 20CR16, and resistor 20R14 to turn on transistor 20Q5 thereby extending battery over lead RNC so as to operate the 26R relay, FIG. 26, in the manner discussed above. The appearance of battery on lead RNC also causes current to flow through resistor 20R18 thereby effectively shortening to approximately 100 ms. the timing period through which transistor 20Q6 is clamped off. It should be noted, as shown in FIG. 20, the ground on the base of transistor 20Q5 from the selector circuit, FIG. 19, does not extend over the PS lead at this time because of the reverse-biased condition of diode 20CR30.

Continuing now in FIG. 21, in a situation where the called station is busy, negative potential will be present on lead SL to the busy-idle detector 2101, FIG. 21, causing transistor 21Q1 therein to turn on thereby turning on transistors 21Q2 and 21Q3. Transistor 21Q3 turning on extends ground via lead SB to the associated link circuit, FIG. 26, thereby enabling relay 26TR1 via forward-biased diode 26CR11, enabled make contact 26EL1-2 and released break contact 26TR1-6 while at the same time also enabling relay 26TR2 via forward-biased diode 26CR12, enabled make contact 26EL1-3 and released break contact 26TR2-1. Thus in a situation where a busy condition of the called station has been detected both of the relays 26TR1 and 26TR2 operate.

The generation of the actual tones transmitted back to the calling subscriber is accomplished by tone generator 2502 shown in FIG. 25 which tone generator operates in the manner previously described in response to ground potentials supplied on its input lead. The precise tone which is transmitted is controlled by the operational combination of the relays 26TR1 and 26TR2 such that when relay 26TR1 is operated singly, audible ringing tone is returned to the calling subscriber. This is accomplished by interrupted ground supplied by interrupter 25IN and enabled make contact 26TR1-3, released break contact 26TR2-6 to the input of tone generator 2502, the output of which is connected to lead TC via resistor 25R1 in the manner previously discussed. When both of the 26TR1 and TR2 relays are operated, which is the case when the called station is busy, pulsating ground is supplied from interrupter 25IN via enabled make contacts 26TR1-2 and 26TR2-6 to the tone generator 2502. It should be noted that the interruption rates of the aforementioned grounds are distinct thereby providing busy tone and ringing tone. When relay 26TR2 operates alone, thus signifying a time-out condition and a permanent signal, steady ground is extended via released break contact 26TR1-2, enabled make contact 26TR2-6 to tone generator 2502. At this time the output of the tone generator is connected via released break contact 26TR1-4 and enabled make contact 26TR2-7 and shunt resistor 25R2 to lead TC and back to the calling subscriber.

Since it is advantageous at the completion of the dialing interval to provide immediate tones to the calling subscriber provision has been made to begin the tone generation period immediately at the completion of dialing without regard to the status of the interrupter contacts. This function is accomplished as a result of the operation of the 26R relay previously described. As shown in FIG. 25, transistor 25Q2 turns on upon the operation of relay 26R thereby turning on transistor 25Q3 so as to operate relay 25IMR. The 25IMR relay remains operated under control of capacitor 25C2 for approximately one-half second. During the interval in which the 26IMR relay is operated steady ground is applied via enabled make contact 25IMR-1 to tone generator 2502.

2.5 Connection to the called station

If the called party answers within thirty seconds, a ground-going transient will appear on lead RTC, FIG. 27, from the matrix associated with the called station. This transient is generated by transistor 16Q3 in FIG. 16 which transistor momentarily turns on under control of capacitor 16C1 and resistors 16R6 and 16R7 when the called station goes off-hook in the manner previously described.

Returning now to FIG. 27, momentary ground on lead RTC is extended to FIG. 26 and resistor 26R9 to turn on transistor 26Q4. Battery is then extended via turned on transistor 26Q4 and resistor 26R11 to turn on transistor 26Q5. Transistor 26Q5 would turn off at the end of the transient except that a feedback path exists via resistor 26R11 to maintain on transistor 26Q5. Thus, transistor 26Q5 remains turned on by current flow from battery through the winding of relay 26R until that relay releases completely.

It will be recalled that when the register finished processing the connection the ground was removed from the SR lead, FIG. 21. Thus, as shown in FIG. 26, relay 27EL releases thereby also releasing relay 26EL1. At this point the register is free to handle other connections while the active link circuit changes from the busy mode to the unavailable mode with relay 26LB therein operated. Relay 26LB will remain operated as long as at least one station remains connected to the associated link. This follows since relay 26LB is controlled from ground extended from FIG. 25, diode 25CR14, and turned on transistor 25Q7 which transistor remains on under control of current flowing through the loop circuit from the subscriber stations and transformer 25T.

Stations which do not answer within a certain interval are released. The release is accomplished as follows. When relay 26EL1 releases, a negative potential is extended via released break contact 26EL1-6 thereby causing a negative transient via resistors 26R15 and 26R16 and capacitor 26C4, diode 26CR3 to turn transistor 26Q1 off and 26Q2 and 26Q3 on actually before the release of make contact 26EL1-6 thus maintaining battery on lead LKC via enabled make contact 26LB-3 and released break contact 27TRB-3. At this point the negative potential on lead LKC is dependent upon the time constant determined by capacitor 26C4 and resistor 26R16 which time constant is approximately thirty seconds. At the completion of the timed interval transistor 26Q1 turns on thereby turning off transistor 26Q2 and 26Q3 removing a negative potential from lead LKC thereby releasing the station circuits associated with stations which have not gone off-hook within the timed interval.

Since, the register is now free to handle other connections and since the 1st link circuit is unavailable at this point provision must be made for the register to seize an available link circuit upon the initiation of the next calling connection. As shown in FIG. 27, since relay 26LB remains operated while the link circuit is in the unavailable mode, the LK– leads to transistor 27Q6 are opened via enabled break contact 26LB-6. Prior to the point where the 27EL relay released ground was present via enabled make contact 27EL-5 and resistor 27R29 to maintain transistor 27Q6 on. When the 27EL relay releases, as discussed above when the register is finished processing the connection, the 27Q6 transistor turns off thereby removing the battery potential from lead IHL1 and thus allowing the pulse shaper 2103 in the register 1901, FIG. 21, again to begin pulsing causing the binary counter 2102 to again provide unique outputs sequentially until an available link is found. The counter will continue to pass over the 1st like circuit during such time that the associated link is busy because of the operated condition of the 26LB relay and enabled break contact 26LB-6 therein.

2.6 Transmission communication between the called and calling stations

Turning now to the 1st station circuit (calling station), FIG. 17, it will be recalled that battery appeared on the LK– lead upon establishment of the calling connection to the idle link. At that point, relays 17RV and 17B operated in the calling station circuit. As shown in FIG. 15, the video quad leads VOT1, VOR1, VIT1 and VIR1 are reversed at this time under control of the enabled transfer contacts 17RV-4, 17RV-3, 17RV-5, and 17RV-2. With respect to the called party, it will be recalled that when the called party went off-hook in response to an incoming call directed thereto the 16Q4 transistor turned on thereby enabling the 17A relay, FIG. 17, in the called station circuit. Since in the called station circuit, as shown in FIG. 17, the 17B relay operated prior to the operation of the 17A relay, the 17RV relay therein remained normal because of the enabled condition of break contact 17B-1. Thus, as shown in FIG. 17, the video quad leads VOT1, VOR1, VIT1, VIR1 of the called station are not reversed and are extended directly through the called station circuit leads VOTP, VORP, VITP, and VIRP, respectively.

Also it will be recalled that the 16Q2 transistor in both the calling and called station circuits turned on upon the respective stations going off-hook. Accordingly, the V leads from each of these station circuits have grounds thereon which grounds are extended over cable 2410 to the respective matrix networks, FIGS. 23 and 24, to operate the 24V matrix relays therein associated with the 1st link 1st station, and 1st link 27th station. It is the 1st link 24V relays which operate as opposed to the 24V relays (not shown) associated with the other links, because of the operated condition of the 1st link 24F relays and particularly contact 24F-5 thereof.

Turning now to FIG. 16, if the station circuit is currently in a Picturephone mode relay 17P will be operated in the station circuit and transistor 16Q4 would be on. Accordingly, battery would be extended from transistor 16Q4 to enabled make contact 17P-5, resistor 16R4 to turn on transistor 16Q2. Thus ground would be extended on lead V and also ground would be extended to FIG. 15 through resistor 15R3 turning on transistor 15Q1. Battery from the emitter of transistor 15Q1 would then be extended via resistor 15R2 over lead TOS1 and cable 411 back to FIG. 4 to the video control VC1-1 of the associated video set, such as video control VC1-1 of video set 401. Video control VC1-1 is arranged such that when battery has been extended thereto over the TOS– lead transmission is possible from associated camera C1-1 and to the associated screen S1-1.

Figure 11:
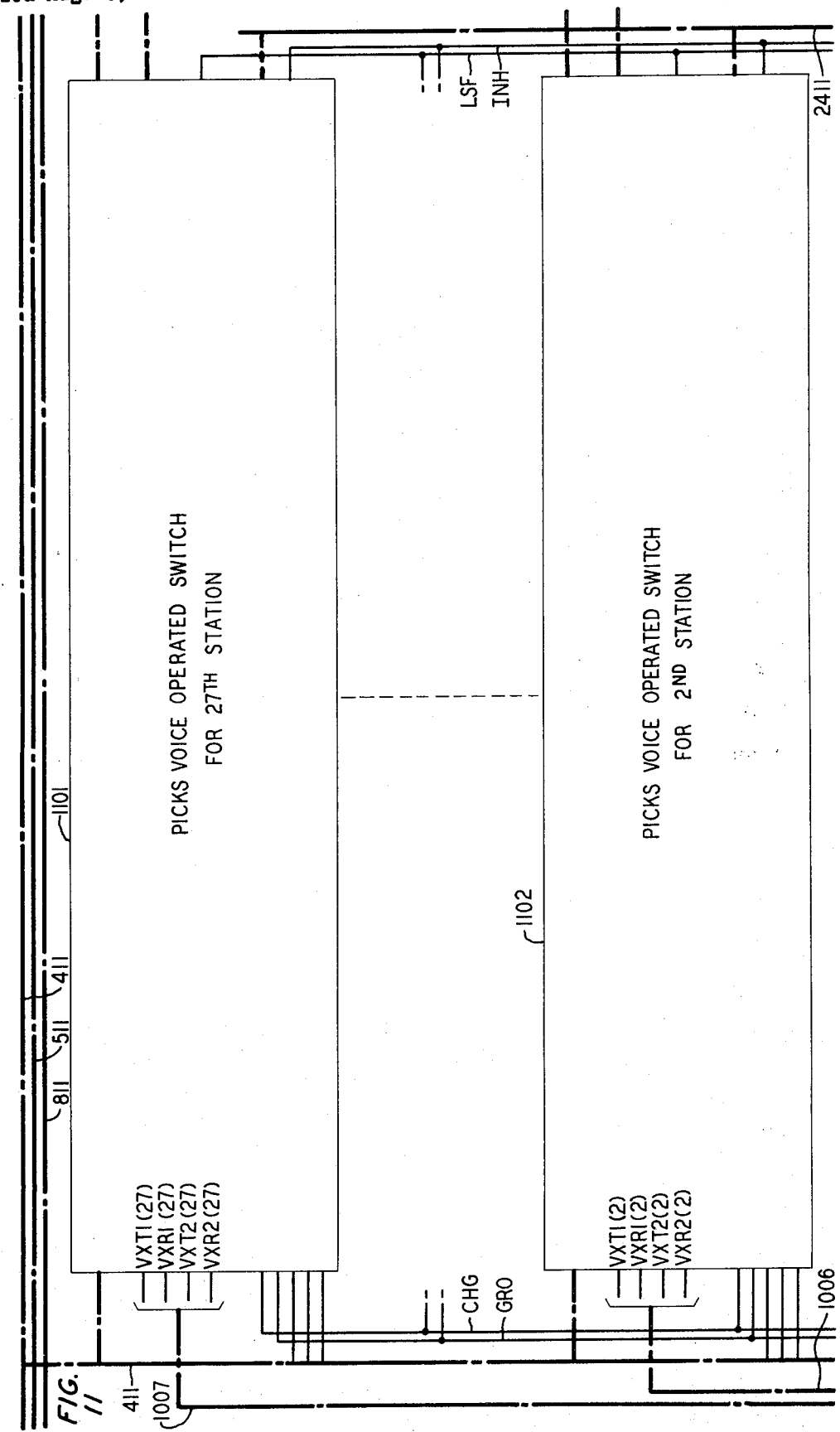
Figure 12:
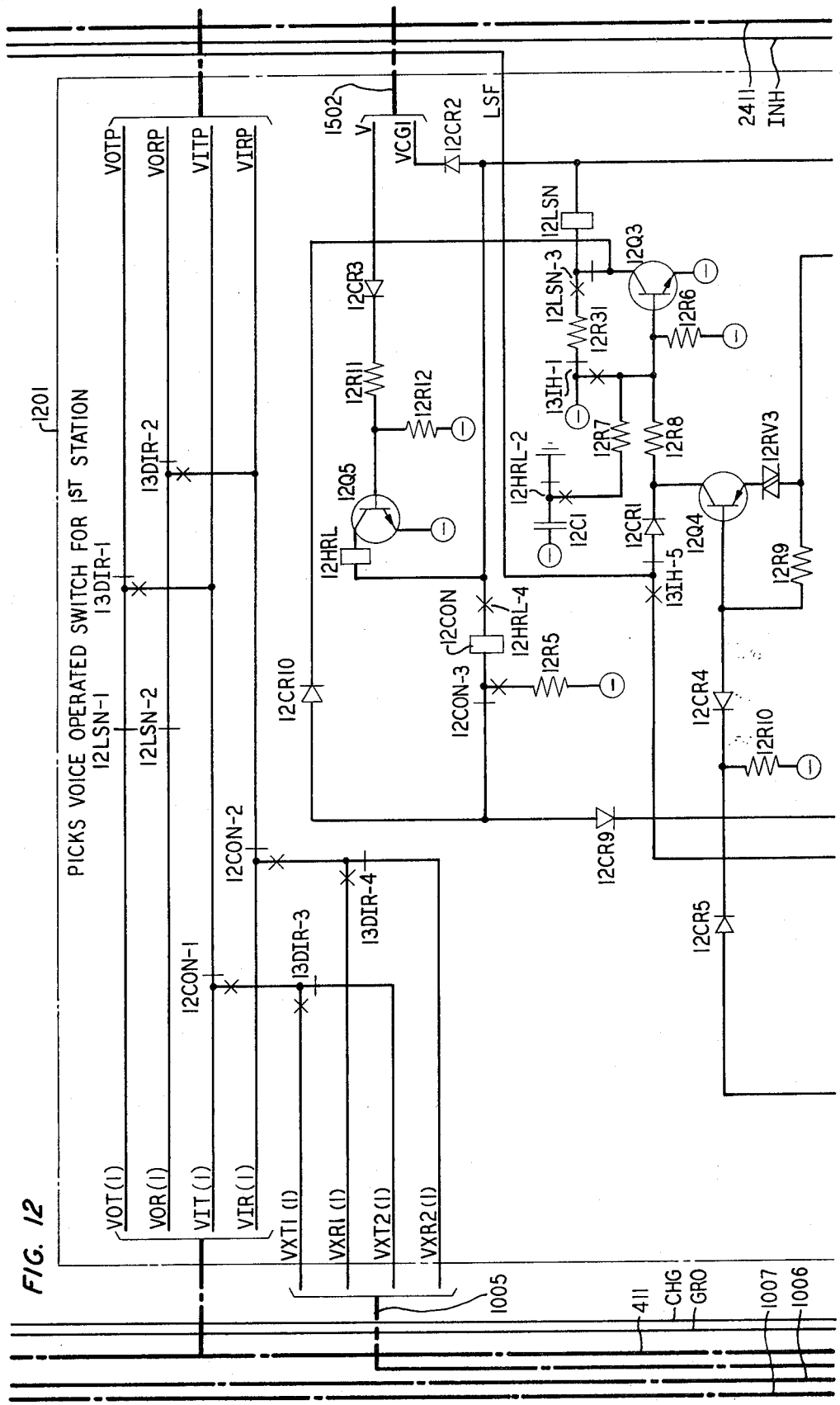

Turning now to FIG. 4, communication from the camera C1-1 of the 1st video set 401 is possible via pad P1-1, video control VC1-1 over the video output leads VOT(1) and VOR(1) and cable 411 to FIG. 12 and through the PICKS voice-operated switch for 1st station 1201 and the released break contacts therein and over leads VOTP and VORP to FIG. 15 to the 1st station circuit 1501 and via the enabled 17RV contacts 17RV-4 and 17RV-3 which contacts act to reverse the transmission path and out of the 1st station circuit via leads VIT1 and VIR1 and over cable 2401 to the 1st matrix 1st link connection and through enabled matrix contacts 24V-5 and 24V-4 and via the vertical multiple VITC and VIRC to the 27th matrix and via the enabled 24V relay associated with that matrix and the associated horizontal multiple leads to the 27th station circuit shown in FIG. 14 and, as detailed in FIG. 15, over the VIT1 and VIR1 leads therein. Since in the called station circuit the 17RV relay is normal the transmission is extended through the 27th station circuit and over leads VITP and VIRP back to the called station via the associated PICKS voice-operated switch for the 27th station 1101 shown in FIG. 11 and through the normal break contacts therein and over leads VIT and VIR (shown in FIG. 12) and cable 411 back to the 27th video set 202 shown in FIG. 2. Accordingly, transmission originating in the calling video set is received by the screen of the called video set and transmission originating from the camera of the 27th video set is received by the screen of the 1st video set via a pair of leads extended in the same manner between the video sets as just discussed.

2.7 Direct station signaling (DSS)

Assume now that a calling station is connected to a called station via the 1st link circuit. Also assume that the two stations are in Picturephone communication with each other and that the calling station desires to establish a conference connection between the two communicating stations and a third station which we will assume to be the 2d system station. Also assume at this point that the calling station has a direct station selection (DSS) key associated with the 2d station which station is coded 4. It is to be further assumed that the video conferencing facilities are not available and thus the added station may only be added in an audio mode.

The calling subscriber at the 1st station, in order to initiate such a connection, operates the desired DSS key, such as key 4DSS.

As shown in FIG. 4, one side of the operated 4DSS key at the 1st station circuit is extended over lead DSS and cable 411 to the matrix associated with the calling station which in this case is the 1st matrix shown in FIG. 24. This lead is extended through the horizontal multiple DSS of 1st matrix and the enabled 24F-4 contact to the vertical multiple DSSC, FIG. 23, and over cable 2710 to the 1st link circuit, FIG. 27, and via resistor 27R19 to the base of transistor 27Q7. Ground on the emitter of transistor 27Q7 causes current to flow from the base emitter junction thereof over the just-described path and lead DSSC through the 1st link, 1st matrix, back to the calling station, FIG. 4, and through the now enabled 4DSS key over lead DSSK to the station circuit associated with the 2d station. Since this station circuit has not been detailed, the following description will be given with respect to the 1st station circuit shown in FIGS. 15, 16 and 17, with the understanding, however, that the DSSK lead from the DSS key in the calling 1st station is actually connected to the 2d station circuit.

Turning now to FIG. 17, the current flowing through the now enabled DSS key over lead DSSK is communicated to the register via diodes 17CR10 and 17CR11 which diodes are associated with the C- leads uniquely associated with the 2d station.

Turning now to FIG. 19, the grounds enter the register circuit via the C- leads and are communicated to operate the respective (Y-) relays in the selector 1902 in the same manner as for a calling station. It should be noted, however, that the (Y-) relays which will operate, correspond to the (Y-) relays associated with the 2d station, which in this case is a called station, which 2d station has been direct signal selected from a 1st station which is the calling station.

At this time the current flowing on the C- leads is limited by resistor 27R19, FIG. 27. Because of this current limitation the voltage developed across resistor 19R1 is insufficient to cause transistor 19Q1 to turn on through Zener diode 19CR7 and resistor 19R2. Transistor 19Q1 remaining off at this time maintains relay 19SR in a released condition. Accordingly, at this point the register circuit has not been seized and thus, although grounds have been supplied to the selector circuit 1902 the (B) relay therein has not operated and therefore the selector remains idle. This follows because it has not as yet been determined whether or not the register circuit is available to handle this call at this time.

Returning now to the 1st link circuit, FIG. 27, current flowing through transistor 27Q7 causes ground to be supplied via diode 27CR6 to one side of the 27EL relay winding. Ground is also supplied via resistor 27R25, diode 27CR61, and resistor 27R22 to the base of transistor 27Q8, thereby turning on transistor 27Q8 and supplying battery to one side of the 27DSSC relay winding. The other side of the 27DSSC relay winding is extended via diode 27CR7, released break contact 27DSSC-1 and lead OP1 and cable 2110 to register circuit FIG. 20 to the collector of transistor 20Q3. If the register is idle, transistor 20Q3 will be on and a ground will be supplied via released break contact 20RB-1, thereby operating relay 27DSSC in FIG. 27.

It should be noted that in the event the register circuit is currently busy, the 20RB relay therein would be operated in a manner previously described thereby removing ground from the 20Q3 transistor via enabled break contact 20RB-1 so as to maintain the 27DSSC relay in the link circuit normal. Ground removed from the 20Q3 transistor also removes ground at this time from lead OP which ground it will be recalled was extended to the station ciruits to operate the request relays therein. Removal of this ground prevents any other station circuit from selecting the register while the register is busy thereby preventing race conditions.

Returning again to FIG. 27, the enabling of relay 27DSSC causes that relay to lock operated via its own enabled make contact 27DSSC-1 and lead DSSL to the register circuit, FIG. 20, to current flowing from the emitter of transistor 20Q2 via resistor 20R9. The current flowing through transistor 20Q2 clamps transistor 20Q3 off, thereby removing ground from the OP and OP1 leads. Again returning to FIG. 27, transistor 27Q7 turning on extends a ground via enabled make contact 27DSSC-2 and resistor 27R21 to turn on transistor 27Q6. Transistor 27Q6 turning on provides negative potential to one side of the 27EL relay winding. The other side of the 27EL relay winding is connected via diode 27CR6 to the ground extended from turned on transistor 27Q7. Accordingly, at this point the first link circuit becomes enabled via the enabling of relay 27EL and the enabling of relay 26EL1 in the manner previously described.

At this point the ground which had been extended from the base of transistor 27Q7 now bypasses resistor 27R19 via enabled make contacts 27EL-1 and 27DSSC-5. This essentially solid ground is now fed back through the 1st link, 1st matrix to the calling station and from the operated DSS key therein to the called station and through the C- leads therein to the register circuit, FIG. 19. The 19Q1 transistor now turns on signifying a service request thereby operating relay 19SR and seizing the selector 1902 in a manner previously described. At this point the (Y-) relays in the selector operate and the call progresses in the manner previously described for an initiated call with the exception now that the link circuit on which the called station is to be connected is the link circuit previously used by the calling station and is not a new link circuit. Accordingly one basic difference between this type of call and an originating call is that the selector 1902 must be seized only once in response to a calling station. This follows since dialing will not be forthcoming from the calling station. The circuitry for preventing a reseizure is as follows as shown on FIG. 27.

Relay 27DSSC is slow to release due to the charge remaining on capacitor 27C6 which charge holds transistor 27Q8 on after the release of the enabling ground from transistor 27Q7 which enabling ground is removed upon the release of the DSS key in the calling station. As shown in FIG. 25, it will be recalled that the selector was reseized by the shorting together of the T1 and R1 leads via enabled make contact 25D–2 and released break contact 27DSSC–6. Since the 27DSSC relay is operated and is slow to release the leads T1 and R1 are not shorted on a direct station signaled call therefore preventing the selector from becoming reseized on such a call.

Turning now to FIG. 22, when the (Y–) relays operate in selector 1902 as a result of ground being extended from the 2d station the SL lead is extended through selector 1902 and over lead R4 through transfer circuit 2203 and released break contact 22T1–3 therein and over lead S4 and cable 2210 to the 2d matrix and a busy-idle test is performed by busy-idle detector 2101, FIG. 21, in the manner previously described. When the 21SI relay in the detector operates at the conclusion of the test the SL lead is extended via enabled make contact 21SI–1 and lead SSG through the enabled make contact 22CP1–3 of transfer circuit 2203 and lead CCP of cable 2211 to FIG. 19 and ground at the summing point of the 19Q1 transistor. This ground is extended to operate the 24A and 24F relays in the second switch matrix (not shown) which matrix is associated with the 1st link ciruit, FIGS. 23 and 24. It is the 24A and 24F relays of the 1st link which operate since only that link has battery on its MXO vertical multiple. This may be seen from 1st link circuit 2501, FIG. 25, where lead MXO is extended through enabled make contact 26EL1–5 over lead MXB to the register circuit, FIG. 21, to battery via enabled make contact 21SI–4. Thus, only when the register circuit is associated with the 1st link circuit will the relays thereof operate in the matrix network.

Accordingly, at this point the 2d station circuit is cut through the 2d matrix in the same manner as the original called station was cut through and ringing potential is applied to the called station in the same manner as was discussed for the original called station. When the 2d station goes off-hook in response to the ringing potential applied thereto the 16Q4 transistor in the associated station circuit (not shown but identical to that detailed in FIG. 16) turns on in the manner previously described. However, the 17P relay is not operated in the 2d station at this point and therefore transistor 16Q2 remains off thereby maintaining lead V high such that the 24V relay in the 2d matrix is not operated and may not become operated at this time. Accordingly, video transmission is not possible from or to the 2d station at any time during the call.

Turning now to FIG. 17, the 17P relay cannot operate in the 2d called station because of the absence of ground on lead P. This absence of ground can be seen by tracing lead P back through the horizontal multiple associated with station P (not shown but detailed in FIG. 24 with respect to the 1st station). The horizontal multiple P is extended through enabled make contact 24A–1 of the enabled matrix to the vertical multiple PC to FIG. 23 and over cable 2710 to FIG. 27, lead PC to break contact 26TD1–3. Relay 26TD1 operated when the 27EL relay released after the original connection. At that time the 27EL relay was normal while the 25PP relay was operated thereby supplying ground via released break contact 27EL–6, and released break contact 26TD1–4 to operate relay 26D1. When relay 26TD1 operated it locked operated through enabled make contact 26TD1–4 and resistor 26R261 to ground via enabled make contact 26LB–1.

Accordingly, at this point the 2d station is connected to the 1st link to which link both the 1st and 27th stations have already been connected. The talking path from the 2d station is extended through the 1st link, FIGS. 23 and 24, and vertical multiples TC and RC to all the connected stations and to the 1st link circuit, FIG. 25, where battery and ground potentials are applied via leads TC and RC and transformer 25T.

2.8 Register recall

In the preceding sections it was discussed how a calling subscriber connected to the link circuit may, by operation of a direct station signaling key at the calling station, establish a connection directly to a called station without dialing the digits associated with the called station. As discussed, the selector 1902 of the register circuit was forced by the coding leads of the called station such that the called station was connected to the previously established link as though the called station had been a calling station. In the event the station to be added to the conference is not associated with a direct station signaling key at the calling station, the register must be recalled by the calling station and the digits corresponding to the code of the called station must be transferred thereto. The following description will discuss the circuitry associated with this feature.

Turning now to FIG. 4, when it is desired to a establish a connection from a 1st station already established to a link the register recall key, such as key 4RRC, is enabled. The DSS lead connected to one side of the register recall key, which lead has been discussed previously, is extended through the calling station to the link to which that station is currently attached. Thus the DSS lead extends at this point back to the 1st link to the base of transistor 27Q7 therein. The resistance ground potential on the DSS lead is then extended to the enabled 4RRC key contact and over lead RRC, cable 411, to FIG. 20 and through doide 20CR19 to the summing point of transistor 19Q1. This ground, being resistance ground as discussed previously, is not sufficient to cause transistor 19Q1 to turn on and thus relay 19SR remains normal.

Continuing in FIG. 20, if the register is idle at this time transistor 20Q3 is on and ground is extended via released break contact 20RB–1 through transistor 20Q3 over lead OP1 and cable 2110 to the link circuits, FIG. 27, and via the released break contact 27DSSC–1 and diode 27CR7 to one side of the relay 27DSSC winding. Since the register recall key is operated, current flowing on the DSSC lead in the manner previously discussed turns on transistors 27Q7 and 27Q8 thereby causing relay 27DSSC to operate at this time. Accordingly, the resistor 27R19 is removed from the circuit via enabled make contacts 27E1–1 and 27DSSC–5 also in the manner previously discussed. This essentially solid ground is extended from the 1st link circuit through the matrix and through the calling 1st station circuit to the calling 1st station and through the operated register recall key (FIG. 4) to the register circuit over lead RRC, thereby turning on transistor 19Q1 and operating relays 19SR and 19CP in the manner previously described for a calling connection.

Since ground has not been extended from the calling station over the C– leads to the register circuit, the (Y–) relays in selector 1902 remain normal at this time.

When the 19SR relay operates, ground is extended via enabled make contact 19SR–5 to FIG. 20 to the emitter of transistor 20Q9 via resistor 20R2. The base of transistor 20Q9 is being driven via lead RRC and thus that transistor 20Q9 turns on. Transistor 20Q9 is arranged to hold relay 19SR operated for a period of time after the release of the register recall key. This holding time is necessary in order to permit a continuous short to exist across the T and R leads between the time the 19SR relay operates and the time when 27DSSC relay in the associated link circuit releases. The purpose of this continuous period is to ensure that once the selector is seized it remains seized for a period of time sufficient to ensure that the 27DSCC relay releases thereby allowing dialing from the calling station to proceed in a straightforward manner. Thus, when the register recall key is released transistor 27Q7 turns off in the link circuit thereby beginning the timing interval for the release of the 27DSSC relay. At the end of the timing interval transistor 27Q8 turns off thereby releasing relay 27DSSC. Accordingly, as shown in FIG. 25, the T1 and R1 leads are again shorted via enabled make contact 25D-2 and released break contact 27DSSC-6. Continuing in FIG. 19 at the end of the timing interval determined by capacitor 20C9 and resistor 20R28 transistor 20Q9 turns off thereby turning off transistor 19Q1 and releasing relay 19SR. When relay 19SR releases the T and R leads of selector 1902 are cut through to the 1st link circuit and a short is maintained thereon via enabled make contact 25D-2 and released break contact 27DSSC-6. Dial tone is now returned to the 1st link in the manner previously discussed. When Touch-Tone dialing takes place, the Touch-Tone adapter 1904 translates the frequencies, thereby operating the (Y-) relays in the selector. The operated ones of the (Y-) relays correspond to the code of the called station. Thus at the completion of the dialing interval the called station is connected to the link in the same manner as previously described for a called station except that since relay 26TD1 is now operated in the link circuit ground is not extended over lead PC (FIG. 27) via now enable break contact 26TD1-3 to operate relay 17P in the station circuit video transmission is not possible to or from the added party.

2.9 Hold circuit

When it is desired to place an established connection on hold either party may operate the hold key at the respective station. Assuming that the 1st station hold key is operated as shown in FIG. 3 ground would be extended via enabled make contacts 3SW1-8 and 3HLD1-2 over lead H-1 and cable 411 to FIG. 18 to hold circuit associated with the 1st station which in this case would be 1st hold circuit 1803. The ground extended via lead H-1 is extended through released break contact 18H-3 and resistor 18R1 to turn on transistor 18Q1. Transistor 18Q1 turning on extends battery through resistor 18R3 to turn on transistor 18Q2 thereby operating relay 18H to ground on lead HG which ground is present on lead HG from the associated station, FIG. 17, and diode 17CR15 via enabled make contact 17B-1. The 17B relay in the station circuit is operated at this time since the associated station is connected to a link circuit.

Figure 18:
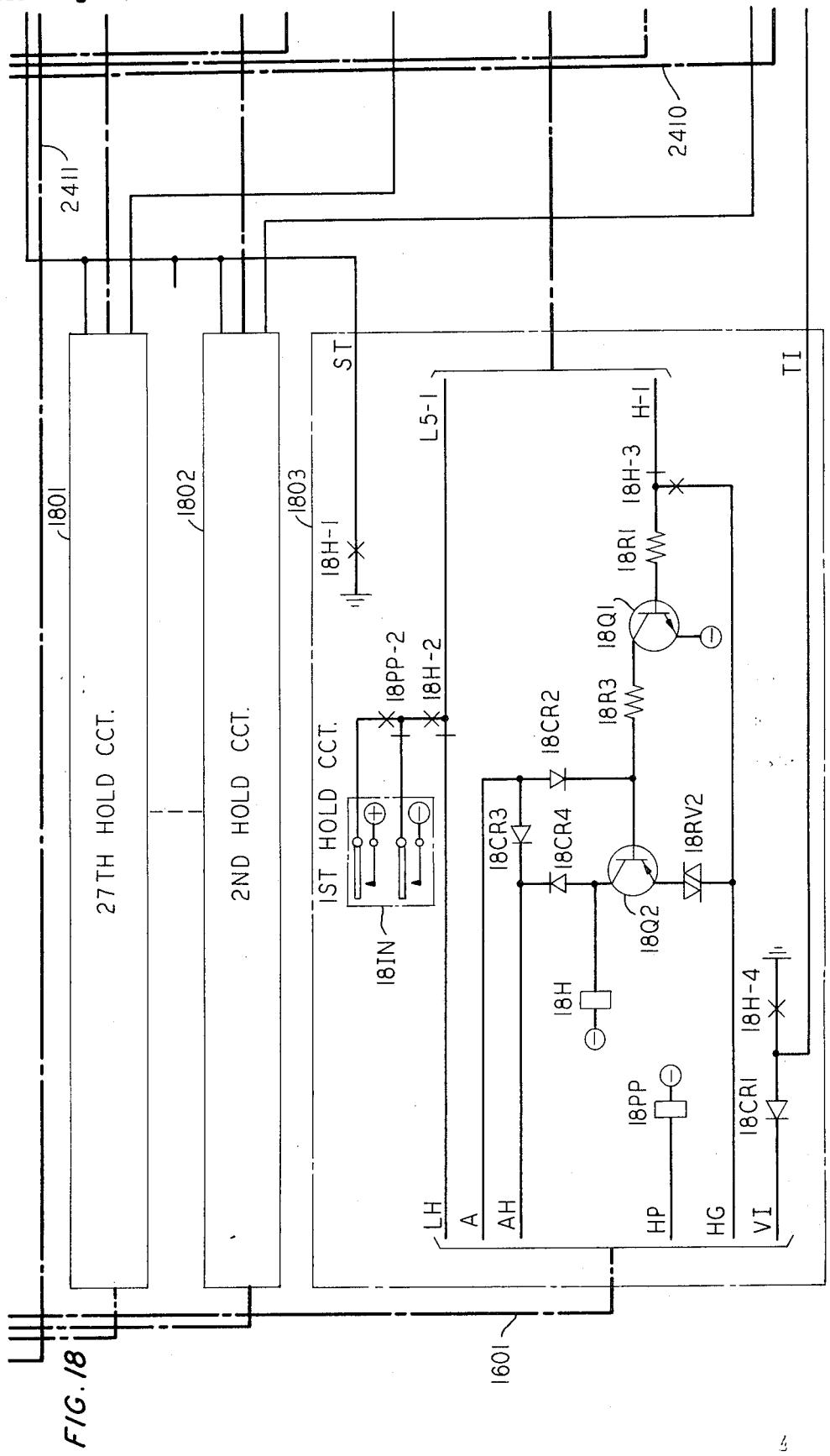

Continuing in FIG. 18, ground is extended from lead HG to hold transistor 18Q1 operated via enabled make contact 18H-3. Ground is also extended via diode 18CR4 over the AH lead and cable 1601 to FIG. 16 thereby maintaining transistor 16Q4 on irrespective of the ground condition of the A5-1 lead from the associated station. When the hold key at the 1st station is operated the pickup key automatically releases thereby removing ground from the A5-1 lead in a straightforward manner. The tip and ring leads at the station are thereby interrupted as is well known.

Continuing in FIG. 18, the operation of relay 18H extends to ground via enabled make contact 18H-4 and diode 18CR1 over lead VI of cable 1601 to FIG. 16 to the base of transistor 16Q2 thereby clamping transistor 16Q2 off so as to remove ground from the V lead thereby causing the 24V relay in the 1st matrix to release thus inhibiting the video connections through the matrix. Ground removed from the V lead also removes the ground from lead TOS1 by turning off transistor 15Q1 thereby maintaining the video set at the subscriber station in an inoperative condition.

Returning again to FIG. 18, lamp potentials are extended to the 1st station via lead L5-1 in the manner previously described. The potentials originating in the station circuit are broken by disabled transfer contact 18H-2 and these potentials are now under control of the interrupter 18IN such that in a non-Picturephone call (relay 18PP normal) negative potential is extended in a pulsing manner thereby operating the white lamp at the station. If the call is a Picturephone call the 18PP relay would be operated thereby extending pulsating positive potential to flash the red lamp at the station. The 18PP relay is operated on Picturephone calls from ground extended over lead HP and cable 1601 from FIG. 17 and the enabled make contact 17P-1 therein.

Accordingly, upon the enabling of the hold key the audio leads are opened in a strightforward manner; the video connection is released via the release of the video matrix contacts in the matrix; and appropriate lamp signals are provided to the station.

When the station again desires to resume the connection the pickup key is operated and ground reappears on lead A5-1, FIG. 15. This ground is extended via lead A of cable 1601 to the associated hold circuit and through forward-biased diode 18CR2 to clamp transistor 18Q2 off. Relay 18H thereupon releases and the connection is restored to normal.

2.10 Add-on transfer

In the previous sections we discussed the situation where a 1st station connected to a 27th station via the 1st intercom link desired to add a third or a fourth station to the conference network via the intercom link. Now we shall discuss the situation where the 1st station is in communication with the 27th station over the 1st intercom link and at the same time it is desired to add a third party to the connection which third party is available over a PBX line circuit, such as line circuit 302 shown in FIG. 3.

Turning now to FIG. 3, in the situation where it is desired to establish a three-party conference between the 1st station 301, line circuit 302 to the PBX facility and the previously connected 27th station 201, FIG. 2, which station has been previously connected to the 1st station via the 1st intercom link, the 27th station is placed on hold by the subscriber at the 1st station 301. Since the PBX line circuit 302 is associated with line 4, pickup key 3PU4 is operated thereby extending a ground through enabled make contact 3PU4-3 over lead A4-1 to the line circuit 302; the line circuit responds to a grounded A4-1 lead in the well-known manner such that a connection becomes established to the PBX facility. Transmission is extended at this time from network and dial 303 of the 1st station via enabled switchhook contacts 3SW1-6, 7 and enabled pickup key contacts 3PU4-1, 2 over leads RT4-1 (L4) to the line circuit via leads T4 and R4. This transmission path is extended through the winding of transformer 3T to leads T4-1 and R4-1 to the PBX facility. The transmission path of the 1st station is also extended via transformer 3T over leads T1 and R1 of cable 411 to FIG. 5, add-on transfer connecting circuit 501 for the 1st link-1st (transfer) line. Since relay 5AO in that circuit is unoperated at this time the subscriber may communicate only with the PBX line subscriber. In order to communicate with the intercom connected station the 1st station subscriber must first place the PBX subscriber on hold and then operate the pickup key associated with line L5.

Note that the station to which the 1st station is not communicating is maintained on hold in the manner previously described. When the 1st station is communicating with the PBX facility transmission is possible over the audio leads in the manner previously described and over the video leads in the following manner.

Turning to FIG. 4, transmission from camera C1-1 is extended over video output leads VOT(1) and VO(R1) and cable 203 to FIG. 3 and via the video switch 304 and video output leads VOT-1 and VOR-1 to the PBX facility. Transmission from the PBX facility is via video input leads VIT-1, VIR-1, video switch 304, leads VIT1 and VIR1 over cable 203 to FIG. 4 to the 1st video set 401 and to screen S1-1 therein.

When it is desired to establish an add-on transfer connection such that a three-party conference is established between the 1st station, the 27th station via the 1st link of the intercom and the PBX facility, the party at the 1st station enables the add-on transfer key thereat such as key 3ADD-ON, shown in FIG. 3. At each station capable of handling add-on transfer calls there is an add-on key for each line circuit which may be added to the intercom link. Thus in our example key 3ADD-ON is assumed to be associated with line circuit 302 (line 4). The enabling of the 3ADD-ON key operates in much the same manner as the enabling of the register recall key keeping in mind that it is again necessary to establish which of the links the calling 1st station 301 is currently associated with. The circuitry to accomplish this function may be seen beginning on FIG. 7. Current from the base emitter junction of transistor 7Q1 from add-on transfer control 701, which add-on transfer control is uniquely associated with the 1st link, is extended via resistor 7R6 over the AOC lead of cable 511.

Figure 7:
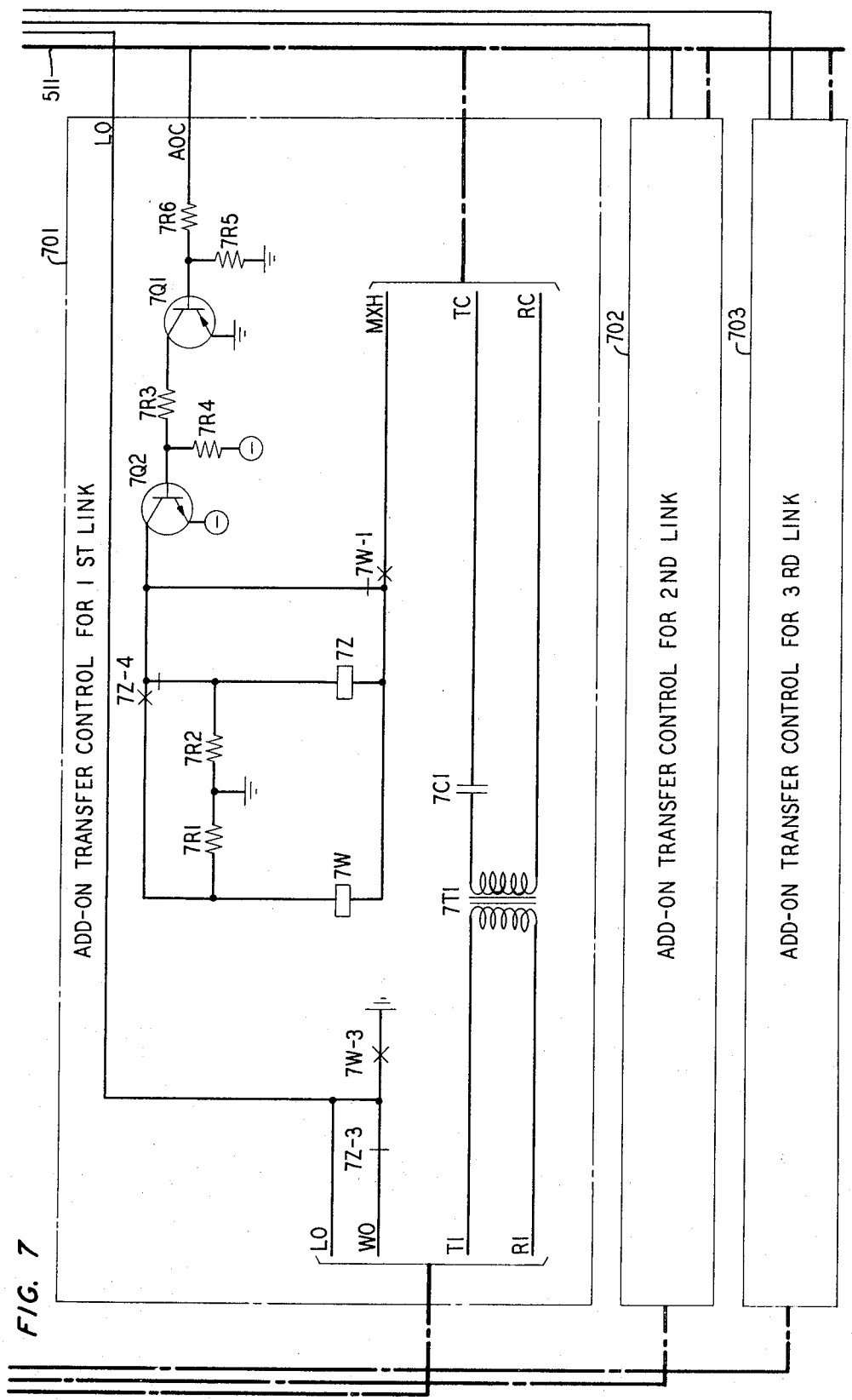

Digressing momentarily, it will be noted that as shown in FIG. 7 there is one add-on transfer control circuit for each of the links. Accordingly, add-on transfer control circuit 702 is associated with the 2d link while add-on transfer control circuit 703 is associated with the 3d link. Each of these add-on transfer control circuits provides current via their respective AOC leads to cable 511 in the manner previously described. However, as will be detailed, only one of these leads is cut through to the signaling station, that lead corresponding to the line to which the calling subscriber is connected.

Continuing in FIG. 7, the current on lead AOC from the 1st link add-on transfer control circuit is extended via cable 511 to the matrix network 1st link, FIG. 23, via the vertical multiple AOC to the enabled 24F-3 contact shown in FIG. 24 associated with the 1st matrix. Associated with that vertical multiple the 24F relays of the 1st matrix and 27th matrix is operated corresponding to the 1st station communicating with the 27th station. Thus the current on lead AOC is extended from vertical multiple AOC to the associated horizontal multiples AO-1 and AO-27 (not shown). However, since only one of the add-on transfer keys is operated at this point only the current from the associated matrix will be effective.

Accordingly, continuing in FIG. 24, current from the horizontal multiple AO-1 and cable 411 is extended to FIG. 3 and through the operated 3ADD-ON key and over lead AOL(4)-1 and cable 411 to FIG. 5 via forward-biased diode 5CR1 and resistor 5R1 to the base of transistor 5Q1 in all add-on transfer connecting circuits such as 501, 601, 602 associated with the 1st station-1st (transfer) line. At this point the 5AO relay in each of the add-on transfer connecting circuits such as 501, 601, 602 will try to operate. Only one 5AO relay can operate however since the 5AO relays are also controlled by the associated add-on transfer control circuits. This will now be described.

Continuing now in FIG. 7, current flowing through transistor 7Q1 turns on that transistor thereby turning on transistor 7Q2 causing negative potential to be extended via released break contact 7Z-4 to one side of the 7Z relay winding. Relay 7W, however, has negative potential connected to one side of its winding via released break contact 7W-1. The other side of the 7W relay winding at this time is connected to ground via resistor 7R1. Accordingly, the 7W relay operates and locks operated to negative potential on lead MXH back on cable 511 to FIG. 25 and hence through enabled make contact 26LB-2 to battery. The 7W relay and the 7Z relay are connected in a typical WZ relay fashion such that when current stops flowing through the emitter base junction of transistor 7Q1 (for example upon release of the depressed add-on key 3ADD-ON, FIG. 3) transistor 7Q1 turns off turning off transistor 7Q2 thereby removing the shunt path from relay 7Z and allowing relay 7Z to operate at that time.

When relay 7W first operates ground is supplied via enabled make contact 7W-3 and released break contact 7Z-3 over lead WO to all of the add-on transfer connecting circuits associated with the 1st link. At this time ground is also extended over lead LO to all of the add-on transfer connecting circuits associated with the 1st link. Thus, as shown in FIG. 5 ground via lead WO is extended through released break contact 5AO-1 to the 5AO relay in the add-on transfer connecting circuit 501 1st link-1st (transfer) line. Ground is also extended to the 5AO relays (not shown) in all of the other 1st link add-on transfer connecting circuits. However, since only the 1st (transfer) line add-on key at the 1st station is operated only the 5AO relay associated with the 1st link-1st (transfer) line add-on transfer connecting circuit 501 can operate at this time. The ground on lead LO supplies a holding path for operated relay 5AO.

Continuing now in FIG. 5, the operation of relay 5AO connects negative potential to lead AOLP-1 via enabled make contact 5AO-5 to light the AO lamp at the station. Also the tip and ring leads T1 and R1 which have been extended from the line circuit 302 are connected via enabled make contacts 5AO-3 and 5AO-4 to the associated add-on transfer control circuit 701, FIG. 7, and through the control circuit via transformer 7T1 and capacitor 7C1 over leads TC and RC of cable 511 to the vertical multiple 1st link, FIG. 23. Accordingly, audio communication is possible from the PBX line to the vertical multiple of the 1st link. Since both the calling and called stations have their respective audio paths connected to the 1st link via their respectively operated matrix relays, all three stations are connected together for audio communication. Thus at this point audio transmission is possible between all of the parties to the conference without regard to which of the pickup keys, 3PU4 or 3PU5, are operated at the 1st station.

It should be noted at this point that although three-way audio transmission has been enabled video transmission is still only possible between two stations at a time, that is, between the 1st station and the 27th station via the intercom link or via the 1st station and the PBX line via the line circuit 302. The video portion of the transmission thus continues to be responsive to the operation of the respective pickup keys for line 5 (the intercom) and line 4 (the PBX transfer line). The control of this separation of audio and video functions will now be described.

Turning to the matrix network, FIG. 24, it will be noted that associated with vertical multiple TD in each of the links there is a 24R1 resistor to ground. When a station is connected to a link in the wideband mode its respective 24V relay is operated and resistance ground is thereupon connected to the TD vertical multiple. Accordingly, when the 1st station is connected to the link the 1st matrix relay 24V is operated thereby connecting ground via resistor 24R1 and enabled make contact 24V-1 to vertical multiple TD. Since the 27th matrix is also operated at this time the respective 24R1 resistor (not shown) in the 27th matrix 2301 is also connected to vertical multiple TD. Thus these resistors are in parallel. This parallel combination of resistors is extended via lead TD and cable 2710 to FIG. 26 to the winding of the 26TD relay therein. The 26TD relay is connected to the null point of a conventional bridge with the resistors just described forming one leg. The bridge is unbalanced when two vertical multiple relays operate thus supplying a parallel combination of resistors over lead TD. Thus relay 26TD does operate. When only one such matrix relay is operated the bridge is balanced and the 26TD relay remains normal.

Accordingly, since two matrix relays are now operated the 26TD relay operates. As shown in FIG. 27, ground is provided via enabled make contact 26TD-1 and enabled make contact 26TD-1-2 over lead TRI. It should be remembered that the 26TD1 relay is always operated on all calls after the particular link circuit has been selected.

Thus, ground is extended over lead TRI and cable 511 back to the add-on transfer connecting circuit for the 1st link-1st (transfer) line, FIG. 5, and via forward-biased diode 5CR2 and released break contact 5TR-3 and Zener diode 5CR5 to the base of transistor 5Q2. Ground on this lead prevents the operation of transistor 5Q2 at this time.

Since the 5AO relay has been operated negative potential via enabled make contact 5AO-2 is present via resistors 5R4 and 5R5 on capacitor 5C1. Capacitor 5C1 will not charge sufficiently at this point to turn on the 5Q2 transistor since the charge will not be high enough to break down Zener diode 5CR5. Relay 5AO also provides negative potential via enabled make contact 5AO-2, forward-biased diode 5CR4, released break contact 5LCT-6 and the LKC1 lead of cable 511 to the line circuit FIG. 27 and via released break contact 27TRB-3 and lead LKC, FIG. 26 and cable 2710 to the vertical multiple associated with the 1st link, FIG. 23, and back through the enabled 24A relay contacts associated with each enabled matrix over the corresponding horizontal multiple leads LK− to each of the stations connected to the 1st link.

Turning now to FIG. 17, negative potential on lead LK is supplied via forward-biased diode 17CR6 to maintain the station circuit operated regardless of the status of the pickup keys thereat. Thus a party to the 1st station may depress the PBX line circuit 3PU4 key thereby communicating directly to the PBX line and the station circuit associated with the intercom link will be maintained operated from battery provided over lead LK− from the add-on transfer circuit in the manner just described. So long as this condition exists either of the two parties connected to the intercom may view the PBX line by depressing the associated PBX line. The video path from the PBX station to the viewing line is not via the multilink intercom but rather by direct access because of the fact that the PBX line key is depressed. If both intercom parties operate their respective PBX line keys video switch 304 in line circuit 302 is arranged, as detailed in the aforementioned Bush-Crouse-Saltus application, to prevent interference between stations.

In the situation where the intercom parties are viewing each other via the intercom link, the PBX party receives a blank screen. The circuitry which prevents the transfer of video transmission into the intercom from the PBX line may be seen from the add-on transfer circuit, FIG. 5. This follows because ground is present either on the TRI lead from the link circuit as previously described or from lead VSG, cable 305, from the PBX line circuit, FIG. 3, if the PBX line is enabled.

2.11 Transfer of PBX line to the intercom

In the situation where one of the intercom parties hangs up the PBX connection will be extended through the add-on transfer connecting circuit 501 to the 1st link previously serving that station. Let us assume that the original calling station 301 goes on-hook. Accordingly, as shown in FIG. 3, the grounds associated with the A5-1 lead of line 5 and with the A4-1 lead of line 4 are removed. The video switch (304) in the PBX line then releases and ground is removed from lead VSG.

When the calling 1st station goes on-hook, as discussed above, ground is removed from the A5-1 lead of the station circuit shown in FIG. 15, thus, transistor 16Q4 turns off. However, as shown on FIG. 17, negative potential has been extended from the matrix over lead LK− to hold operated relays 17A and 17B. However diode 17CR2 prevents this negative potential from holding transistor 16Q2 in FIG. 16 on. Thus, since transistor 16Q4 turns off when the station goes on-hook the ground is removed from the V lead thereby releasing the video relay 24V in the matrix associated with the now on-hook station.

Turning to FIG. 26, it will be recalled that the TD lead from the winding of relay 26TD monitored the condition of the various matrices such that when only one matrix relay, 24V, is operated the 26TD relay releases. Thus, when the 24V relay of the on-hook station goes normal the bridge becomes balanced and the 26TD relay releases. As shown in FIG. 27, ground is removed from the TRI lead via now released make contact 26TD-1 and enabled make contact 26TD1-2. The TRI lead is extended via cable 511 to the add-on transfer connecting circuit, FIG. 5, to diode 5CR2. Since at this point grounds have been removed from leads VSG and TRI, capacitor 5C1 is free to charge sufficiently to turn on transistor 5Q2. When transistor 5Q2 turns on ground is extended to one side of the winding of the 5TR relay. This ground is also extended at this time via released break contact 5LCT-5 and forward-biased diode 5CR8 over lead TRB and cable 511 to the link circuit, FIG. 27, to operate relay 27TRB. Relay 27TRB operating removes the battery potential from lead LKC, FIG. 26, via now enabled break contact 27TRB-3.

It will be recalled that this potential had been extended through the matrix circuit to the LK− leads of all station circuits. Thus, when battery is removed from the LK− lead the 17A and 17B relays in those station circuits associated with stations at which the intercom pickup key is not operated release. As shown in FIG. 7, relay 7W remains operated at this point from battery on lead MXH from the 1st link circuit, FIG. 25. Thus since the 1st link circuit remains enabled while at least one station remains on the associated link the add-on transfer circuit previously enabled remains enabled and ground continues to be supplied on lead LO to FIG. 5 to hold operated relay 5AO.

Turning now to FIG. 5, in the add-on transfer connecting circuit 501 ground has been extended to one side of the 5TR relay winding. The other side of the winding is extended via lead TR and cable 511 to FIG. 27 in the link circuit. Since relay 27TRB is operated battery is extended via enabled make contact 27TRB-1 to the TR lead. Thus, as shown in FIG. 5, relay 5TR operates thereby operating relay 5LCT from ground via enabled make contact 5TR-4. Accordingly, the battery which has been extended via lead LKC1 from the add-on transfer connecting circuit is now removed via enabled break contact 5LCT-6. At this time battery is extended via enabled make contact 5LCT-6 to hold relay 5TR operated.

Continuing now in FIG. 5, ground is extended via enabled make contact 5TR-4 over lead PA and cable 305 to the line circuit 302 over lead PA. Ground on this lead serves to enable the video switch 306 in the line circuit 302 such that transmission is possible from the PBX quad over leads VOT, VOR, VIT, VIR and cable 305 to the add-on transfer connecting circuit, FIG. 5, and via now enabled make contacts 5LCT-3, 5LCT-4, 5LCT-1, and 5LCT-2 to leads VOTC, VORC, VITC, and VIRC of cable 511 to FIG. 23 and the respective vertical multiples of the wideband quad of the 1st link. Transmission from this quad is then extended via the operated 24V relay contacts associated with the still enabled 27th matrix back to the video set of the 27th station, FIG. 2. Accordingly, the 27th station is now in wideband communication as well as in audio communication via the intercom link with the PBX station even though the 27th intercom station had not initiated a call to the PBX line. This action is automatic when the other party to a previously established multilink intercom connection goes on-hook.

At this point it should be noted that the 17RV relay in the station circuit associated with the 27th station, as detailed with respect to the 1st station in FIGS. 15, 16, and 17, is normal since the 27th station had been a called station. In the event the 27th station had been a calling station, the 17RV relay in the associated station circuit would be operated as a reversing relay in the manner previously described. However, for PBX calls the convention has been adopted that the wideband quad lead comes into the intercom in the reversed manner so consequently it is unnecessary to reverse the quad at the intercom system. Accordingly, in the event that the called intercom party had gone on-hook it would be necessary to ensure that the 17RV relay goes normal in the associated calling station. This can be seen from FIG. 17 where it will be recalled that the battery potential has been removed from the LK– lead upon initiation of the transfer feature thereby removing operate potential from the 17RV relay winding in the calling station. Thus, communication for audio and wideband is possible from either party previously connected to one of the links of the intercom system to a PBX line established through the transfer circuit whenever the other party to the intercom connection has released.

3.0 Wideband conferencing arrangement

The following text will describe the embodiment of the invention in detail with reference to FIGS. 8 through 13.

We shall assume at this point that a wideband connection on the multilink intercom has been established between the 1st station and the 27th station. In the situation where it is desired to add a third station to the established connection between the 1st and 27th stations, that station may be added by direct station signaling or by register recall and dialing the station number associated therewith so that the 1st station, the 27th station and the added station (or stations) are all connected to the same link of the multilink intercom network. It will be recalled that if nothing else is done when the third station is dialed into the previously-established conference that station will be connected into the conference in an audio-only mode.

In the situation where the third station is to be added with full wideband capability the PICKS key at one of the previously-connected stations to the conference is operated. Assuming that the PICKS key is operated at the first station, either before the third station is added or after that station has been added, ground will be extended as shown in FIG. 3 from the enabled 3PICKS key via the PKS-1 lead and cable 411 to FIG. 13. The ground is then extended over lead PKS-1 through forward-bias diode 13CR12 and lead SCOG of cable 2411 to FIG. 24 and via horizontal multiple lead SCOG and through enabled cross-point contact 24V-6 of the 1st matrix to the vertical multiple SCOGC(1) and cable 811 to FIG. 8 and the video conference control circuit for the first link 801. Ground on lead SCOGC(1) is then extended via forward-biased diode 8CR6 and varistor 8RV1 to the emitter of transistor 8Q1.

In the situation where no other video conference is established on any other link, diodes 8CR3 and 8CR4 are both reversed-biased and negative potential via resistor 8R1 is present on the base of transistor 8Q1. Therefore when ground is extended to the emitter of transistor 8Q1 that transistor turns on thereby extending ground via forward-biased diode 8CR2 and lead TRB of cable 811 to the 1st link circuit, FIG. 27. Relay 27TRB thereupon operates and a battery is extended via the enabled make contact 27TRB-1 and the TR lead of cable 811 back to the conference control circuit FIG. 8 and to the emitter of transistor 8Q2 therein. Since as described previously transistor 8Q1 is on at this time ground is extended via resistor 8R3 to the base of transistor 8Q2 causing transistor 8Q2 to turn on. Battery from lead TR is thereby extended to the winding of relay 8VC causing that relay to operate.

When relay 8VC operates positive potential is extended via enabled make contact 8VC-7 over lead CLP-1 of cable 411 to all stations equipped for video conferencing which stations are shown in FIGS. 2 and 3. The positive potential is extended over the CLP-lead, such as lead CLP-1 of the first station shown in FIG. 4, to turn on the PK lamp in the associated station. Thus at this point all stations equipped for wideband conferencing have their PK lamp turned on.

Figure 8:
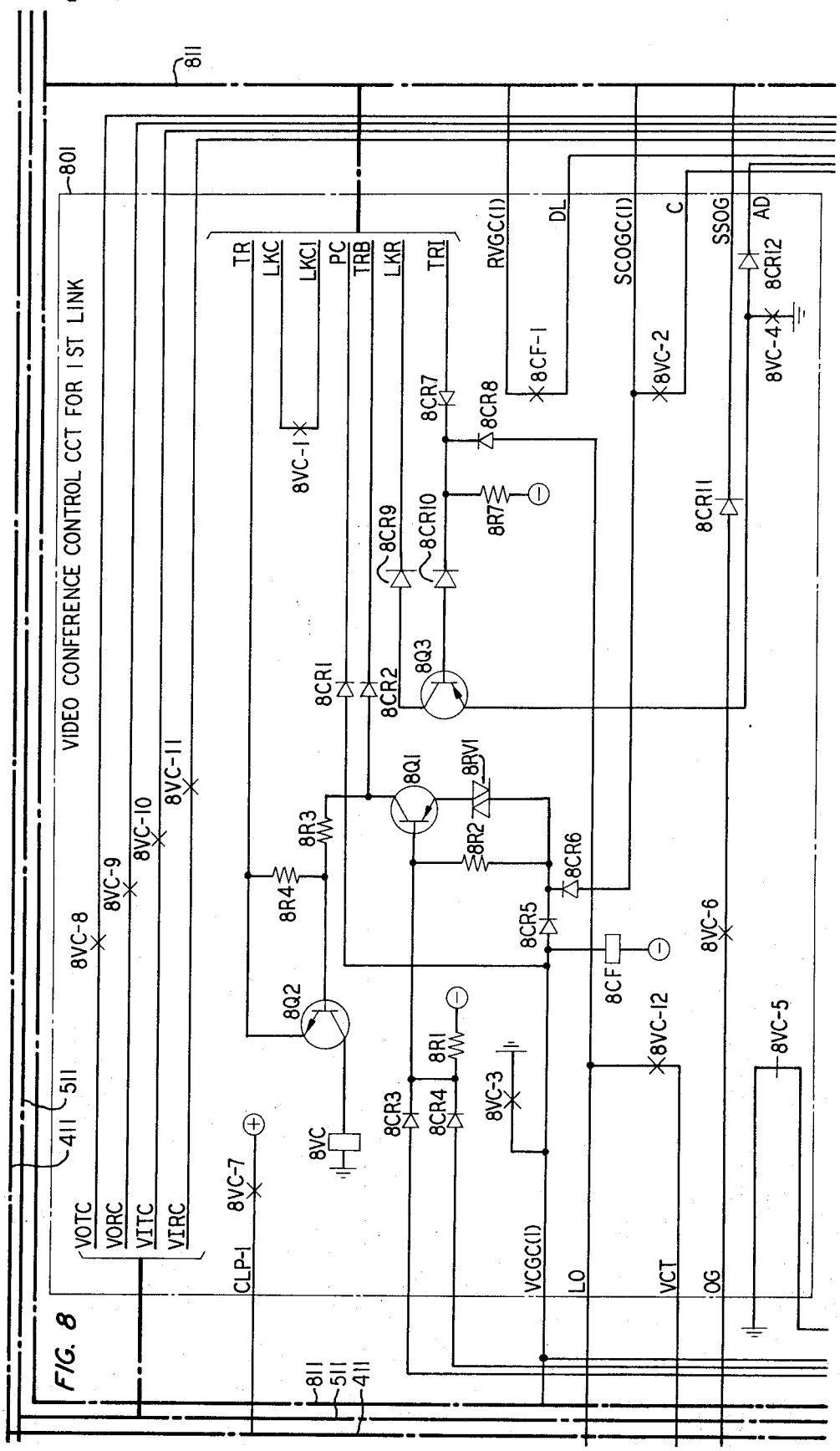
Figure 9:
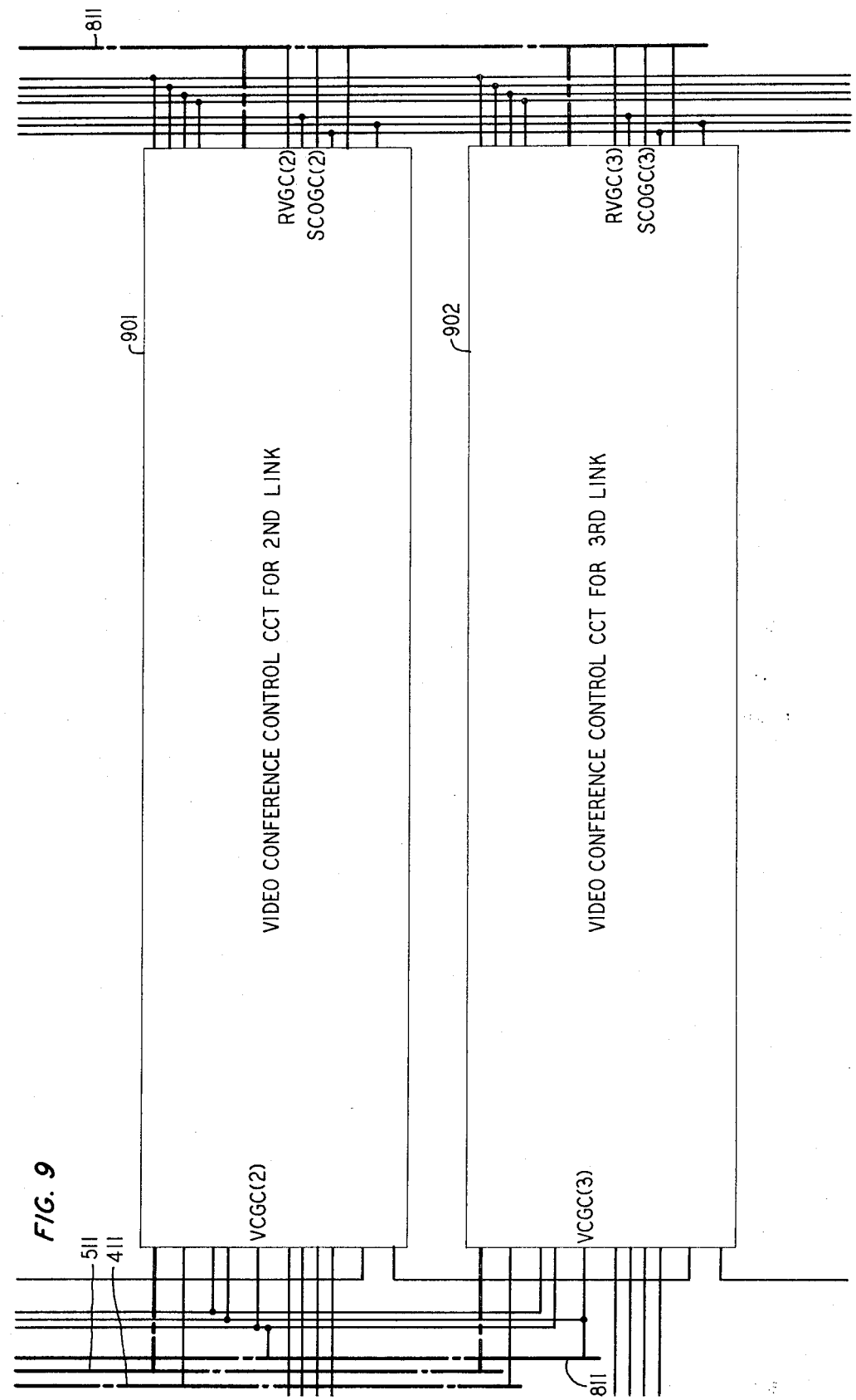

Returning now to FIG. 8, ground also is extended via now enabled make contact 8VC-3 over lead VCGC(1) to FIG. 9 and the video conference control circuits for the 2nd and 3rd links. This ground is supplied to the diodes associated with the base junctions of the 8Q1 transistors therein (not shown, but identical to the 1st link video control circuit shown in FIG. 8). Thus, as shown in FIG. 8, ground is extended to the corresponding 8CR3 diode thereby maintaining the 8Q1 transistors in the 2nd and 3rd link video conference control circuits off.

In the 1st control circuit, FIG. 8, ground via enabled make contact 8VC-3, is extended through forward-biased diodes 8CR5 and varistor 8RV1 to the emitter of transistor 8Q1, thereby maintaining that transistor on at this point, regardless of the status of the PICKS key at the enabling station. This ground will remain on the emitter of transistor 8Q1 for the duration of the conference as will become more apparent from that which is contained hereinafter.

Ground from enabled make contact 8VC-3 is also extended through forward-biased diode 8CT1 and over lead PC of cable 811 to FIG. 27 (1st link circuit). Ground on the PC lead is extended via cable 2710 to FIG. 23 and the vertical multiple PC of the 1st link and through that link to all of the stations connected thereto in either an audio or video manner. Ground on the PC vertical multiple at this point forces any station connected in an audio-only mode into a wideband mode. This results since ground on the vertical multiple PC is extended through the enabled 24A-1 make contacts of all stations currently connected to the 1st link. Thus, as shown in FIG. 24 for the 1st matrix ground is extended over the P lead of cable 2410. Also in FIG. 23 this ground is extended over the corresponding P leads (not shown) of the 2nd matrix and the 27th matrix since the 2nd station and the 27th station both are connected to the conference on the 1st link at this time. The P leads from the horizontal multiples of each of the matrix circuits of the first link are extended to their respective station circuits shown in FIG. 14 and in FIGS. 15 through 17.

As shown in FIG. 17 for the 1st station circuit, this ground is extended to the winding of the 17P relay, which relay it will be recalled is now operated since the associated station is in the wideband mode. This follows for the 27th station circuit since the 27th station is also in the wideband mode. However, the 2nd station circuit, shown in FIG. 14, does not have the 17P relay therein operated since that station, upon being added to the conference was a third conference station and thus was added only in an audio mode.

The operation of the 17P relay for the 2nd station circuit will now be discussed with reference to the station circuit associated with the 1st station shown in FIG. 17. Accordingly, ground is extended to one side of the winding of relay 17P as discussed previously. Since at this point the 2nd station is active in an audio-only mode, battery has been extended from transistor 16Q4, FIG. 16 in the manner previously described and through forward-biased diode 17CR2, enabled make contacts 17A-5 and 17B-5 and forward-biased diode 17CR23 to the other side of the winding of the 17P relay. Accordingly, the 17P relay operates in the 2nd station circuit at this time thereby connecting the 2nd station to the 1st link in a wideband mode.

Turning to FIG. 16, battery is extended from turned on transistor 16Q4 through enabled make contact 17P-5 to turn on transistor 16Q2 thereby extending ground over the V lead to the 2nd matrix, FIG. 23, in the manner previously discussed, thereby operating the 24V relay of the 1st link, 2nd matrix (not shown). At this point all three stations are in a wideband mode.

It will be recalled that when the initial connection between the 1st station and the 27th station was made the 17RV relay in the calling station operated to reverse the transmission leads of the calling station so that bidirectional wideband capability could be established between the calling and called stations. Since on wideband conference connections the direction of wideband communication is under control of the PICKS voice-operated switches and wideband distribution circuitry (FIG. 11–13) the 17RV relay in the original calling station must now be released.

Turning again to FIG. 17, it will be recalled that the 17RV relay is held operated via lead RVG and cable 2410 through the switching matrix FIG. 24 and vertical multiple RVGC to FIG. 23 and cable 2710 to the 1st link circuit, FIG. 27, and ground via break contact 27TRB-2. Since the 27TRB relay operated when the PICKS key was operated ground is removed from the RVGC lead via enabled break contact 27TRB-2. Thus any operated 17RV relay in any of the station circuits involved in the wideband conference on the 1st link releases.

Figure 10:
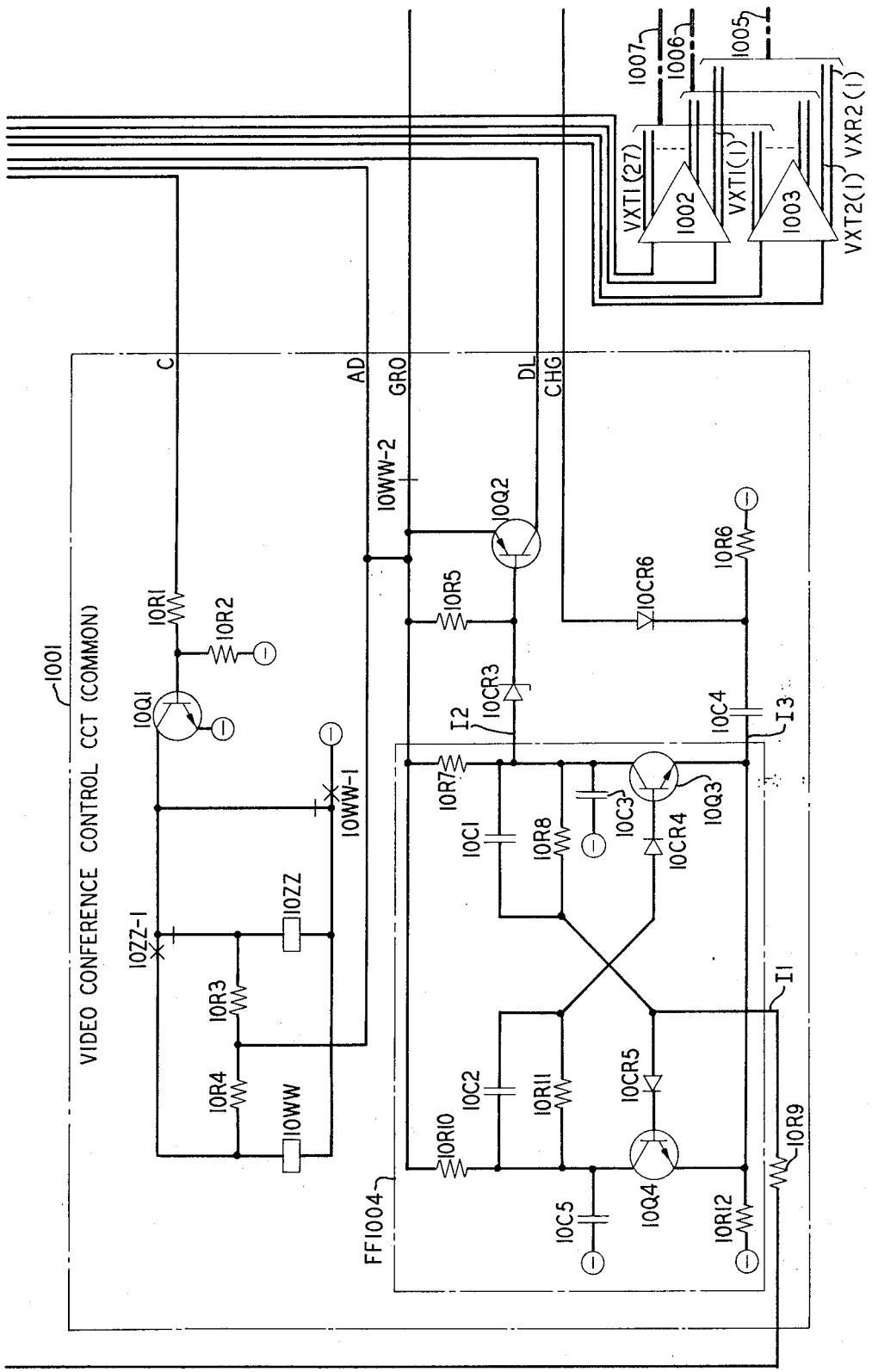

Returning now to FIG. 8, ground is extended via enabled make contact 8VC-4 and forward-biased diode 8CR12 over lead AD to FIG. 10 and the video conference control circuit 1001 which control circuit is common to the video conference control circuits for each of the links. Ground is thus supplied to the emitter of transistor 10Q2 and to an input of flip-flop 1004 which flip-flop is of the toggle type, changing states under control of input I3. Prior to the application of ground on lead AD, ground had been on the flip-flop input I1 via resistor 10R9 and a chain ground through each of the video conference control circuits and the released break contact 8VC-5 therein, as shown in FIG. 8. The effect of the ground on input I1 of flip-flop 1004 is to allow capacitor 10C1 to charge. This charge is provided from battery and resistor 10Q12 through the emitter junction o ftransistor 10Q3 to the capacitor 10C1. When the 8VC relay operates in the 1st link conference control circuit this ground is removed causing capacitor 10C1 to discharge. Capacitor 10C1 discharging ensures that transistor 10Q4 always turns on prior to transistor 10Q3 thereby maintaining transistor 10Q3 off. Thus lead I2 from flip-flop 1004 is maintained at ground so as to keep transistor 10Q2 off at this point. Transistor 10Q3 is maintained off at this point since battery extended through transistor 10Q4 and resistor 10R11 reverse biases diode 10CR4. The importance of the operational sequence of the 1004 flip-flop transistors will be discussed in more detail hereinafter.

Returning now to FIG. 8, it will be recalled that when the PICKS key was operated, ground was extended through the matrix to lead SCOGC(1). This ground is extended via enabled make contact 8VC-2 over lead C to the video conference control circuit 1001, FIG. 10. The ground is extended through resistor 10R1 to the base of transistor 10Q1 thereby enabling that transistor. Transistor 10Q1 turning on extends battery via released break contact 10WW-1 to one side of the windings of relays 10WW and 10ZZ, which relays function in the well-known W–Z fashion. The other side of the 10WW relay winding is extended through resistor 10R4 to ground on lead AD. Relay 10WW operates at this time while relay 10ZZ remains normal since battery is extended via released break contact 10ZZ-1 from the turned on transistor 10Q1.

The operation of relay 10WW provides holding battery for relays 10WW and 10ZZ from enabled make contact 10WW-1. When the PICKS key is released ground is removed from the SCOGC(1) lead, thereby removing ground from lead C, FIG. 10, and turning off transistor 10Q1. Relay 10ZZ then operates and locks operated through resistor 10R3 to ground provided over the AD lead in the manner previously described. At this point ground is removed from lead GRO via now enabled break contact 10WW-2. The purpose for removing ground at this time will become more apparent from that which is contained hereinafter.

Summarizing briefly at this point, upon the operation of a key at a station desiring to initiate a wideband conference among a number of other stations and dialing those stations into the conference, wideband capability has been extended to all of the stations connected to the same link. Directional control of the wideband transmission has been removed from the associated station circuits and has been given to the voice-operated control circuit. Upon initiation of the wideband conference connection, a lamp has been lighted at all of the wideband stations as an indication that a wideband conference connection is currently in progress.

3.1 Voice operated switch control of transmission

Figure 13:
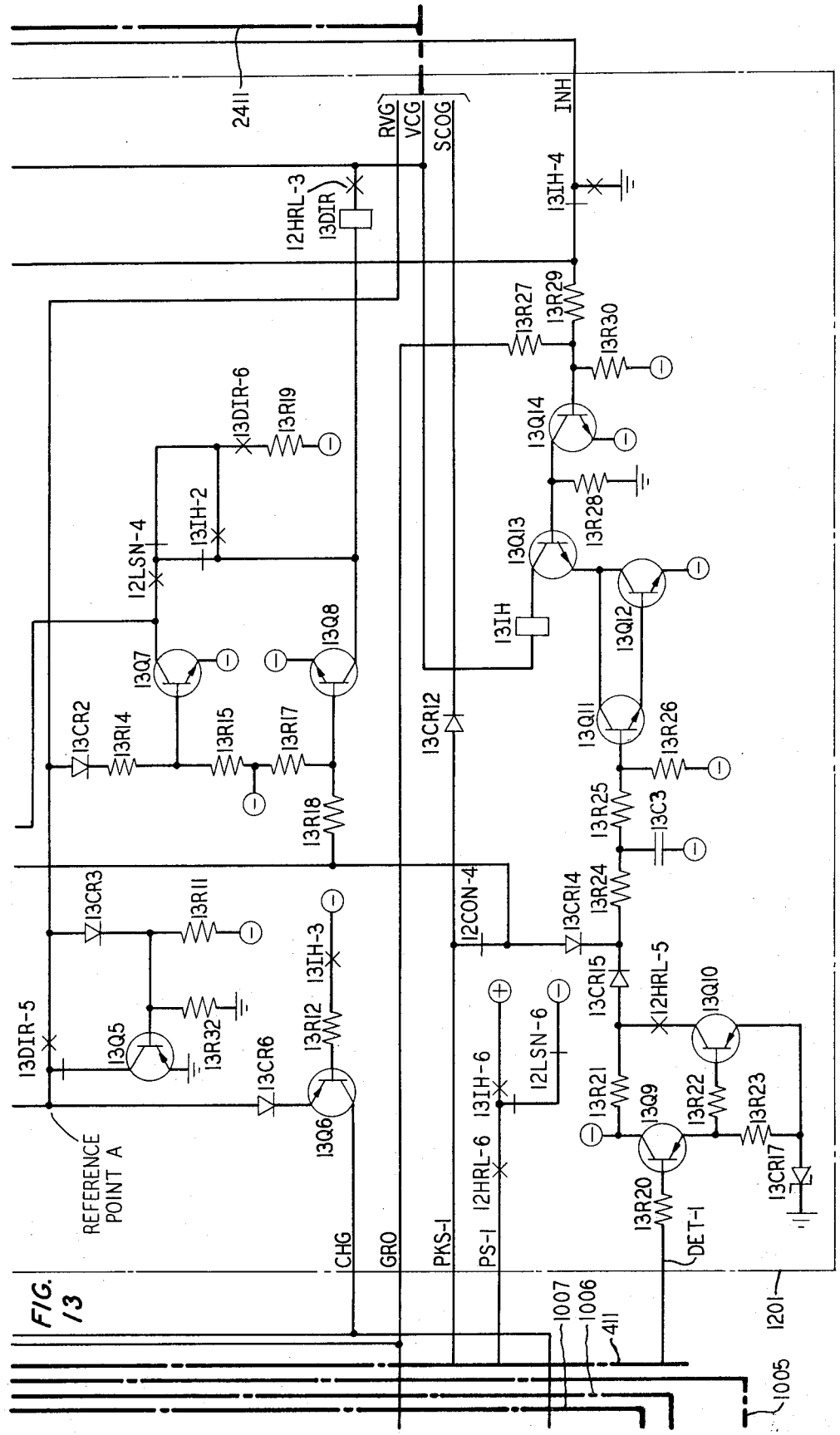

As discussed, wideband transmission of the conference connection is controlled by a PICKS voice-operated switch, such as PICKS voice-operated switch 1201 (shown in FIGS. 12 and 13). There is one such switch for each of the stations in the system and for convenience herein each switch will be considered as having four possible active modes of operation, namely, the originator mode, the present talker mode, the last talker mode and the listener mode. The originator mode is the mode in which the station which initiates a wideband conference connection is placed. Thus when the PICKS key is first operated (and released) the associated station becomes the originating station and the other stations are listening (viewing) stations.

As will become apparent hereinafter the status of each station's PICKS voice-operated switch controls the direction of wideband transmission to and from the associated station. Initially the status of the switches is determined by the operation of the PICKS key. However, after the initial orientation of the system and other stations become audio-active the direction of audio transmission controls the direction of the wideband transmission among the various stations. Thus at this point all of the conference stations receive transmission from the conference originator. Prior to discussing the actual transmission paths between the stations, the manner in which the switches assume their first operational mode will be discussed.

Turning now to FIGS. 12 and 13, the PICKS voice operated switch for the 1st station 1201 is as discussed previously, placed in the originator mode when the PICKS key at the 1st station is operated. This results since ground is present on lead PKS-1, which ground is extended via released break contact 12CON-4, forward-biased diode 13CR14 and resistors 13R24 and 13R25 to the base of transistor 13Q11. Transistors 13Q11 and 13Q12 are arranged as a Darlington pair such that when ground is supplied to the base of transistor 13Q11, transistors 13Q11 and 13Q12 turn on thereby supplying battery to the emitter of transistor 13Q13. Transistor 13Q14 is off at this point since none of the 13IH relays are operated thus ground is not present on the INH lead. Also it will be recalled that the GRO ground has been removed, as shown in FIG. 10, by the operation of relay 10WW. Therefore, since transistor 13Q14 is off, ground is supplied to transistor 13Q13 via resistor 13R28 thereby allowing transistor 13Q13 to turn on thereby supplying battery to one side of the 13IH relay winding. Relay 13IH operates to ground on lead VCG which ground is extended thereto in the following manner.

As shown on FIG. 8, relay 8VC operating supplies ground via enabled make contact 8VC-3 to lead VCGC(1) of cable 811 to FIG. 23 and the vertical multiple VCGC(1) of the 1st link to the horizontal multiple lead VCG of each of the matrix circuits connected to that link. This ground is then extended to the associated PICKS voice-operated switches for each matrix via cable 2411, and as shown in FIG. 13 for the PICKS voice-operated switch for the 1st station. This ground is extended over lead VCG to the winding of relay 13IH. Since as shown of FIGS. 23 and 24 ground on lead VCGC(1) was multiplied via the 1st link matrix circuits that ground is now on one side of the 13IH relay windings in each of the PICKS voice-operated switches connected to the conference. However, only the 13IH relay associated with the 1st station operates at this point.

Upon operation of the 13IH relay ground is supplied via enabled make contact 13IH-3 and INH lead to all of the other PICKS voice operated switches. Thus, as shown in FIG. 13, with reference to the first PICKS voice-operated switch, ground is present on the base of the 13Q13 transistors in each of the other switches. Thus, even if the PICKS key were to be operated at any of the other stations at this point the 13Q13 transistor in the associated PICKS voice operated switch would remain off, thereby maintaining the associated 13IH relay normal. In addition, ground on the INH lead prevents the other PICKS voice-operated switches from switching to the present talker mode when the 13Q11 and 13Q12 transistors therein become turned on from voice detected by their associated audio detection circuits, as well be described in more detail hereinafter.

Continuing in FIG. 13, ground on the PKS-1 lead of the 1st PICKS voice-operated switch is also extended through released break contact 12CON-4 and resistor 13R18 to the base of transistor 13Q8 thereby turning on that transistor and supplying battery to one side of the 13DIR relay winding. The other side of the 13DIR relay winding is connected via enabled make contact 12HRL-3 to the ground supplied on the VCG lead. Accordingly, relay 13DIR operates at this point. Relay 12HRL is operated in all of the switches at this time from turned on transistor 12Q5, FIG. 12, which transistor is turned on at this point from ground on its base via resistor 12R11 and forward-biased diode 12CR3 and lead V of cable 1502 from FIG. 15 and the collector of transistor 16Q2, FIG. 16. Transistor 16Q2, it will be recalled, is on at this point since every station connected to the wideband conference is in the wideband mode. Thus ground is extended on lead V.

Returning to FIG. 13, the operation of relay 13DIR extends lead RVG via enabled make contact 13DIR-5 to diode 13R6 which diode is connected to the emitter of transistor 14Q6. Lead RVG at this time has an absence of ground thereon, and therefore, even though battery is extended via enabled make contact 13IH-3 and resistor 13R12 to the base of transistor 13Q6 that transistor remains off. Lead RVG, as noted, has no ground potential thereon as can be seen by following lead RVG via cable 2411 to FIG. 24 and the horizintal multiple RVG and enabled make contact 24F-1 to the vertical multiple RVGC(1) and cable 811 back to the video conference control for the 1st link 801, FIG. 8, and through the enabled make contact 8CF-1 and lead DL to the video conference control circuit 1001 common to all of the video conference control circuits, FIG. 10 and to the collector of transistor 10Q2. Since, as discussed previously, transistor 10Q2 is off ground is not supplied over the DL lead. In fact a slight negative potential is present on lead DL (lead RVG, FIG. 13) from battery through resistor 13R11 and forward-biased diode 13CR3. This negative potential aids in maintaining the 13Q6 transistor off. When the 13DIR relay operates it locks operated to battery supplied from resistor 13R19 and enabled make contacts 13DIR-6 and 13IH-2 to its winding.

Turning now to FIG. 12, the operation of relay 13IH also provides battery via enabled make contact 13IH-1 to the base of transistor 12Q3, thereby maintaining transistor 12Q3 in its off state so as to prevent the operation of relay 12LSN, which relay can only operate from battery supplied from transistor 12Q3.

As shown in FIG. 13, transistor 13Q7 is maintained off at this point from battery supplied through resistor 13R15. Thus there is an absence of negative potential on the collector of transistor 13Q7, which collector is connected through diode 12CR9, FIG. 12, and released break contact 12CON-3 to one side of the winding of the 12CON relay. Thus, the 12CON relay cannot operate. Relays 12LSN and 12CON are maintained normal to keep the PICKS voice-operated switch for the 1st station in the originating state.

Since the respective circuitry of all of the PICKS voice-operated switches is identical only the circuitry for the 1st switch has been detailed. Thus the circuit operation of all switches will be discussed herein with respect to the circuitry shown in FIGS. 12 and 13 for the 1st switch with the understanding that the switching functions described in the following occur only in the particular switch noted.

Returning again to FIG. 13, ground on the PKS-1 lead of the 1st PICKS voice-operated switch is extended via released break contact 12CON-4 to FIG. 12 and through enabled make contact 13IH-5 to the LSF lead which lead is multipled to the PICKS voice-operated switches associated with the other stations. Thus, as detailed in FIG. 12 for the 1st station the ground supplied on lead LSF is extended through the respective 13IH-5 released break contact of the 2nd and 27th switches and through the respective forward-biased diodes 12CR1 and resistors 12R8 to the base of transistors 12Q3 thereby turning on the 12Q3 transistor in each of the other PICKS voice-operated switches. Relay 12LSN thereupon operates in each of those switches, which switches are now in their respective listener states. When the 12LSN relay operates it locks operated through enabled make contact 12LSN-3, resistor 12R31 and released break contact 13IH-1 to battery.

Again returning to FIG. 13, with respect to the 1st switch the ground on lead PKS-1 is removed when the PICKS key is released. The removal of ground on this lead allows the transistors of the Darlington pair (13Q11 and 13Q12) to turn off thereby turning off transistor 13Q13 which in turn allows relay 13IH to release. However, relay 13DIR is maintained operated at this time from battery supplied from resistor 13R19, enabled make contact 13DIR-6, released break contacts 12LSN-4 and 13IH-2 to its winding.

As mentioned previously, the RVG lead has an absence of ground thereon at this time thereby maintaining transistors 13Q5, 13Q6 and 13Q7 off in each of the PICKS voice-operated switches. Accordingly, since transistor 13Q7 is off relay 13DIR in the switches for the 2nd and 27th stations remains normal at this point. Transistor 13Q8 also is off at this point from battery supplied through resistor 13R17 since the PKS-1 lead in the respective switches has an absence of ground thereon. The PICKS switches for the 2nd and 27th stations are now in the listener mode.

Summarizing briefly, the PICKS switch for the 1st station is set in the originator mode with relays 12LSN and 12CON normal and relay 13DIR operated while the PICKS switches for the 2nd and the 27th stations are in the listener mode with the 13DIR relay normal and the 12LSN and 12CON relays operated.

3.2 Wideband transmission between the stations

Assuming at this point that none of the stations is communicating in an audio manner, the wideband transmission will be as follows: Starting from the camera of the 1st video set 401, shown in FIG. 4, transmission originating from camera C1-1 is extended via pad P1-1 and video control VC1-1 over video output leads VOT(1) and VOR(1) of cable 411 to FIG. 12 to the PICKS voice-operated switch for the 1st station and over input leads VOT(1) and VOR(1) and through released break contacts 12LSN-1 and 12LSN-2, and on enabled make contacts 13DIR-1 and 13DIR-2 to video output leads VITP and VIRP to FIG. 15 and through now released break contacts 17RV-5 and 17RV-2 and leads VIT1 and VIR1 and cable 2410 to FIG. 24 and the 1st matrix associated with the 1st link and through enabled crosspoint contacts 24V-4 and 24V-5 through the respective vertical multiple VIRC and VITC (transmit pair of wideband bus) FIG. 23, and over cable 511 back to the video conference control circuit FIG. 8 over leads VITC and VIRC and through enabled make contacts 8VC-10 and 8VC-11, to video amplifier 1003. Video amplifier 1003 is arranged in any one of the well-known circuit configurations operable to take a signal transmitted on a pair of input wires and distribute that signal between a number of output wire pairs with negligible loading of the transmission leads. Thus the wideband signal from the 1st station is applied to the input of amplifier 1003 and is extended via cables 1005, 1006 and 1007 to each of the PICKS voice-operated switches.

Continuing in FIG. 12, the transmission leads are connected to the PICKS voice-operated switch for the 1st station via leads VXT2(1) and VXR2(1). Also at this time the same transmission leads are coupled to the PICKS voice-operated switch for the 2nd station via leads VXT2(2) and VXR2(2) and to the PICKS voice-operated switch for the 27th station via leads VXT2(27) and VXR2(27). In the PICKS voice-operated switch for the 1st station, FIG. 12, the input transmission leads are respectively dead-ended because of the enabled condition of break contacts 13DIR-3 and 13DIR-4. With respect to the PICKS voice-operated switches for the 2nd and 27th stations, the transmission from the camera of the 1st station is extended through the respective switches (detailed in FIG. 12) through the released break contacts 13DIR-3, 13DIR-4 and enabled make contacts 12CON-1 and 12CON-2 over leads VIT(1) and VIR(1) of cable 411 back to the video set associated with the 2nd station and with the 27th station respectively, such that video transmission is extended through the respective video control circuit VC1- and pad P2- to the screen S1- of each video set. Accordingly, wideband transmission is possible from the camera of the 1st video set over the just-described transmission path to the screen of each video set connected to the conference.

Wideband transmission is also possible from the camera C1-1 of the 1st video set over the just-described connection to the PICKS voice-operated switch for that station and through released break contacts 12LSN-1 and 12LSN-2, enabled make contacts 13DIR-1 and 13DIR-2 and released break contacts 12CON-1 and 12CON-2 over leads VIT(1) and VIR(1) of cable 411 to the screen S1-1 of the 1st video set such that transmission originating from camera C1-1 of the 1st video set is returned to the screen S1-1 thereof. At this point the only transmission being received in the system is that transmission which originates from camera C1-1 of the 1st video set. This follows since the cameras of each of the other stations are connected over the just-described connection of their respective VOT(1), VOR(1) leads of cable 411 to their respective PICKS voice-operated switches, FIG. 11. As shown in FIG. 12 transmission on the VOT(1) and VOR(1) leads is dead-ended via the enabled condition of break contacts 12LSN-1 and 12LSN-2.

3.3 Audio transmission

Assume now that the 1st station begins communicating in an audio manner. Accordingly, as shown in FIG. 4, speech pickup 404, which speech pickup is arranged in any one of the well-known circuit configurations operable to detect the presence of voice signals, provides a negative potential over lead DET-1 of cable 411 to FIG. 13 and the PICKS voice-operated switch for the 1st station. This negative potential is extended via resistor 13R20 to the base of transistor 13Q9 which transistor turns on to ground supplied via Zener diode 13CR17 and resistor 13R23. Transistor 13Q9 turning on supplies battery via resistor 13R22 to the base of transistor 13Q10 which transistor also turns on at this point supplying ground via enabled make contact 12HRL-5 and forward-biased diode 13CR15 and resistor 13R24 thereby charging capacitor 13C3. When capacitor 13C3 charges to its threshold potential ground is supplied to the base of transistor 13Q11 via resistor 13R25 thereby again turning on the Darlington pair and again supplying negative potential to the emitter of transistor 13Q13. Therefore, relay 13IH again operates. Since the PICKS voice-operated switch for the 1st station is currently in the originating mode, the operation of the 13IH relay therein at this point has no effect and the wideband transmission continues from the 1st video station to all other stations without interruption.

Since the wideband conferencing arrangement as shown herein functions in such a manner that the video received image at a station remains uninterrupted when that image is unchanged when the associated station takes command of the system, a situation could occur when a controlling party does not have an external indication that his camera is "on." To some, this condition could cause distractions and momentary confusion. This problem is overcome by providing a lamp at the station which lights whenever the associated camera is transmitting an image to the other stations on the conference. In addition, when the camera of a station is transmitting an image to the last talker station a separate signal is provided. These lamp signals are provided, as shown in FIG. 13, from the combination of contacts 12HRL-6, 13IH-6 and 12LSN-6. Thus, when relay 13IH operates (present talker mode) positive potential is applied to lead PS-1, which potential lights lamp PSR in the associated station, FIG. 4. Lamp PSG operates when lead PS-1 has negative potential thereon, which potential is supplied, as shown in FIG. 13, when relay 13IH is normal and relay 12LSN (listener mode) is also normal.

3.4 Change in audio transmission direction

When the 27th station as shown in FIG. 2 (or any other listener station) and detailed in FIG. 4, begins audio transmission a negative potential is extended over lead DET-27 to the PICKS voice-operated switch for the 27th station, shown in FIG. 11 and detailed in FIG. 13. Thus as discussed previously, negative potential on the DET- lead causes the Darlington pair of the 27th station switch to turn on thereby extending negative potential to the 13Q13 transistor. Since the 13IH relay of the 1st switch is operative as an indication that audio transmission is also being received from the 1st station, the INH lead of all other station switches have ground thereon. Thus the base of transistor 13Q14 in the 27th station switch is grounded thereby turning on transistor 13Q14. Negative potential is extended to the base of transistor 13Q13. This negative potential clamps transistor 13Q13 off thereby preventing the operation of the associated 13IH relay in any switch other than the 1st switch. Accordingly, as long as a currently audio-active station continues to communicate in an audio manner, audio transmission from any other station, although transmitted to all stations over the audio conference bus, does not effect wideband switching at this point.

When audio activity from the 1st station is interrupted, the negative potential is removed from the DET-1 lead, FIG. 4, thereby removing negative potential from the 1st PICKS voice-operated switch FIG. 13 lead DET-1 and from the base of transistor 13Q9 therein. Accordingly, transistors 13Q9 and 13Q10 turn off thereby removing the ground potential from resistor 13R24 so as to allow the 13C3 capacitor to discharge at this point. During the discharge interval the Darlington pair remains operated so that short interruptions in audio activity, such as occur in normal speech patterns, will have no effect. Timing of this function is nominally around 125 ms. and can be set to any length desired. At the conclusion of this period, if audio activity has not resumed the Darlington pair will turn off thereby releasing the 13IH relay of the 1st switch. Accordingly, ground is removed from the INH lead thereby allowing the operation of transistor 13Q14 in the 27th voice-operated switch so as to allow the operation of the 13IH relay therein.

Continuing now with the 27th switch, as detailed with respect to the 1st switch in FIGS. 12 and 13, since the 13DIR relay of the 27th station is not operated at this time and since transistor 13Q5 is turned on from battery extended via resistor 13R11 to its base ground is extended via released break contact 13DIR-5 and forward-biased diode 13CR6 to the emitter of transistor 13Q6. When the 13IH relay operates in the 27th switch upon completion of the audio transmission from the 1st station, battery is extended via enabled make contact 13IH-3 and resistor 13R12 to the base of transistor 13Q6 thereby turning on that transistor. Accordingly, a ground is extended on lead CHG to the video conference control circuit 1001, FIG. 10 and forward-biased diode 10CR6 to capacitor 10C4 therein. This ground is shaped by the combination of capacitor 10C4 and resistor 10R6 and supplied as a trigger input over input I3 of flip-flop 1004 thereby causing the transistors therein to change states such that transistor 10Q3 now turns on while transistor 10Q4 turns off. Negative potential from resistor 10R12 is extended via turned on transistor 10Q3 over lead I2 of flip-flop 1004 and Zener diode 10CR3 to the base of transistor 10Q2 thereby turning on transistor 10Q2. Ground which had been extended to the emitter of transistor 10Q2 via lead AD in the manner previously described is now extended over lead DL to FIG. 8 to the video conference control circuit for the 1st link and through enabled make contact 8CF-1 and over lead RVGC(1) of cable 811 to FIG. 23 to vertical multiple RVGC and thus to the horizontal multiple RVG associated with each of the enabled matrix circuits. Thus ground is extended via cable 2411 to the switch for each of the stations connected to the conference.

Continuing now in FIG. 13, with respect to the 27th voice-operated switch the ground potential on the RVG lead is extended through forward-biased diode 13CR2 and resistor 13R14 to the base of transistor 13Q7. Transistor 13Q7 turns on thereby supplying battery on its collector lead. However, at this point that battery cannot operate the 13DIR relay because of the enabled condition of break contact 13IH-2. Battery from the collector of transistor 13Q7 is also extended to FIG. 12 and through diode 12CR9 and to the 12CON-3 break contact. However, since the 12CON relay in the 27th switch is operated the battery supplied is of no consequence.

Returning to FIG. 13, ground on the RVG lead of the 27th switch is extended via diode 13CR3 to the base of transistor 13Q5 thereby clamping that transistor off thereby turning transistor 13Q6 off. Ground is thus removed from lead CHG.

Turning now to FIG. 12, the operation of the 13IH relay in the 27th switch releases relay 12LSN. This is accomplished because of the removal of battery from the winding of relay 12LSN via enabled break contact 13IH-1. It should be noted that transistor 12Q3 remains off at this point because of the enabled condition of break contact 13IH-5. In addition, transistor 12Q4 is also off since, as shown in FIG. 13, ground has been removed from the emitter thereof via enabled break contact 13IH-4. Accordingly at this point the PICKS voice-operated switch for the 27th station is switched to the present talker mode with the 13IH, 12HRL and 12CON relays operated and the 12LSN and 13DIR relays normal. Thus, positive potential is supplied on lead PS-27 to turn on lamp PSR at the 27th station as an indication that all other conference stations are receiving wideband transmission therefrom.

In addition, it is important to note that ground is now absent from reference point A because the 27th station took control of the system with transistor 10Q2 conducting and relay 13DIR normal. Thus, transistor 12Q3, FIG. 12, is clamped off from battery via enabled make contact 13IH-1 to its base, and the 27th switch is prevented from going into the listener mode (relay 12LSN operated). As will be more fully detailed hereinafter, the 27th switch will not go into or remain in the listener mode when the 1st station regains control because at that point ground will be removed from lead RVG, thereby allowing transistor 13Q5 to turn on so as to supply ground, via diode 12CR5 to clamp transistor 12Q4 off.

Also as will be more fully detailed, transistor 12Q4 will conduct to turn on transistor 12Q3 and activate relay 12LSN only when there is an absence of ground from reference point A and some other station is applying ground to lead INH. This situation can arise for the 27th station only when it has been in the last talker mode and a station other than that which has been present talker (and other than station 27) gains control of the system.

Continuing now with respect to the PICK voice-operated switch for the 1st station which switch must be changed from the originating mode to the last-talker mode. Thus, as shown in FIG. 12 ground on the RVG lead is extended through forward-biased diode 13CR2, resistor 13R14 to turn on transistor 13Q7 thereby supplying negative potential to diode 12CR9, FIG. 12, and via released break contact 12CON-3 to operate relay 12CON. Relay 12CON thereupon locks operated to the negative potential from resistor 12R5 and enabled make contact 12CON-3. At this point the PICKS voice-operated switch for the 1st station is in the last talker mode with the 12HRL, 12CON and 13DIR relays operated and the 12LSN and 13IH relays normal. Thus, negative potential is supplied on lead PS-1 to return on lamp PSG at the 1st station as an indication present talker station is receiving wideband transmission therefrom.

Continuing now with respect to the PICKS voice-operated switch for the 2nd station which switch remains in the listener mode. Although there is no mode change at this point for the 2nd switch the wideband transmission direction must be reversed so that wideband transmission will be received from the 27th station and not from the 1st station. This reversal is controlled by ground on the RVG lead, FIG. 13 of the 2nd switch which ground turns on transistor 13Q7 in the manner previously described, so that negative potential from the collector of transistor 13Q7 is extended via the enabled make contact 12LSN-4 and released break contact 13IH-2 to operate the 2nd switch 13DIR relay. At this point the PICKS voice-operated switch for the 2nd station is in the listener mode with transmission set for receipt from the 27th station. Wideband transmission is not being transmitted from the second station at this point as indicated by the off condition of both lamps PSR and PSG, FIG. 4. These lamps are off due to the enabled condition of break contact 12LSN-6, FIG. 13, in the 2nd switch.

3.5 Wideband transmission among the stations

As shown in FIG. 4 the output leads from the camera C1-1 of the 1st station are extended, as previously noted, over cable 411 to the voice-operated switch associated with the 1st station, FIG. 12 and through released break contacts 12LSN-1 and 12LSN-2 and via the still operated 13DIR-1 and 13DIR-2 make contacts to leads VITP and VIRP. It will be recalled that transmission from the camera of the 1st station previously had been extended back to its own screen via leads VIT(1) and VIR(1) through the previously released 12CON-1 and 12CON-2 break contacts. However, since the 12CON relay is now operated in the first switch, this transmission is blocked. However, transmission from the 1st station is still extended over leads VITP and VIRP and through the matrix (FIGS. 23 and 24) as previously discussed and through the video conference control circuit (FIG. 8) also as discussed to amplifier 1003, FIG. 10 and thus to the respective voice-operated switches.

Since the 13DIR relay is still operated in the 1st switch, wideband transmission is again dead-ended as shown in FIG. 12, via the enabled break contacts 13DIR-3 and 13DIR-4. This transmission is also dead-ended in the 2nd switch via the enabled condition of the associated 13DIR relay. However, since the 14DIR relay in the 27th station is normal transmission is possible from the output of amplifier 1003 via cable 1007 to the PICKS voice-operated switch for the 27th station, FIG. 11 (detailed FIG. 12) and is extended over the VXT2(27) and VXR2(27) leads and through released break contacts 13DIR–3 and 13DIR–4 and enabled make contacts 12CON–1, 12CON–2 over leads VIT(27) and VIR(27) of cable 411 back to the 27th video set, FIG. 2, and to the screen thereof (not shown). Thus wideband transmission is possible from the 1st video set camera over the just-described circuit path to the screen of the 27th video set. Accordingly, wideband transmission continues from the last talker (1st video set) to the present talker (27th video set) and this transmission continues to be supplied to the 27th video set over the same path as previously described without any break in continuity of that transmission path.

With respect to the camera of the 27th station, FIG. 2 (detailed in FIG. 4) the video output leads are extended to the 27th voice-operated switch FIG. 11, and as detailed in FIG. 12, through released break contacts 12SN–1 and 12LSN–2 and through released break contacts 13DIR–1 and 13DIR–2 and over leads VOTP AND VORP and through the 27th station circuit, FIG. 14 (detailed in FIG. 15) and over leads VOT1 and VOR1 of cable 2410 and through the 27th matrix to the vertical multiples VOTC and VORC (receive pair of wideband bus) and via cable 511 back to the video control circuits associated with the conference stations on the 1st link over leads VOTC and VORC. Thus, as shown in FIG. 8, transmission is extended via enabled make contacts 8VC–8 and 8VC–9 and to the video amplifier 1002 which amplifier functions in the exact manner as previously described for amplifier 1003. Accordingly, transmission from the 27th station is extended from amplifier 1002 to each of the PICKS voice-operated switches such that in the 1st switch the transmission path includes leads VXT1(1) and XVR1(1), enabled make contacts 13DIR–3 and 13DIR–4 and now enabled make contacts 12CON–1 and 12CON–2 and leads VIT(1) and VIR(1) back to the screen of the 1st video set 401, FIG. 4. Thus wideband transmission originating from the 27th video set is communicated via the just-described circuit connection to the screen of the 1st video set.

Continuing in FIG. 11 transmission received over the VXT1(2) and VXR1(2) lead of the 2nd switch is similarly extended, as shown in FIG. 12, via the operated 13DIR–3, and 13DIR–4, 12CON–1 and 12CON–2 make contacts and leads VIT(2) and VIR(2) back to the screen of the 2nd video set. Accordingly wideband transmission is also communicated from the 27th video set to the screen of the 2nd video set.

Again continuing in FIG. 11, wideband transmission originating from the 27th video set is extended to the 27th switch via leads VXT1(27) and VXR1(27) in the manner previously described. However, as shown in FIG. 12, this transmission is blocked because of the released condition of make contacts 13DIR–3 and 13DIR–4 associated with the 27th switch.

3.6 Communication control returned to the 1st station

Assume now that the 1st station again becomes audio-active. In this situation the transmitted video from the 27th station continues to be received on the screen of the 1st video set while the transmission from the camera of the 1st set continues to be viewed on the screen of the 27th video set. Again the only change at the 2nd station is that now transmission is received from the camera of the 1st video set as opposed to being received from the camera of the 27th set.

Turning now to FIG. 13, when audio transmission is detected at the 1st station the DET–1 lead again has a negative potential thereon. Thus at the expiration of the timing period, as above discussed, the 13IH relay operates. Upon operation of the 13IH relay in the 1st station switch a pulse is again transmitted over the CHG lead to FIG. 10. Since the images received by both the 1st and 27th stations do not change at this time no other relay change occurs in the respective switches. The only change which does occur on the switches occurs in the 2nd switch as will be discussed.

Continuing in FIG. 10, upon the extension of the ground pulse on lead CHG to the video conference control circuit flip-flop 1004 again changes state now turning off transistor 10Q2. Thus ground is removed from lead DL, which ground it will be recalled was transmitted through the matrix circuit and back to the switches (FIG. 13) via lead RVG. Removal of ground from lead RVG allows transistor 13Q7 to turn off. Transistor 13Q7, it will be recalled operated relay 12CON which relay locked operated. Thus relay 12CON remains operated in the 1st, 2nd and 27th switches. Also relay 13DIR remains operated in the 1st switch from battery via enabled make contacts 13DIR–6 and 13IH–2. The 13DIR relay is normal in the 27th switch and remains normal. In the 2nd switch the 13DIR relay is operated and since the 2nd station is a listener station the 12LSN relay is also operated. Thus, when transistor 13Q7 turns off relay 13DIR in the 2nd switch releases.

Digressing momentarily, it will be noted that the direction of transmission between the stations is controlled by the 13DIR relay such that that relay must be in the opposite operational status from that of the 13DIR relay in the present talker station. Thus, the actual operational status of the 13DIR relay does not control transmission but rather the relative status of those relays is the controlling factor.

Turning now to FIG. 10, it will be recalled that the input to amplifier 1002 is connected to the camera of station 27 while the input to amplifier 1003 is connected to the camera of the 1st video station. This remains true since there has been no change in the voice-operated switches for either the 1st or 27th station. As shown in FIG. 12, the change in status of the 13DIR relay for the 2nd switch causes the video receive leads VIT(1) and VIR(1) in the 2nd switch to become associated with the leads VXT2(2) and VXR2(2) as opposed to being associated with leads VXT1(2) and VXR1(2) as before. Thus transmission is switched from an output of amplifier 1002 to an output of amplifier 1003. Accordingly, transmission on the screen of the 2nd video set is received from the camera of the 1st video set as opposed to being received from the camera of the 27th video set.

It should be noted that the transmission paths between the cameras and the screens of the 1st station and the 27th station continues on the same connection as before the change since the 27th station was the last speaker and the 1st station is the new speaker and each station continues to receive transmission from the other. Accordingly, on the screens of both these stations at this time there is a continuity of wideband transmission. Transmission received by the screen of the 2nd (listening) station, however, is momentarily interrupted when the transmission paths are reoriented. Accordingly, as long as audio communication continues to alternate between the 1st station and the 27th station (or any other two stations on a wideband conference) wideband transmission path switching will take place between those stations. Thus conference control may go back and forth under control of two conference dominating stations and transmission switching will only occur at the listening stations associated with the wideband conference.

3.7 Conference control by a listening station

Let us assume at this point that the 1st station has control of the conference and that the 27th station is in the last talker mode. Also assume that a listener mode station, such as the 2nd station, now begins audio transmission. Thus when audio activity ceases at the 1st station, the 2nd station takes control and becomes the present talker station.

Turning now to FIG. 13, with reference to the 2nd switch, battery potential on the DET-2 lead turns on transistors 13Q9 through 13Q13 thereby operating the 13IH relay associated with the 2nd voice-operated switch. Again as a result of this operation a pulse is transmitted over lead CHG to the video conference control circuit, FIG. 10. When flip-flop 1004 changes state ground is again supplied on the DL lead which ground is extended to FIG. 13 to the RVG leads of all the voice-operated switches.

With reference to the 27th voice-operated switch (FIG. 13) ground on the RVG lead turns off transistor 13Q5, thereby removing ground from the diode 12CR5, FIG. 12, and allowing battery to be supplied via resistor 12R10 and diode 12CR4 to the base of transistor 12Q4. Ground is supplied to the emitter of transistor 12Q4 from FIG. 13 via lead INH from the 13IH relay operated in the 2nd voice-operated switch. This ground is extended via released break contact 13IH-4 to FIG. 12 and via varistor 12RV3 to the emitter of transistor 12Q4. Transistor 12Q4 turns on thereby supplying ground via resistor 12R8 to the base of transistor 12Q3. Since the 27th switch is not in the present talker mode, the respective 13IH relay is normal and thus battery is removed from the base of transistor 12Q3 via now normal make contact 13IH-1. Thus transistor 12Q3 turns on and battery is supplied to the winding of relay 12LSN thereby operating that relay. The 12LSN relay locks operated in the manner previously described.

Continuing in the 27th voice-operated switch, FIG. 13, ground on the RVG lead is extended via diode 13CR2 and resistor 13R14 to the base of transistor 13Q7 which transistor turns on thereby supplying battery through now enabled make contact 12LSN-4 and released break contact 13IH-2 to operate relay 13DIR. Accordingly, at this point the 27th station voice-operated switch is now in the listener state with the 12LSN and 13DIR relays operated and the 13IH relay normal. Other relays, such as the 12CON and 12HRL relays, are also operated but since these relays take no part in transmission direction control they will not be mentioned hereinafter.

With respect to the 1st station voice-operated switch, FIG. 13, since the 13DIR relay is previously operated that relay remains operated when ground is supplied on the RVG lead. This follows since the 1st station is now neither a listener station (relay 12LSN operated) nor a present talker station (relay 13IH operated) and battery from enabled make contact 13DIR-6 is supplied to relay 13DIR via released break contacts 12LSN-4 and 13IH-2. Thus ground on lead RVG is extended via enabled make contact 13DIR-5 and diode 12CR5 to clamp transistor 12Q4 off thereby preventing any change in state of the now normal 12LSN relay. Accordingly, the 1st station voice-operated switch is now in the last talker state with the 13DIR relay operated and 12LSN and 13IH relays normal.

With respect to the 2nd station voice-operated switch, the enabling of the 13IH relay therein, removes holding battery via now enabled break contact 13IH-1 to release relay 12LSN. Transistor 12Q3 is clamped off at this time from battery via enabled make contact 13IH-1. As shown in FIG. 13, since the 13IH relay operates prior to the release of the 12LSN relay, the 13DIR relay is clamped to its previous state which in this case is off because of the combination of the transfer contacts 13IH-2 and 12LSN-4. Accordingly, even though transistor 13Q7 turns on, relay 13DIR remains normal. Thus the 2nd switch is in the present talker state with the 13IH relay operated and the 13DIR and 12LSN relays normal.

3.8 Transmission between stations under control of the 2nd station

Since it has been assumed that the 1st station was the previous talker and since under this assumption the 13DIR relay in the 1st voice-operated switch remained operated and did not change states the output from the camera of the 1st video set continues to be associated with the input to amplifier 1003, FIG. 10. The input to the 1002 amplifier, FIG. 10, however is switched from the 27th video set to the camera of the 2nd video set in the following manner. As shown in FIG. 12, with respect to the 27th station voice-operated switch, the 12LSN relay is operated thereby opening the output leads VOT(27) and VOR(27) from the 27th video set camera via now enabled break contacts 12LSN-1 and 12LSN-2. Accordingly, the camera of the 27th station is now dead-ended in its respective voice-operated switch.

With respect to the 2nd station voice-operated switch, since the 12LSN relay is now normal, video transmission over leads VOT(1) and VOR(1) from the camera of the 2nd set is extended through the voice-operated switch and through the now released break contacts 12LSN-1 and 12LSN-2, and released break contacts 13DIR-1, 13DIR-2 and leads VOTP and VORP, which leads, it will be recalled, were extended through the matrix network and back to the input of amplifier 1002, FIG. 10.

With respect to the 1st station, transmission from the output of amplifier 1002 is extended, as shown in FIG. 12, through the voice-operated switch for the 1st station and leads XVT1(1) and VXR1(1) through enabled make contacts 13DIR-3 and 13DIR-4 and enabled make contacts 12CON-1 and 12CON-2 to the VIT(1) and VIR(1) leads of the receiver of the 1st video set. Accordingly, the screen of the 1st video set now receives transmission originating from the camera of the 2nd set. In similar manner, transmission from the 2nd station is transmitted via amplifier 1002, FIG. 10, to the voice-operated switch for the 27th station, FIG. 11, and, over leads VXT1(27) and VXR1(27) through enabled make contacts 13DIR-3, 13DIR-4, 12CON-1 and 12CON-2 to the screen of the 27th video set in the manner previously discussed. Accordingly, transmission originating from the camera of the 2nd station is also present on the screen of the 27th station.

It will be recalled that, as shown in FIG. 10, and discussed previously, transmission originating from the camera of the 1st video set is present on the input of amplifier 1003, and is extended to the voice-operated switch for the 2nd station, FIG. 11, over leads VXT2(2) and VXR2(2) and as shown in FIG. 12 is extended through released break contacts 13DIR-3, 13DIR-4 and enabled make contacts 12CON-1, 12CON-2 and over leads VIT(2) and VIR(2) to the screen of the 2nd video set. Accordingly, transmission originating from the camera of the 1st video set, which station is in the last talker mode, is now present on the screen of the 2nd video set.

3.9 Video conference hold

It will be recalled that when the hold key at any station connected to a link is operated transistor 16Q2, FIG. 16, turns off thereby removing the ground from the V lead, FIG. 15. Accordingly, as shown in FIG. 12, the removal of ground from the V lead allows relay 12HRL to release. The release of the 12HRL relay in the voice-operated switch associated with the station going on hold, causes the release of the 12CON relay via now released make contact 12HRL-4 and also causes the release of the 13DIR relay via released make contact 12HRL-3. The effect of the release of these relays will depend upon the state of the voice-operated switch associated with the station going on hold. If the station had been a listener station, that station's screen will be blank without having any effect on any of the other parties to the conference. If, however, the station going on hold is the present talker station, then wideband transmission therefrom will be blocked throughout the system. If the station going on hold is a last talker station, then the transmission originating with the present talker will continue to be transmitted to the other stations on the conference but the present talker will receive a blank screen from the last talker who has gone on hold.

Control of the hold function is accomplished by the combination of the contacts as shown in FIG. 12. If the station going on hold is a listener station, wideband transmission is blocked from the respective receive leads VIT(1) and VIR(1) via released make contacts 12CON–1, 12CON–2, 13DIR–1 and 13DIR–2. Where the hold station is a last talker station transmission thereto is blocked in the above manner and transmission therefrom (to the present talker station) is blocked because the 24V relay, FIG. 24 in the associated matrix releases when ground is removed from the V lead. When the hold station is a present talker station transmission therefrom and thereto is blocked as above described. In this situation when audio transmission commences at any other station to the conference that station becomes the present talker station and the system reorients as described.

In the event that the station going on hold remains on hold and at the same time audio transmission originated therefrom is directed to some station not in the conference (such as PBX line), the speech detector thereat will provide negative potential on lead DET. However, as shown in FIG. 13, the detection of speech at a station on hold has no effect because of the released condition of make contact 12HRL–5. Turning to FIG. 12, when a station goes on hold ground is supplied via released break contact 12HRL–2 to charge capacitor 12C1. Accordingly, when the station on hold returns to the conference by reoperating the intercom key, the 12HRL relay again operates and the ground potential stored on capacitor 12C1 provides a pulse via resistor 12R7 to the base of transistor 12Q3, thereby turning a relay 12LSN if released. Relay 12CON also operates under control of transistor 12Q3 and diode 12CR10. Since the 12LSN relay operates whenever a station returns from the hold position, that station is automatically brought into the system as a listener station and accordingly communication can only be directed to the screen of the associated station while transmission is blocked from the camera thereof in the manner previously described. In addition, when a station returns to the conference from the hold condition transmission between the presently communicating stations on a conference link is not affected. Thus, as shown in FIG. 13, when a station returns from a hold condition the associated 13DIR relay may or may not operate depending upon the condition of lead RVG at the time that station returns. Thus if a ground is present on lead RVG the 13DIR relay will operate under control of transistor 13Q7 and conversely if a ground is not present on the RVG lead, the 13DIR relay will remain normal. The purpose of the operation of the 13DIR relay at this point is to associate the returning station with the proper video amplifier 1002 or 1003 corresponding to the now present talker.

3.10 Wideband conference override

Situations could occur where it is desired to maintain a station in the present talker mode for a period of time without regard to the directional status of the audio transmission from the respective stations. This situation could occur when one of the stations is in a graphics mode or when one of the stations is transmitting computer data to the other stations without audio communication from the transmitting station. The operation of the PICKS key a second time at any of the stations on the video conference will lock the system into the mode in which it is presently operating. This is accomplished by providing a ground potential on the PKS– lead shown in FIG. 3 which lead is extended through FIG. 13 of the associated voice-operated switch for that station and, as previously discussed, is extended over the SCOG lead and back through the matrix network to FIG. 8 on the SCOGC– lead and through the enabled make contact 8VC–2 and lead C to the video conference control, FIG. 10. Ground on lead C turns on transistor 10Q1 thereby shunting relay 10WW to the unoperated condition. When the key is released ground is removed and relay 10ZZ then releases. Accordingly, ground potential from the AD lead is extended through now released break contact 10WW–2 over lead GRO to the voice-operated switch for each of the stations. This ground is extended through resistor 13R27 to the base of transistor 13Q14 thereby turning on transistor 13Q14 so as to clamp transistor 13Q13 off. Thus none of the 13IH relays may operate regardless of the status of the respective DET-leads. Accordingly, the system is locked into the mode in which it is presently operating such that communication will continue from the camera of the present talking station regardless of whether audio transmission occurs at that station or at any other station to the conference. The system is returned to normal operation by the enabling of the PICKS key which again operates the 10WW and 10ZZ relays in the video conference control circuit, FIG. 10, in a straightforward manner.

3.11 Termination of a wideband conference

When all of the stations to a conference, except one station, go on-hook the conference circuitry will automatically return to its normal condition and be available for establishing a conference on any link between any other station. Turning now to FIG. 27 in the 1st link circuit, it will be recalled that the TRI lead (relay 26TD operated) has a ground thereon whenever two or more stations are connected to the same link. Therefore, when all but one station go on-hook, ground is removed from the TRI lead which lead is extended, via cable 811 back to FIG. 8. Removal of ground from lead TRI removes the ground clamp of transistor 8Q3 and thus transistor 8Q3 turns on to battery via resistor 8R7 and diode 8CR10. The emitter of transistor 8Q3 is connected to ground via enabled make contact 8VC–4. Accordingly, a ground is extended over lead LKR and cable 811 to FIG. 25 and through resistor 25R26 to the base of transistor 25Q7, thereby clamping transistor 25Q7 off and allowing relay 26LB to release. When relay 26LB releases, as previously discussed, the link thereby releases. As shown in FIG. 27 when the link circuit releases, relay 27TRB therein releases, thereby removing battery via now released make contact 27TRB–1 from the TR lead which lead is extended over cable 811 to video conference control circuit for the associated link FIG. 8 to transistor 8Q2. Accordingly, relay 8VC releases. The release of the 8VC relay releases the 8CF relay and also removes operating potential from the circuitry of the associated links, via lead VCT. Relay 8VC releasing also turns off the PK lamp at each of the stations via now released make contact 8VC–7. The video conference control circuit, FIG. 10, is also released because ground is removed from the AD lead via now relased make contact 8VC–4. Accordingly, the conference system is now available for connecting together other stations desiring to establish a video conference therebetween. Each of the voice-operated switches are also released by the removal of ground from the VCG lead, FIG. 13, from the switching matrix thereby releasing all of the relays therein and accordingly the voice-operated switches are also free for establishing new connections therethrough.

3.12 Conclusion

While the equipment of this invention has been shown in a particular embodiment wherein video conferencing is provided to a number of stations connected together in a key telephone system, it is understood that such an embodiment is intended only to be illustrative of the present invention and numerous other arrangements may be devised by those skilled in the art without departing from the spirit or scope of the invention.

For example, some or all of the key stations may be computer or graphics terminals arranged for bidirectional communication. In such a system, data could be transmitted from one terminal to all or some of the other terminals and information could be received at the transmitting terminal from a last transmitting terminal. Under such a system the direction of transmission could be controlled by externally applied signals or by signals supplied from one of the computers.

What is claimed is:

1. A conference control circuit for use in a key telephone system wherein any station may communicate with any other station for establishing wideband and audio conference connections among at least three stations where the direction of wideband transmission between the conferenced stations is controlled by detected audio signals from the respective stations, comprising means for selecting a present talker station from among said conferenced stations;

means operable in response to the detected presence of said audio signals from one of said stations and to a detected absence of said audio signals from all other ones of said stations for enabling said present talker selecting means with respect to said one station;

means for selecting a past talker station from among said conferenced stations;

means operable jointly in response to the detected change from the presence of audio signals at a second one of said stations to the detected absence of said audio signals therefrom and to the enabling of said present talker selecting means at said one conferenced station for enabling said past talker selecting means with respect to said second one of said stations;

means for selecting listener stations from among said conferenced stations;

means operable jointly in response to the detected absence of audio signals at all other ones of said conferenced stations prior to and subsequent to said enabling of said present talker selecting means at said one conferenced station for enabling said listener selecting means with respect to said all other conferenced stations;

first and second transmission means, each having an input and a plurality of outputs;

means for establishing a wideband transmission path from said selected present talker station to said input of said first transmission means;

means for establishing a wideband transmission path from said selected past talker station to said input of said second transmission means;

means for establishing wideband transmission paths from respective outputs of said first transmission means to said selected listener stations and to said selected past talker station; and means for establishing a wideband transmission path from an output of said second transmission means to said selected present talker station.

2. The invention set forth in claim 1 further comprising means operable in response to the selection of a past talker station as a present talker station for maintaining said established transmission paths from said originally designated present talker and past talker stations to said respective inputs of said first and said second transmission means, and means controllable by said last-mentioned means for transferring said established transmisison paths to listener stations from respective outputs of said first transmission means to respective outputs of said second transmission means.

3. The invention set forth in claim 2 wherein said conference control circuit further includes a control circuit common to all of said stations and operable in response to detected audio signals from said stations for providing first and second signals, and a plurality of individual switch circuits equal in number to the number of said stations connectable together in a wideband manner, each said individual switch circuit operable in response to said signals provided from said common control circuit for controlling said establishment of said transmission paths to said inputs and from said outputs of said first and said second transmission means.

4. The invention set forth in claim 3 wherein each of said individual circuits includes at least one relay the contacts of which are arranged to connect one of said outputs of either of said transmission means to said respective station, and means responsive to the relative operational status of said relays of said individual circuits, and said first and second signals from said common control circuit for selecting said present talker, said past talker and said listener stations.

5. The invention set forth in claim 2 wherein each of said transmission means includes an amplifier having a single input and multiple outputs.

6. The invention set forth in claim 2 further comprising first and second signal means at each of said stations, means responsive to said selection of a station as a present talker station for enabling said first signal means at said selected present talker station, and means responsive to said selection of a station as a past talker station for enabling said second signal means at said selected past talker station.

7. In a key telephone system wherein wideband and audio communication may be directed between stations on an intercom link, an arrangement for enabling wideband and audio communication among at least three statios connected to said intercom link comprising a pair of wideband transmission distributors each having an input and a plurality of outputs equal in number to the number of said stations equipped for wideband transmission to and from said link, means for alternatively connecting each of said wideband equipped stations to an individual output of either of said transmission distributors, means for detecting the status of audio activity at each of said stations, and means jointly responsive to the enabling of said detecting means at a first one of said stations connected to said link and to the detected absence of audio activity at all other stations connected to said link for enabling wideband transmission from said detected audioactive first station to all of said stations connected to said link except said first station via a first one of said transmission distributors.

8. The invention set forth in claim 7 further comprising means jointly responsive to the subsequent enabling of said detecting means at a second one of said stations and to the detected absence of audio activity from said first station for enabling wideband transmission from said detected audioactive second station to all of said stations connected to said link except said second station via said second one of said transmission distributors while concurrently maintaining said wideband transmission from said first station to said second station via said first transmission distributor.

9. The invention set forth in claim 8 further comprising means responsive to detected resumed audio activity at said first station and to detected audio inactivity at said second station for maintaining said wideband communication between said first and said second stations without interruption via said first and said second transmission distributors while again enabling wideband transmission from said first station to said other stations via said first transmission distributor.

10. The invention set forth in claim 9 further comprising means responsive to detected audio activity at one of said stations other than said first or said second stations and to the detected audio inactivity at said first and second stations for maintaining wideband transmission to said detected audioactive other station via said transmission distributor associated with said station detected audioactive just prior to said detected audio activity of said other station while enabling wideband transmission to all stations except said detected audioactive other station via said other of said transmission distributors.

11. The invention set forth in claim 10 wherein said wideband distributors are single input multiple output amplifiers.

12. The invention set forth in claim 10 further comprising
individual conference control circuits interposed between each said wideband equipped station and said link,
said control circuits each including relays the contacts of which are operable for individually controlling wideband transmission from the associated station to the input of either transmission distributor and further operable for controlling wideband transmission from the outputs of either transmission distributor to said associated station.

13. The invention set forth in claim 10 further comprising
means for receiving control signals from said stations,
means responsive to receipt of a signal from any of said stations for maintaining the direction of wideband transmission among said stations connected to said link without regard to said detected audio activity at any of said stations.

14. The invention set forth in claim 13 further comprising
means responsive to receipt of a second signal from any of said stations for preventing the establishment of wideband transmission thereto or therefrom and for rendering said audio activity detecting means ineffective for controlling the direction of wideband transmission among said stations, and
means responsive to a second receipt of said second signal from a station for reenabling wideband transmission thereto from a detected audioactive station and for reenabling said audio activity detecting means of said second signaling station.

15. In combination
a plurality of communication stations, each station arranged for two-way transmission over an audio path, outgoing wideband transmission over a transmit path and incoming wideband transmission over a receive path;
a plurality of intercom links common to all of said stations, each of said links comprising an audio bus, a wideband transmit bus and a wideband receive bus;
a link control circuit individually associated with each of said links for controlling connections to said associated link;
a register circuit common to all of said stations and accessible from said stations over a first path and over an audio path;
means controlled by signals transmitted to said register from a calling station over said first path for seizing a link control circuit associated with an idle one of said links;
means operative in response to said seized link control circuit for establishing an audio connection from said audio path of said calling station to said register through said idle link;
means responsive to first signals transmitted over said audio path from said calling station for establishing a first manner wideband connection to said wideband buses of said idle link, said first manner connection comprising a connection between said transmit path of said calling station and said wideband transmit bus and a connection between said receive path of said calling station and said wideband receive bus;
means responsive to other signals transmitted over said audio path from said calling station for establishing an audio connection from said audio bus of said idle link to said audio path of a called station;
means controlled by said first manner wideband connection means for establishing a second manner wideband connection from said called station to said wideband bus of said idle link, said second manner connection comprising a connection between said transmit path of said called station and said wideband receive bus and a connection between said receive path of said called station and said wideband transmit bus;
conference control means interposed between said stations and said intercom links for controlling wideband transmission among at least three stations connected to any one of said links, said conference control means comprising
first and second distributing means, each said distributing means having an input and a plurality of outputs,
means for detecting audio activity at each of said stations,
means operable in response to a conference control signal transmitted from any station connected to a link for releasing all said first and said second manner connections to said link and for enabling a third manner wideband connection to said link from each said station previously associated with said released first or second manner connections, said third manner connection comprising switchable connections between said transmit paths of said stations and between said receive paths of said stations and said first and second distributing means, and
means operatble in response to detected audio activity at one of said stations for connecting said wideband transmit path from said detected audioactive station via said third manner connection to said link to said input of said first distributing means and for connecting said receive paths of all other stations connected to said link to respective outputs of said first distributing means;
means operable in response to additional signals transmitted over said audio path from any station connected to said link for establishing an audio connection from said audio bus of said link to a called station associated with said additional signals; and
means controlled jointly by said last-mentioned means and said releasing means for establishing a third manner wideband connection from said called additional station to said wideband bus of said link.

16. The invention set forth in claim 15 wherein said conference control means further comprises
means jointly responsive to detected audio inactivity at a previously detected audioactive station and to detected audio activity at a second station for connecting said wideband transmit path from said second detected audioactive station via said third manner connection to said link to said input of said second distributing means and for transferring said receive paths from all other stations connected to said link, except said previously detected audioactive station, to respective outputs of said second distributing means.

17. The invention set forth in claim 16 further comprising
means controlled by the alternating detection of audio activity at two stations for maintaining the respective wideband transmit connections to the inputs of the distributing means while connecting the receive paths of the other stations alternately to the outputs of the distributing means associated with a currently audioactive station.

18. The invention set forth in claim 17 wherein
said wideband bus of each of said links includes a wideband transmit portion and a wideband receive portion,
said connection to said input of said first distributing means includes a connection to said transmit portion of said link, and
said connection to said input of said second distributing means includes a connection to said receive portion of said link.

References Cited
UNITED STATES PATENTS

| | | | |
|---|---|---|---|
| 3,649,761 | 3/1972 | Bush et al. | 179—2 T V |
| 3,636,265 | 1/1972 | Kikuchi et al. | 179—18 B C |

THOMAS W. BROWN, Primary Examiner

U.S. Cl. X.R.

179—2 T V, 99

UNITED STATES PATENT OFFICE
CERTIFICATE OF CORRECTION

Patent No. 3,718,770                    Dated February 27, 1973

Inventor(s) Randall Douglas Reese

It is certified that error appears in the above-identified patent and that said Letters Patent are hereby corrected as shown below:

Column 1, line 23, change "were" to --where--.

Column 2, line 42, change "addiiton" to --addition--.

Column 6, line 48, after "through" and before "matrix", change "a" to --the--.

Column 9, line 38, change "detail" to --detailed--;

line 44, change "3SW11" to --3SW1-1--;

line 46, change "501" to --1501--.

Column 10, line 1, after "only" and before "17A", insert --one--.

Column 11, line 61, change "27EL1" to --27EL--;

line 74, change "oCntinuing" to --Continuing--.

Column 12, line 1, change "26B" to --26LB--.

Column 18, line 69, change "th eassociated" to --the associated--.

Column 19, line 34, change "26TR-6" to --26TR1-6--.

- 1 -

UNITED STATES PATENT OFFICE
CERTIFICATE OF CORRECTION

Patent No. 3,718,770            Dated February 27, 1973

Inventor(s) Randall Douglas Reese

It is certified that error appears in the above-identified patent and that said Letters Patent are hereby corrected as shown below:

Column 20, line 57, change "TR2" to --26TR2--.

Column 21, line 59, change "transistor" to --transistors--.

Column 22, line 6, change "like" to --link--;

line 61, change "aind" to --and--.

Column 24, line 31, change "ciruits" to --circuits--.

Column 25, line 68, change "26D1" to --26TD1--.

Column 27, line 35, before "hold" insert --the--.

Column 28, line 69, change "VO(R1)" to --VOR(1)--.

Column 30, line 73, change "26TD-1-2" to --26TD1-2--.

Column 34, line 24, change "8CT1" to --8CR1--;

Column 35, line 44, change "12" to --I2--.

Column 37, line 2, change "plied" to --pled--;

line 21, change "well" to --will--;

line 43, change "13R6" to --13CR6--;

line 44, change "14Q6" to --13Q6--.

UNITED STATES PATENT OFFICE
CERTIFICATE OF CORRECTION

Patent No. 3,718,770          Dated February 27, 1973

Inventor(s) Randall Douglas Reese

It is certified that error appears in the above-identified patent and that said Letters Patent are hereby corrected as shown below:

Column 42, line 29, change "return" to --turn--.

Column 43, line 2, change "14DIR" to --13DIR--;

line 22, change "12SN-1" to --12LSN-1--;

line 39, change "XVR1(1)" to --VXR1(1)--.

Column 46, line 27, change "XVT1(1)" to --VXT1(1)--;

line 69, change "be" to --go--.

Column 50, line 36, change "tios" to --tions--.

Signed and sealed this 20th day of November 1973.

(SEAL)
Attest:

EDWARD M. FLETCHER, JR.            RENE D. TEGTMEYER
Attesting Officer                  Acting Commissioner of Patents